US011239772B1

United States Patent
Bojoi et al.

(10) Patent No.: US 11,239,772 B1
(45) Date of Patent: Feb. 1, 2022

(54) SYSTEMS AND METHODS FOR INTERIOR PERMANENT MAGNET SYNCHRONOUS MOTOR CONTROL

(71) Applicant: Wolong Electric Group Co. Ltd., Zhejiang (CN)

(72) Inventors: Radu Bojoi, Turin (IT); Zheng Zhang, Saint Joseph, MI (US); Ze Jiang, Zejiang (CN)

(73) Assignee: Wolong Electric Group Co. Ltd., Zhejiang (CN)

( * ) Notice: Subject to any disclaimer, the term of this patent is extended or adjusted under 35 U.S.C. 154(b) by 0 days.

(21) Appl. No.: 17/220,421

(22) Filed: Apr. 1, 2021

(51) Int. Cl.
| | |
|---|---|
| H02P 6/182 | (2016.01) |
| H02P 6/18 | (2016.01) |
| H02P 21/13 | (2006.01) |
| H02P 21/18 | (2016.01) |
| H02K 1/27 | (2006.01) |

(Continued)

(52) U.S. Cl.
CPC ............ *H02P 6/183* (2013.01); *H02K 1/276* (2013.01); *H02P 6/182* (2013.01); *H02P 21/0017* (2013.01); *H02P 21/12* (2013.01); *H02P 21/13* (2013.01); *H02P 21/18* (2016.02); *H02P 21/20* (2016.02); *H02P 21/22* (2016.02)

(58) Field of Classification Search
CPC .......... H02P 21/12; H02P 21/13; H02P 21/18; H02P 21/22; H02P 21/34; H02P 2203/05; H02P 2203/11
See application file for complete search history.

(56) References Cited

U.S. PATENT DOCUMENTS

| 7,116,077 B2 | 10/2006 | Raftari et al. |
| 7,334,854 B1 | 2/2008 | Chang et al. |

(Continued)

FOREIGN PATENT DOCUMENTS

| CN | 110212832 A | * | 9/2019 |
| CN | 110661462 A | * | 1/2020 |
| CN | 112350635 A | * | 2/2021 |

OTHER PUBLICATIONS

Guglielmi, P., et al., "Cross-Saturation Effects in IPM Motors and Related Impact on Sensorless Control", IEEE Tran. Ind. Applicat., vol. 42, No. 6, pp. 1516-1522, Nov./Dec. 2006.

(Continued)

*Primary Examiner* — Kawing Chan
*Assistant Examiner* — Bradley R Brown
(74) *Attorney, Agent, or Firm* — Warner Norcross + Judd LLP

(57) ABSTRACT

Systems and methods for robust control of a sensorless interior permanent magnet synchronous motor during severe operating conditions that causes motor parameter variation. A multi-model flux observer and a dynamic direct flux motor controller act in concert to generate driving commands. The flux observer transitions between providing flux-based rotor characteristic estimates based on different motor models. DHFI filtered currents can be utilized to obtain flux-based characteristic estimates using a motor magnetic model that are unaffected by motor parameter variations. The multi-model flux observer can be configured to transition between suitable estimation methods to reduce, minimize, or eliminate the effects of motor parameter variations.

27 Claims, 25 Drawing Sheets

(51) Int. Cl.
  *H02P 21/12* (2016.01)
  *H02P 21/20* (2016.01)
  *H02P 21/00* (2016.01)
  *H02P 21/22* (2016.01)

(56) References Cited

U.S. PATENT DOCUMENTS

| | | | |
|---|---|---|---|
| 7,999,496 | B2 | 8/2011 | Gleason et al. |
| 8,796,974 | B2 | 8/2014 | Wang et al. |
| 8,933,656 | B2 | 1/2015 | Zhang et al. |
| 9,331,618 | B2 | 5/2016 | Sonoda et al. |
| 9,915,517 | B2 | 3/2018 | Feuersaenger et al. |
| 10,784,805 | B1 | 9/2020 | Bojoi et al. |
| 10,819,264 | B1 | 10/2020 | Bojoi et al. |
| 2004/0070362 | A1 | 4/2004 | Patel et al. |
| 2012/0212169 | A1* | 8/2012 | Wu .................. H02P 29/662 318/432 |

OTHER PUBLICATIONS

Bojoi, R., et al., "Sensorless Control of PM Motor Drives—a Technology Status Review", Proc. of the 2013 IEEE Workshop on Electrical Machines Design, Control and Diagnosis, (WEMDCD), Paris, 2013, pp. 166-180.

Bianchi, N., et al., "Comparison of PM Motor Structures and Sensorless Control Techniques for Zero-Speed Rotor Position Detection", IEEE Tran. Power Electron., vol. 22, No. 6, pp. 2466-2475, Nov. 2007.

Holtz, J., "Acquisition of Position Error and Magnet Polarity for Sensorless Control of PM Synchronous Machines", IEEE Trans. on Industry Applications, vol. 44, No. 4, Jul./Aug. 2008.

Fatu, M., et al., "I-F Starting Method with Smooth Transition to EMF Based Motion-Sensorless Vector Control of PM Synchronous Motor/Generator", IEEE Power Electronics Specialists Conference (PESC), 2008, pp. 1481-1487.

Agarlita, S.-C., et al., "I-f Starting and Active Flux Based Sensorless Vector Control of Reluctance Synchronous Motors, with Experiments", 12th International Conference on Optimization of Electrical and Electronic Equipment (OPTIM), 2010, pp. 337-342.

Brandstetter, P., et al., "Sensorless Control of Permanent Magnet Synchronous Motor Using Voltage Signal Injection", Elektronika IR Elektrotechnika, ISSN 1392-1215, vol. 19, No. 6, 2013, pp. 19-24.

Kang, J., "Sensorless Control of Permanent Magnet Motors", Control Engineering, vol. 57, No. 4, Apr. 2010, pp. 1-4.

Armando, E., et al., "Experimental Identification of the Magnetic Model of Synchronous Machines", IEEE Transactions on Industry Applications, vol. 49, No. 5, 2013, pp. 2116-2125.

Pellegrino, G., et al., "Unified Direct-Flux Vector Control for AC Motor Drives", IEEE Transactions on Industry Applications, vol. 47, No. 5, 2011, pp. 2093-2102.

Kwon, Y., et al., "Reduction of Injection Voltage in Signal Injection Sensorless Drives using a Capacitor-Integrated Inverter", IEEE Transactions on Power Electronics, vol. 32, No. 8, 2016, pp. 6261-6274.

Yoo, A. et al., "Design of Flux Observer Robust to Interior Permanent-Magnet Synchronous Motor Flux Variation", IEEE Transactions on Industry Applications, vol. 45, No. 5, 2009, pp. 1670-1677.

Garcia, X., et al., "Comparison between FOC and DTC Strategies for Permanent Magnet Synchronous Motors", Advances in Electrical and Electronic Engineering, vol. 5, No. 1, 2011, pp. 76-81.

Odhano, S.A. et al., "Identification of Three Phase IPM Machine Parameters Using Torque Tests", IEEE Transactions on Industry Applications, vol. 53, Issue 3, May-Jun. 2017, pp. 1-8.

Lin, Tzu-Chi, "Sensorless Control of Switched-Flux Permanent Magnet Machines", Department of Electronic and Electrical Engineer, University of Sheffield, Apr. 20, 2015, pp. 1-239.

Boldea, I. et al., "'Active Flux' DTFC-SVM Sensorless Control of IPMSM", IEEE Transactions on Energy Conversion, vol. 24, No. 2, Jun. 2, 2009, pp. 314-322.

Pellegrino, G. et al., "Direct Flux Field-Oriented Control of IPM Drives With Variable DC Link in the Field-Weakening Region", in IEEE Transactions on Industry Applications, vol. 45, No. 5, pp. 1619-1627, Sep.-Oct. 2009, doi: 10.1109/TIA.2009.2027167.

Bae, B.H. et al., "New Field Weakening Technique for High Saliency Interior Permanent Magnet Motor", 38th IAS Annual Meeting on Conference Record of the Industry Applications Conference, 200., Salt Lake City, UT, 2003, pp. 898-905 vol. 2, doi: 10.1109/IAS.2003.1257641.

Choi, G. et al., "Novel Flux-Weakening Control of an IPMSM for Quasi-Six-Step Operation", 2007 IEEE Industry Applications Annual Meeting, New Orleans, LA, 2007, pp. 1315-1321, doi: 10.1109/07IAS.2007.204.

\* cited by examiner

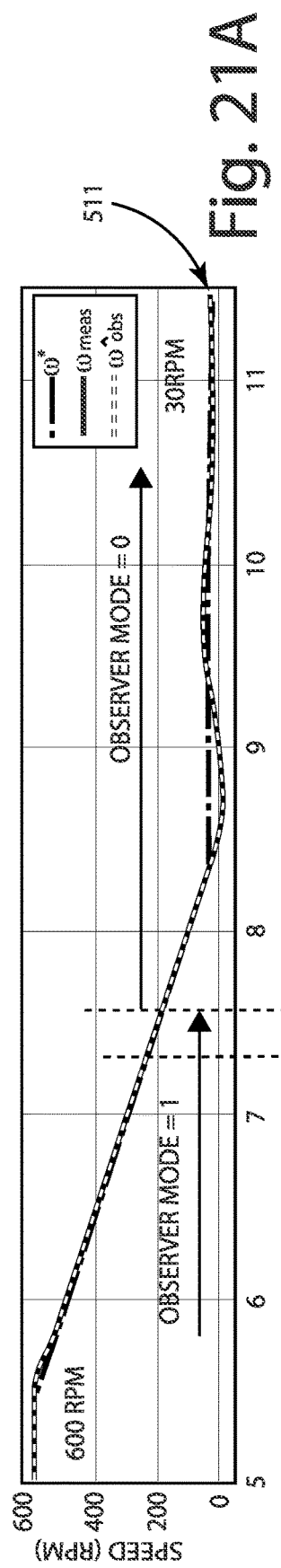
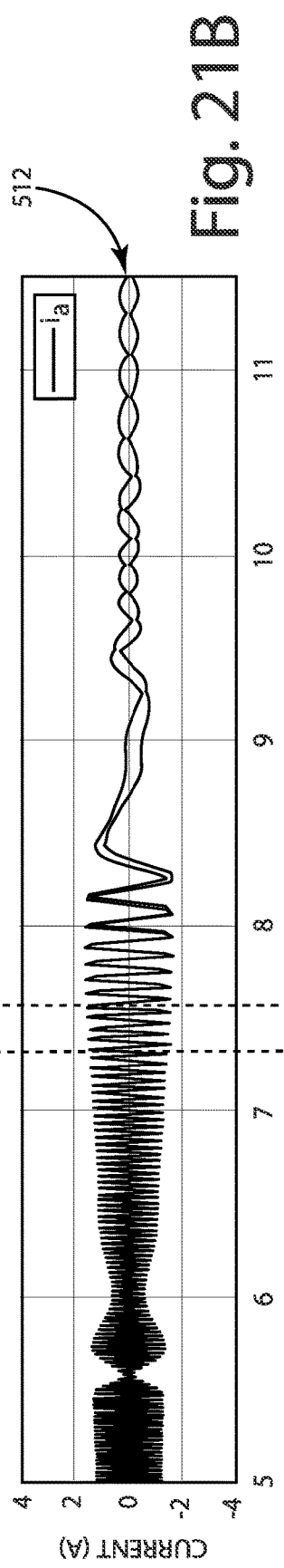
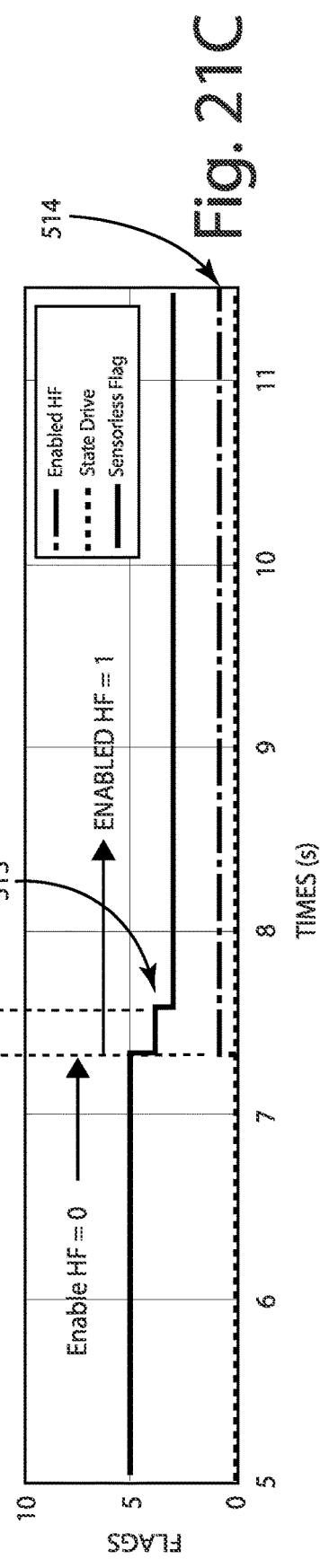

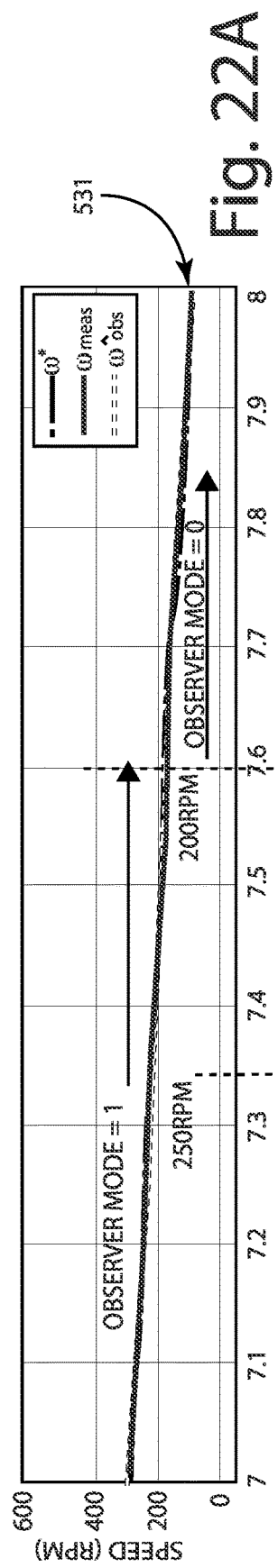
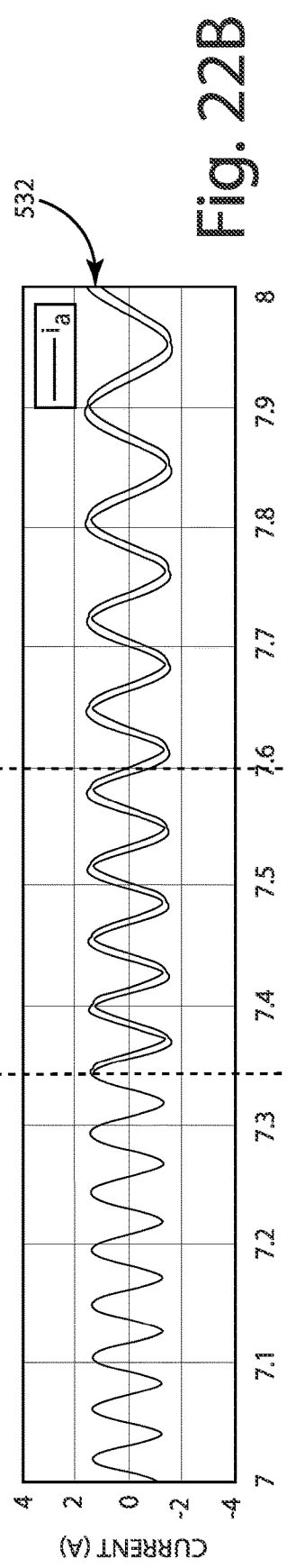
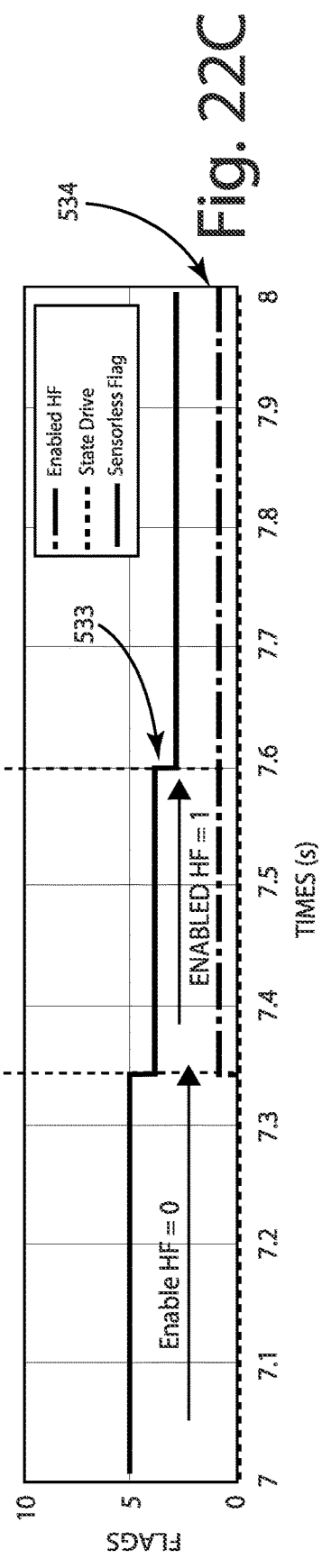
Fig. 22A
Fig. 22B
Fig. 22C

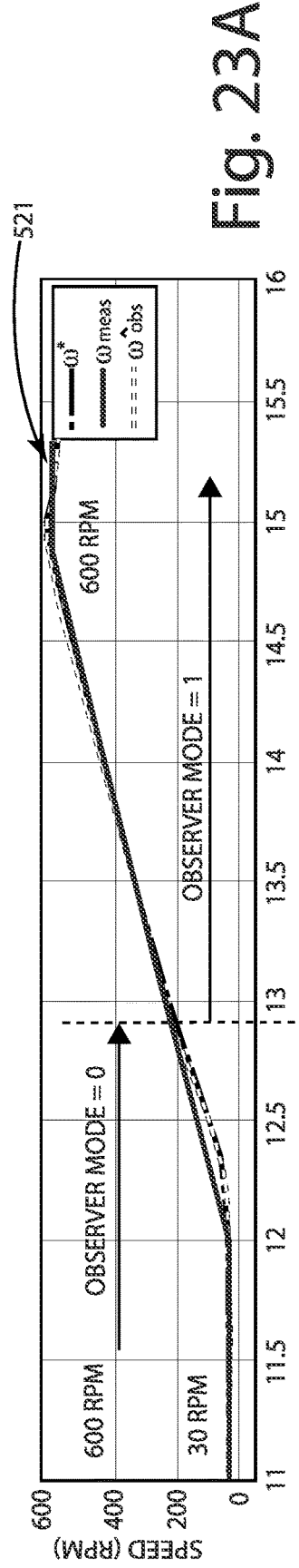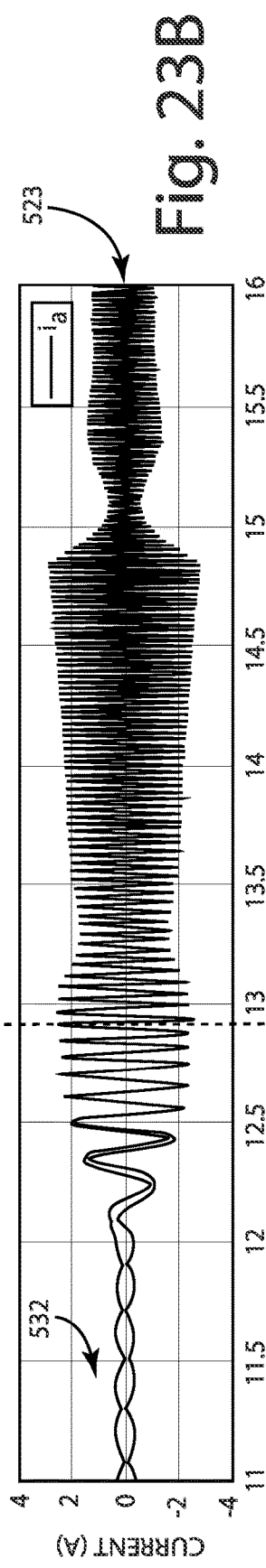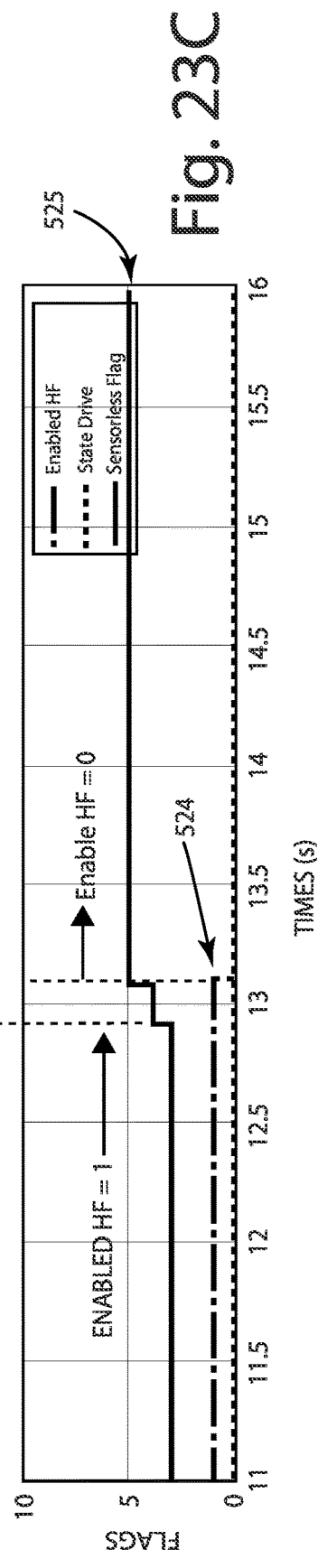
Fig. 23A
Fig. 23B
Fig. 23C

SYSTEMS AND METHODS FOR INTERIOR PERMANENT MAGNET SYNCHRONOUS MOTOR CONTROL

BACKGROUND OF THE INVENTION

This invention generally relates to robust control of a permanent magnet synchronous motor ("PMSM"). Various embodiments relate to Dynamic Direct Flux Control (DDFC), multi-model flux observer, and torque linearity control.

Sensorless PMSM systems have begun being deployed into certain fan and blower driven applications, such as heating, ventilation, and cooling ("HVAC") systems as well as various other commercial and industrial motor driven products. A sensorless PMSM (also referred to as a sensorless PMSM system) is one type of advanced electronically controlled motor ("ECM") or ECM system. Sensorless PMSM systems can generally not only deliver high peak efficiency at rated working speeds, but also have a relatively large high-efficiency operational speed range. In addition, sensorless PMSM systems variable speed enables low-capacity operation during off-peak periods, such as nighttime, which can account for meaningful energy savings. In addition, these electronically controlled PMSM systems can also provide opportunities for artificial intelligence controls and remote control through a variety of communication technologies, such as cloud communication, to improve operational energy savings, accessibility, monitoring, safety, and reliability.

One drawback of sensor based PMSM systems is their speed and/or position sensor(s). That is, sensor-based PMSM systems use a speed and/or position sensor external to the motor (e.g., mounted to the motor shaft), which takes up space, adds cost in the form of additional electronics, and is an additional fault point that detracts from the reliability of the motor. Instead of incorporating external sensors, sensorless PMSM systems rely on sensing operating characteristics of the motor itself for control. Sensorless PMSM control generally involves utilizing one or more estimated values, such as estimated rotor position angle and estimated motor speed, to replace control values directly measured with external sensors in sensor based PMSM systems.

With regard to commercial and industrial ECM driven applications, such as heating, ventilation, and air conditioning ("HVAC") or air motion control systems, sensorless ECMs are increasingly being selected, in part because they have fewer fault points than their sensor-based counterparts making them more suitable for a severe environment, such as at a rooftop or other inhospitable environment. Exposure to such an environment can still negatively impact sensorless ECM operation. For example, a severe environment can cause motor parameters, such as the back-EMF, motor resistances, and motor inductances, to vary outside tolerances, which in turn can cause operational inefficiency and even motor failure in some cases.

Many sensorless ECMs implement field-oriented control ("FOC"), which is reliant on a look-up table of compensation values based on empirical investigations. Field-oriented control generally refers to a variable-frequency drive control method in which the motor stator currents of a three-phase AC electric motor are measured and identified as two orthogonal current vector components (one current component vector related to the magnetic flux linkage of the motor (id), the other related to the torque ($i_q$). A field-oriented control system calculates corresponding current component references (i.e. targets) from the flux and torque references given by the drive's speed control. Typically, proportional-integral ("PI") controllers are used to keep the measured current components at their reference values. The pulse-width modulation of the variable-frequency drive defines transistor switching according to the stator voltage references that are output from the PI current controllers.

In general, FOC can struggle in some situations due to its dependence on motor parameters, which can vary outside of tolerances in severe environments. This is because of FOC's reliance on look-up tables for one or two-dimension empirical compensation values stored in a look-up table for that particular motor or type of motor. The compensation values presume the motor parameters are fixed or within a small tolerance and FOC systems do not account for environments that cause the motor parameters to stray from the assumed values used in obtaining the empirical compensation values, which leads to performance degradation. Additionally, developing and maintaining a large empirical database of compensation values can be burdensome to manage and service for mass produced ECMs. The limited attempts to improve robustness of FOC control have been too complicated and lead to performance degradation too easily for practical applications.

One example of a situation where FOC control can struggle due to motor parameter variation is in identifying an inverter saturation state at high-speed. Inverter saturation generally refers to the situation where further increases to motor voltage input cannot be done to produce additional current to generate additional torque. FOC systems often estimate back-electromotive force ("back-EMF") in order to identify whether the motor is at an inverter saturation state. Put simply, an FOC system typically will increase motor speed while estimating back-EMF and stop increasing motor speed once a certain back-EMF estimated value is reached that corresponds with an empirically obtained inverter saturation point for the motor (typically stored in a look-up table). However, because the empirical saturation point is based on normal motor parameter values, if motor parameters are abnormal, then the saturation point may not be accurate, which can lead to misidentification of inverter saturation, which in turn can lead to inefficient ECM operation or other issues.

Direct Torque Control (DTC) is another type of motor control methodology. DTC estimates stator flux by integrating stator voltages and estimates torque with a cross product of the estimated stator flux and measured motor current vector. If either the flux or torque deviates too far from a target value, the DTC incrementally changes the motor stator voltages to bring the values closer to the targets, typically using hysteresis controllers. DTC neglects variation of the stator resistance, which may be reasonable in mild environments. However, in severe environments and/or at lower speeds the stator resistance may not be negligible and its neglect can result in performance, stability, or other issues. Consequently, DTC has its own special challenges and issues for limited industrial and commercial applications.

Accordingly, as more commercial and industrial fans and blowers are installed in severe environmental conditions and face motor parameter variations outside acceptable ranges, there is a need for new motor control systems and methods that can withstand motor parameter variation and achieve robust speed control of commercial and industrial fan and blower driven applications despite the severe environmental conditions.

SUMMARY OF THE INVENTION

The present disclosure relates to systems and methods for robust control of a sensorless interior permanent magnet synchronous motor ("IPMSM"). The various embodiments described herein are suitable for use with a variety of sensorless IPMSMs, including those operating during one or more severe operating conditions, such as at extreme or fluctuating temperatures or voltages, or essentially any other severe operating condition that causes motor parameter variation, such as significant changes in motor magnet output, motor resistance, and motor inductance. IPMSMs of the present disclosure generally include a stator, a rotor, and a motor control system including a multi-model flux observer and a dynamic direct flux motor controller.

One method for robust control of an IPMSM during one or more severe operating conditions includes: estimating, with a voltage motor model of the multi-model stator flux observer of the sensorless IPMSM, a voltage motor model based estimated motor flux linkage between the stator and rotor during the severe operating condition, estimating, with a motor magnetic model of the multi-model stator flux observer of the sensorless IPMSM, a motor magnetic model based estimated motor flux linkage between the stator and rotor during the severe operating condition, and estimating, with the motor control system, a transition rotor characteristic of the sensorless IPMSM during the severe operating condition.

A plurality of estimated motor characteristics are the outputs from the multi-model stator flux observer for controlling the sensorless IPMSM during the severe operating condition. The output can be transitioned to reduce, minimize, or eliminate the amount of time the stator flux observer output is significantly dependent upon estimates subject to motor parameter variations. In some embodiments, the stator flux observer output is transitioned between flux estimation methods dependent upon the rotor speed, with some flux estimation methods being more tolerant of or entirely independent from motor parameter fluctuations at certain rotor speeds. Transitioning a multi-model stator flux observer output can be done automatically at a transition threshold stored in memory. It can be based on an estimated transition rotor characteristic, such as rotor speed or frequency. The transition can be between the estimated motor characteristics for controlling the sensorless IPMSM being estimated as a function of a motor magnetic model estimated motor flux linkage and being estimated as a function of a voltage motor model estimated motor flux linkage. The output, in the form of a plurality of estimated motor characteristics such as load angle, speed, and position, can be sent from the stator flux observer to one or more other components in the motor control system, such as a dynamic direct flux controller. Those components can receive and be configured to respond to the estimated motor characteristics as the stator flux observer updates them, for example, in real-time. The method can also include controlling the sensorless IPMSM during the severe operating condition based on the received estimates of motor characteristics.

The system and method of the current disclosure can be further defined by one or more of the following features, either alone or in combination. The accuracy of each of the estimated motor characteristics output from the multi-model stator flux observer during the severe operating condition falls within a predefined tolerance relative to a corresponding actual rotor characteristic.

The estimated transition rotor characteristic can be an estimated rotor speed, and the outputting can include outputting, from the multi-model stator flux observer while the estimated rotor speed is below the transition threshold, the plurality of estimated motor characteristics for controlling the sensorless IPMSM during the severe operating condition as a function of the motor magnetic model estimated motor flux linkage, and outputting, from the multi-model stator flux observer while the estimated rotor speed is above the transition threshold, the plurality of estimated motor characteristics for controlling the sensorless IPMSM during the severe operating condition as a function of the voltage model estimated motor flux linkage.

One aspect of the present disclosure relates to a stator flux observer and method of operating a stator flux observer that utilizes a gain function to switch between two motor models that operate more reliably at different speed ranges due to being more resilient to or essentially unaffected by motor parameter variations at those different speed ranges. In some embodiments, the voltage motor model is based upon one or more empirically determined motor parameters and is valid for a range of operating conditions. At estimated rotor speeds below the transition threshold, the severe operating condition falls outside the range of operating conditions where the voltage motor model is valid, and at estimated rotor speeds above the transition threshold, the severe operating condition fall within the range of operating conditions where the voltage motor model is valid. Accordingly, the voltage motor model can be relied upon despite motor parameter variation for certain rotor speeds. In some embodiments, the motor magnetic motor model or current model is based upon one or more empirically determined motor parameters and is valid for a range of operating conditions. At estimated rotor speeds above the transition threshold, the severe operating condition fall outside the range of operating conditions where the magnetic motor model is valid, and at estimated rotor speeds below the transition threshold, the severe operating condition falls within the range of operating conditions where the magnetic motor model is valid. Accordingly, the voltage motor model can be relied upon despite motor parameter variation for certain rotor speeds.

The severe operating condition that can cause motor parameter variations in some stator flux observer estimations include an ambient temperature outside of a rated ambient temperature range associated with the sensorless IPMSM.

Some embodiments are confirmed for high frequency injection and dynamic high frequency injection ("DHFI") filtering. One embodiment includes injecting a high frequency signal into the stator of the IPMSM, sensing a stator current including a fundamental frequency portion and a high frequency injection portion, filtering the sensed stator current with a DHFI filter into a high frequency DHFI filtered current and a fundamental frequency DHFI filtered current, estimating a rotor position of the sensorless IPMSM with a high frequency observer based on the high frequency DHFI filtered current, and wherein estimating the motor magnetic model based estimated motor flux linkage based on the fundamental frequency DHFI filtered current, the estimated rotor position derived from the high frequency DHFI filtered current, and the motor magnetic model.

The present disclosure is also directed to a sensorless interior permanent magnet synchronous motor ("IPMSM") system for operation during a severe operating condition. The IPMSM system includes a motor housing, a stator mounted in the motor housing and defining a space, the stator having a three-phase stator winding configuration, a rotor including a plurality of interior permanent magnets distributed circumferentially such that the rotor exhibits magnetic saliency, the rotor being rotatable over a speed range inside the space via excitation of the three-phase stator winding configuration of the stator, and a motor control system mounted in the motor housing.

The motor control system can include various components. Some embodiments include, a power supply, a sensing circuit configured to sense one or more electrical characteristics of the stator, a memory for storing a plurality of motor characteristic values, and a multi-model flux observer.

The multi-model flux observer can be configured to conduct various estimates. The estimates can include estimates of motor flux linkage between the stator and rotor with a voltage motor model or a motor magnetic model. The estimates can be taken during a severe operational condition, such as extreme or fluctuating temperatures, fluctuating voltages, or under inverter saturation, or essentially any other severe operational condition. The flux observer can also estimate a rotor speed based on either motor flux linkage. The estimated flux can be used to derive different estimated motor characteristic values that can be used throughout the motor control system to control the sensorless IPMSM. The estimation methods can vary depending on how reliable the underlying motor model is at a particular motor speed. Ultimately, a controller such as a dynamic direct flux controller of the present disclosure can be configured to generate driving commands. The driving commands can drive operation of the motor, even during a severe operating condition, based on the estimated motor characteristics. The system can include a driving circuit for generating the excitation signals for the three-phase stator winding configuration of the stator according to the driving commands provided by the controller.

Embodiments of the sensorless IPMSM of the present disclosure can operate in conjunction with DHFI. The system can include a high frequency injection circuit configured to inject a high frequency signal into the stator of the IPMSM. The sensing circuit can be configured to sense a stator current including a fundamental frequency portion and a high frequency injection portion, and a DHFI filter can be configured to filter the sensed stator current into high frequency and low frequency portions. The high frequency DHFI filtered current can be utilized to obtain rotor position, and therefore rotor speed, based on magnetic saliency due to the interior permanent magnets of the IPMSM. Rotor position and speed can also be obtained via the fundamental frequency DHFI filtered current, e.g. utilizing back-EMF voltages calculated based on empirical stator resistance and inductance values.

Another aspect of the present disclosure is directed to a system and method for estimating a sensorless interior permanent magnet synchronous motor rotor characteristic value during severe operating conditions with a multi-model stator flux observer. The multi-model stator flux observer may be configured for use within an IPMSM control system having a stator and a rotor.

The stator flux observer system and method can include estimating a first, voltage motor model based estimated motor flux linkage between the stator and rotor based on reconstructed stator voltage, back-EMF voltage, dead time voltage, and feedback. The system and method can also include estimating a second, motor magnetic model based estimated motor flux linkage between the stator and rotor. Various rotor characteristic values can be estimated based on the motor magnetic model estimated motor flux linkage and the voltage motor model estimated motor flux linkage, and output from the multi-model stator flux observer. The stator flux observer can be configured to transition its output between one or the other. The transition can be triggered by a transition threshold stored in memory. The transitioning can be configured such that accuracy of the estimated sensorless IPMSM rotor characteristic output falls within a predefined tolerance range of an actual rotor characteristic value during the severe operating conditions over an entire operating range of the IPMSM control. The transitioning in some embodiments is controlled by a rotor speed value. In other embodiments it is controlled by a cut-off frequency, rotor frequency value, or other value. The transition point can be selected based on at least one of expected IPMSM operating speed range, expected IPMSM starting torque, expected IPMSM peak operating speed, or any combination thereof.

Another aspect of the present disclosure relates to the dynamic direct flux control system configurations. In some embodiments, non-linear variation of motor parameters occurs due to at least one of fluctuation in temperature, extreme ambient temperature, voltage fluctuation, and inverter saturation. Certain dynamic direct flux control strategies can increase efficiency and robustness in view of motor parameter variations. In one embodiment, the dynamic direct flux control system is configured to obtain an MTPA flux target from a Maximum Torque Per Ampere ("MTPA") lookup table, limit the MTPA flux target based on a flux weakening limit derived from and in response to the rotor speed estimate being below an inverter saturation rotor speed, and generate driving commands based on a limited MTPA flux target and the stator flux observer flux estimate, where the MTPA flux target corresponding to the inverter saturation rotor speed is lower than expected due to the severe operating conditions of the sensorless IPMSM and the dynamic direct flux control system adjusts the MTPA flux target to provide a maximum IPMSM torque. In another embodiment, one of the motor characteristic values is a stator flux observer load angle, and the dynamic direct flux control system is configured to limit a torque-based stator current target with a Maximum Torque Per Volt ("MTPV") controller based on the stator flux observer load angle, and generate driving commands based on error between a limited torque-based stator current target and at least one of the fundamental frequency DHFI filtered stator current and the stator current.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIGS. 21A-C illustrate graphs of DFC robust control simulation results during deceleration from 600 RPM to 30 RPM and flag status change.

FIGS. 22A-C illustrate graphs of DFC robust control simulation results during deceleration around 200 RPM and flag status change.

FIGS. 23A-C illustrate graphs of DFC robust control simulation results during acceleration from 30 RPM to 600 RPM and flag status change.

DESCRIPTION OF THE CURRENT EMBODIMENTS

This disclosure generally relates to systems and methods for control of permanent magnet synchronous motor ("PMSM") systems that can overcome motor parameter variation and achieve robust controls. One aspect of the present disclosure is generally directed to a dynamic direct flux control ("DDFC") method, a motor controller implementing a DDFC method, as well as ECM systems implementing a DDFC method. DDFC generally refers to a system or method for control of a PMSM with robustness to motor parameter variations caused by external forces, such as severe operating conditions present in a severe operating environment. Another aspect of the present disclosure is generally directed to a multi-model stator flux observer. One aspect of the present disclosure relates to selection of a multi-model flux observer model transition trigger or set of triggers, such as one or more particular speeds or frequencies, that initiate transition of the dominate model of the multi-model stator flux observer. These can also be referred to as a transition rotor characteristic or characteristics. Another aspect of the present disclosure relates to a torque control linearity (TCL) trigger. Some embodiments combine the various different aspects, others include some, but not other aspects. Embodiments of the present disclosure are suitable for use in a wide variety of fan and blower systems, such as HVAC systems as well as various other commercial and industrial applications.

Figure 1B:
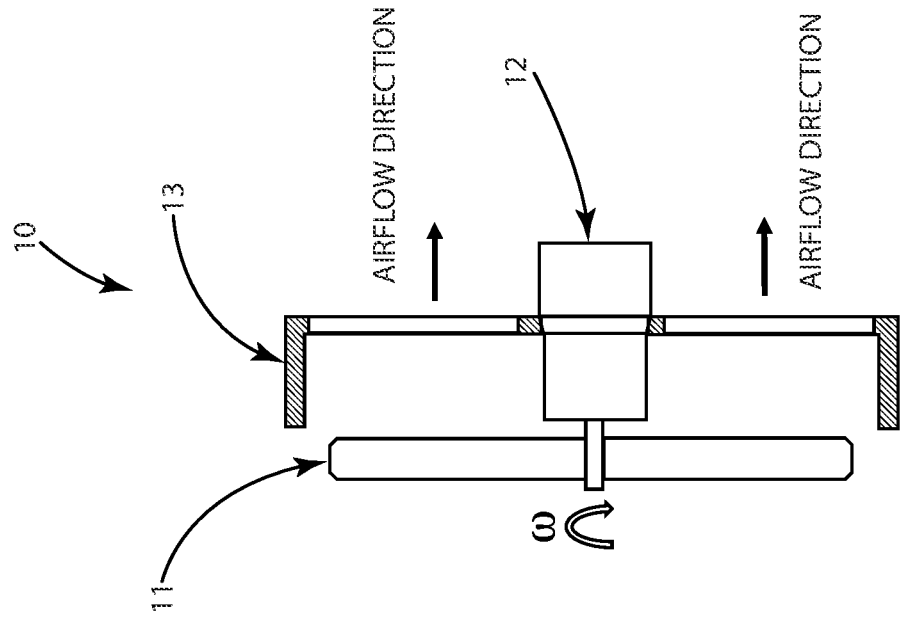
FIGS. 1A-B illustrates a commercial fan or blower diagram.
Figure 1A:
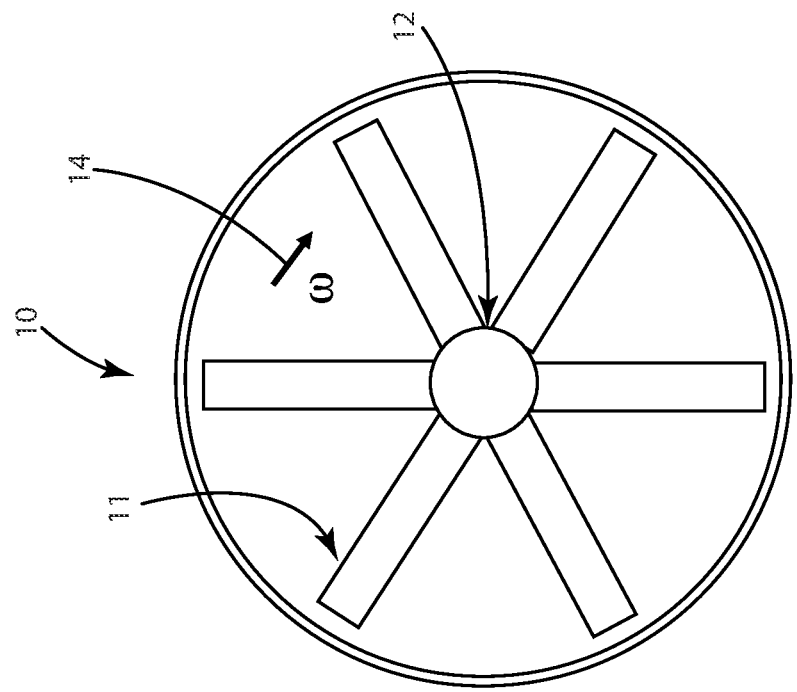

FIGS. 1A-B illustrate front and side diagrammatic views respectively of an exemplary commercial or industrial fan 10. The figures show exemplary components including fan blades 11, an ECM 12, and installation structure 13. As the fan blades 11 are driven by the ECM 12 they rotate at a certain speed and rotating direction generating airflow. The fan can produce a specified airflow to satisfy an airflow requirement based on the configuration or programming of the motor electronics, typically incorporated within the motor itself.

A number of the components and control elements suitable for use in embodiments of a sensorless interior permanent magnet synchronous motor ("IPMSM") of the current disclosure are described in described in U.S. application Ser. No. 16/795,074, entitled SYSTEM AND METHOD FOR INTERIOR PERMANENT MAGNET SYNCHRONOUS MOTOR CONTROL FROM ZERO OR LOW SPEED, filed on Feb. 19, 2020, to Bojoi et al., and U.S. application Ser. No. 16/984,267 to Bojoi et al., filed on Aug. 4, 2020, entitled "ROBUST STARTING SYSTEM AND METHOD FOR INTERIOR PERMANENT MAGNET SYNCHRONOUS MOTOR CONTROL", which are both hereby incorporated by reference in their entirety.

Figure 2:
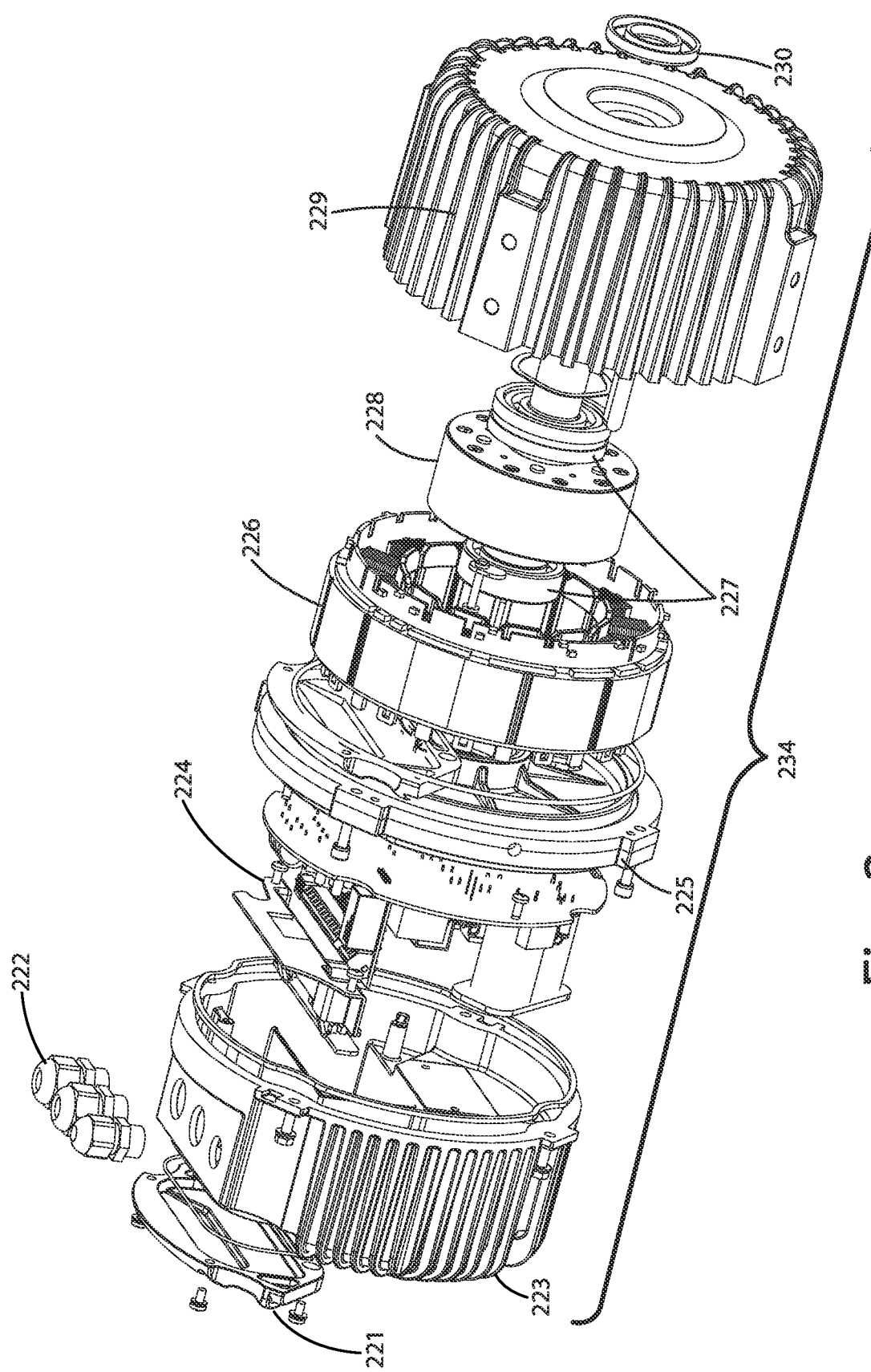
FIG. 2 illustrates an exploded view of an IPMSM in accordance with one embodiment of the present disclosure.
Figure 3B:
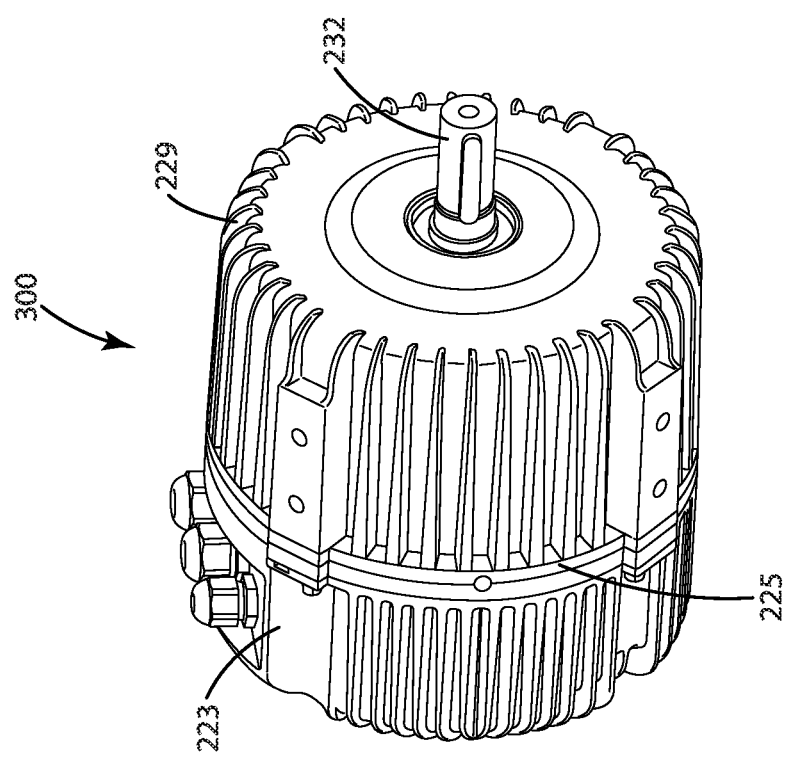
FIGS. 3A-B illustrate assembled front and rear perspective views of the IPMSM of FIG. 2.
Figure 3A:
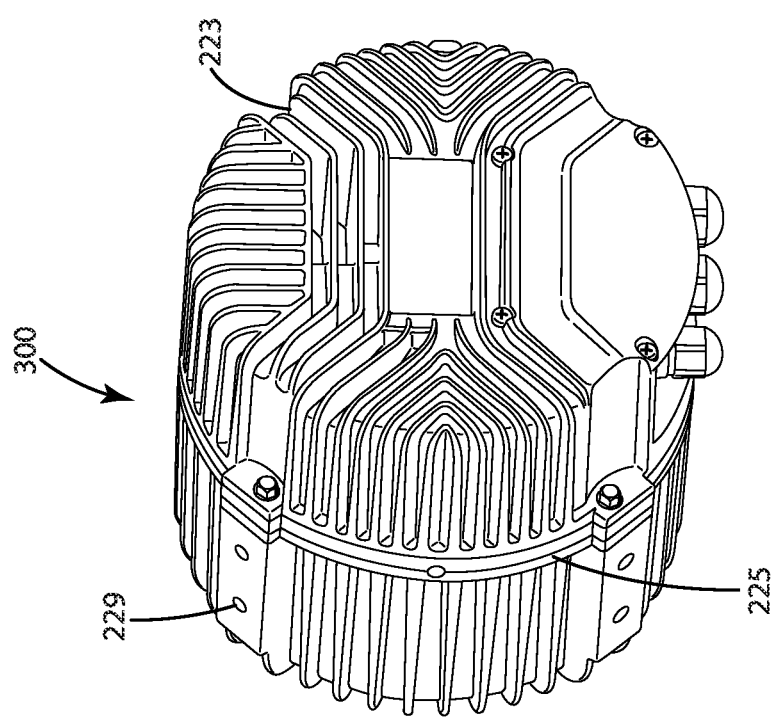

FIGS. 2 and 3A-B illustrate exploded, front perspective, and rear perspective views, respectively, of an exemplary embodiment of an ECM in accordance with embodiments of the present disclosure. The depicted ECM includes a motor, controller, and interface integrated together as a whole motor body, which are described in more detail below.

The depicted motor is an interior permanent magnet ("IPM") synchronous motor with rare earth magnet material, such as Ned-Fe—B. The motor has a housing or enclosure 234 that includes a rear-end shield 223, a front-end shield 229 and mid shield 225. The three shields are joinable to cooperatively form the enclosure 234 of the motor. The rear-end shield 223 and the mid shield 225 form a sealed enclosure for the IPMSM electronics including a motor control system 224. A lubricant or oil seal can surround the drive shaft 232 that extends out of the motor enclosure 234 and seals the front-end shield 229. In alternative embodiments, the motor enclosure can be formed from additional, fewer, or different constituent components that cooperate to house the motor in essentially any suitable way that enables the motor to convert electrical energy into mechanical energy, for example to rotate the drive shaft.

The exemplary motor includes a motor control system 224, a stator 226, and a rotor 228. The motor control system 224 may be mounted and sealed within a separate cavity, for example via cooperation of the rear sealed end-shield 223 and the sealed mid-shield 225. The motor control system 224 is capable of driving multiphase AC electromagnetics of the stator 226 to create a magnetic field that rotates in time with the oscillations of the line current. Once at steady state, the rotor, for example via permanent magnets embedded in the rotor, turns in step with the stator 226 and as a result rotates the drive shaft 232 of the stator. The motor may include bearings 227 that support and locate the rotor to keep the air gap between the stator 226 and the rotor 228 small and consistent. The motor control system 224 may include a controller on a printed circuit board coupled to the end-shield 223 for heat dissipation generated by the electronic components.

During installation or service, the cover 221 can be opened to access connectors 222. In the current embodiment, the wire cover is waterproof and includes a rubber seal. Waterproof electrical connectors 222 can provide for routing, connecting, or otherwise coupling to the motor control system 224 and stator 226. In one embodiment, the waterproof electrical connectors 222 are three-phase power cables, command cables, and sensing/monitoring cables. In the current embodiment, the three connectors 222 provide a connection interface for three-phase power cables, command cables, and sensing-monitoring cables.

Figure 4:
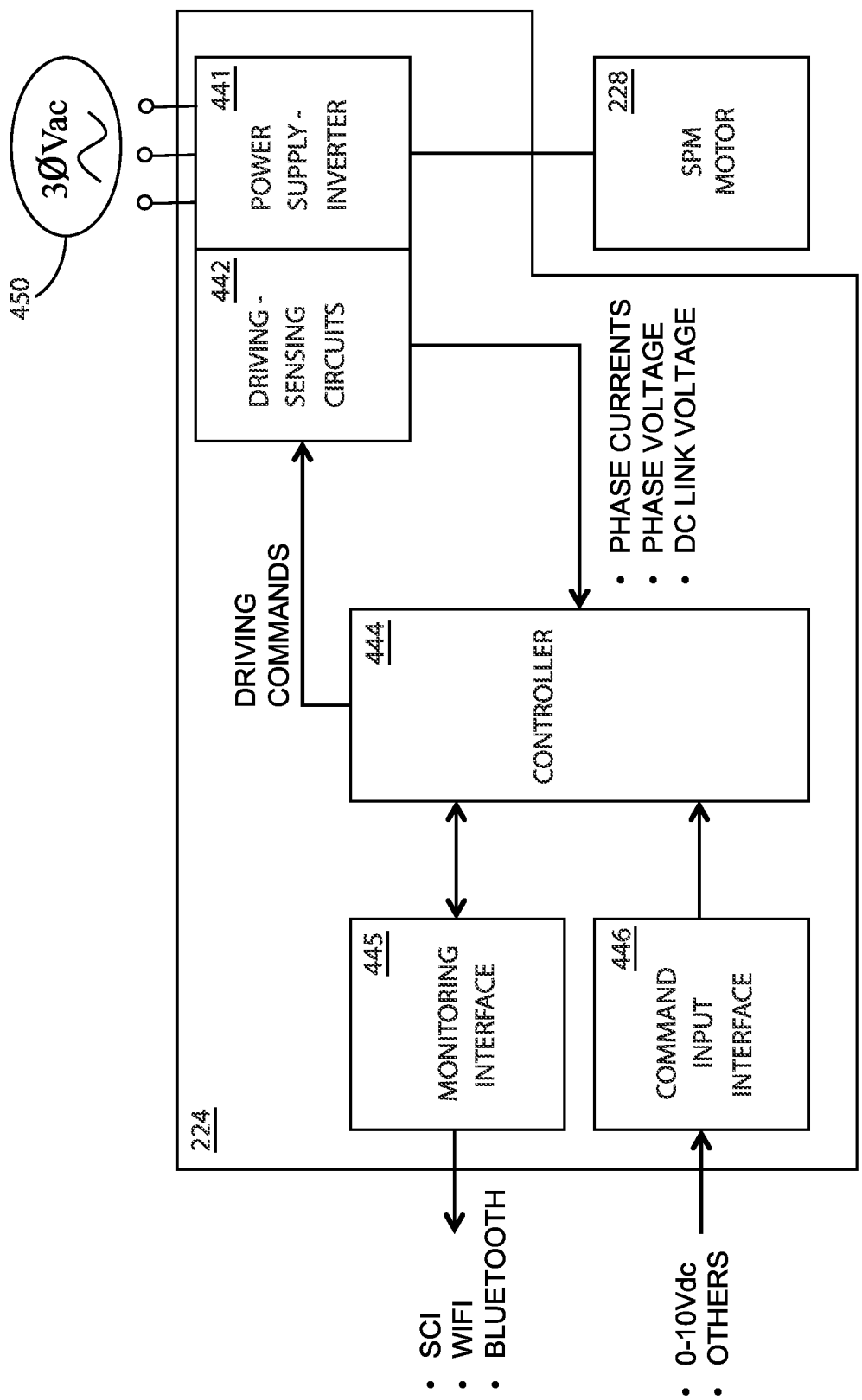
FIG. 4 illustrates a block diagram in accordance with one embodiment of the present disclosure.

Referring to FIG. 4, an overview of a motor control system 224 in accordance with the present disclosure will now be described. Generally, the motor control system 224 may include one or more microcontrollers, microprocessors, and/or other programmable electronics that are programmed to carry out the functions described herein. The motor control system 224 may additionally or alternatively include other electronic components that are programmed to carry out the functions described herein, or that support the microcontrollers, microprocessors, and/or other electronics. The other electronic components can include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in another manner, whether combined into a single unit or distributed across multiple units. Such components may be physically distributed in different positions in the motor 12, or they may reside in a common location within the motor 12, such as within the sealed enclosure formed by the rear-end shield 223 and the mid-shield 225. When physically distributed, the components may communicate using any suitable serial or parallel communication protocol, such as, but not limited to SCI, WiFi, Bluetooth, FireWire, I2C, RS-232, RS-485, and Universal Serial Bus (USB).

Referring to FIG. 4, one embodiment of the motor control system 224 includes a combination of a variety of different electronic components, including, but not limited to, power supply circuitry 441 to convert three-phase source power 450 to a suitable voltage, current, and frequency, driving circuitry 442 to drive the motor stator windings based on driving commands, sense circuitry 442 to sense one or more motor characteristics for use in the one or more motor control methods or motor speed estimation methods, a controller 444 to implement one or more motor speed estimation methodologies or one or more motor control methodologies and provide driving commands to the driving circuitry based on the sensed motor characteristics, a monitoring interface 445 for monitoring motor operation including the one or more motor control methodologies, and a command input interface 446 for providing various command inputs to the controller 444. The command input interface 446 can be configured to receive commands from an external device, such as a product system controller or another up-level control board. The monitoring interface 445 can also communicate the received sensing and monitoring information to an external device, such as an up-level control board. For example, the command input interface 446 and monitoring interface 445 may communicate with an external device via a transceiver or other communication device utilizing essentially any communication protocol, such as wireless communication protocols like Bluetooth or WIFI.

Portions of the driving and sensing circuitry 442 used to implement various embodiments of the control methods described herein can be the same driving and sensing circuitry 442 utilized to implement other known motor control methods. For example, the driving and sensing circuitry can include three-phase full bridge topology, along with sensing circuitry capable of detecting various stator characteristics, such as stator phase currents and stator voltages. In one embodiment, the sensing circuitry is capable of detecting stator phase currents, stator phase voltages, and DC link voltage. That is, hardware configurations of the driving and sensing circuitry 442 can be utilized to implement embodiments of the control methods described herein. In alternative embodiments, the sensing circuitry 442 may include circuitry to sense additional, different, or fewer characteristics. The controller 444 can include memory or have access to memory located on a shared circuit board or located elsewhere within the motor. The memory can contain various operating parameters in connection with the various control and speed estimation methods. The controller 444 can also contain a microcontroller unit ("MCU"). The driving and sensing circuitry 442 can include sensing hardware circuits to provide feedback to a MCU for real-time processing. The controller 444 can include software algorithms and hardware to access feedback provided by driving and sensing circuitry 442 and to send control commands to the ECM 443 via the driving circuits 442 and inverter 441.

The controller 444 can be configured with a rotor characteristic detection method, such as the rotor characteristic method described in U.S. application Ser. No. 16/795,074, filed on Feb. 19, 2020, by Bojoi et al. entitled "SYSTEM AND METHOD FOR INTERIOR PERMANENT MAGNET SYNCHRONOUS MOTOR CONTROL FROM ZERO OR LOW SPEED", which was previously incorporated by reference in its entirety. Detecting rotor position with a rotor position detection method refers to detecting or estimating the position of the rotor relative to the motor stator. The position can be obtained or translated to essentially any suitable coordinate system. For example, some embodiments of the motor control system 224 include translating stator current measurements (abc) into the stationary or dq frames of reference. Rotor magnetic polarity can be detected utilizing a rotor polarity detection method.

Figure 5:
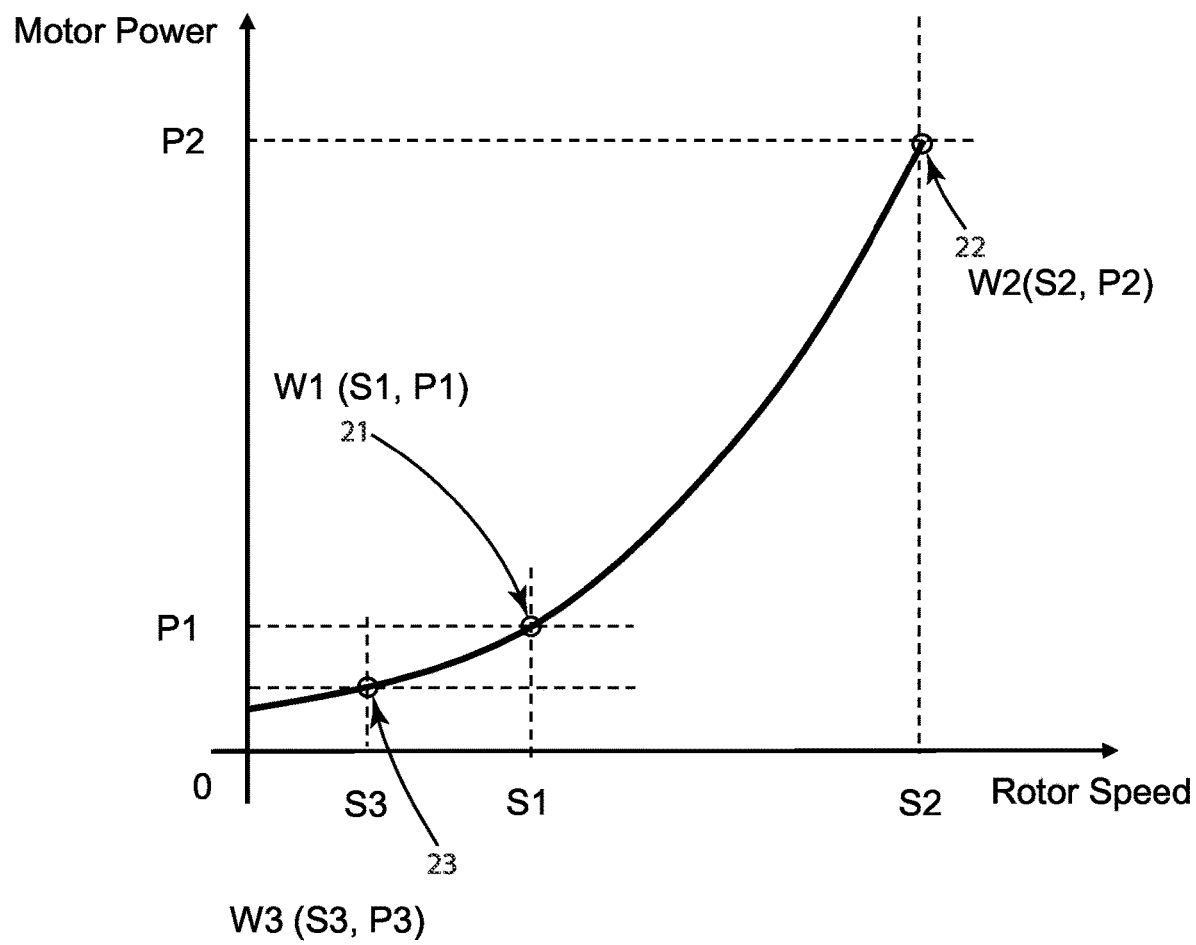
FIG. 5 illustrates a motor output power versus speed curve for a commercial fan load.

FIG. 5 shows one example of a stator power (e.g. stator voltages or stator currents) versus rotor speed characteristic curve for a commercial fan drive. The curve charts rotor speed (x-axis) for various stator power values (y-axis).

At low speeds, the fan blades 11 do not produce much pressure to move air and thus a small amount of power from the PMSM 12 results in a relatively large change in speed. As the motor speed increases, the power demand on the PMSM 12 to drive the fan blades 11 increases in an approximately exponential relationship until a certain target speed or a limit is reached. In the depicted embodiment, the output power is limited is at working point W2 (S2, P2) 22.

Low speed generally refers to speeds below the speed of working point W1 (S1, P1) 21. In one embodiment, working point W1 is at about 200 to 300 RPM (S1), which is about 3-5% of its rated power against the system friction, drag torques, and other relevant forces. Speeds above the speed of working point W1 until working point W2 can generally be referred to as working speeds. In one embodiment, working point W2 is at about 2000 RPM (S2), which is at or about the rated power or maximum power the motor can reach. Although the W2 speed may not be absolute maximum speed, it can be referred to as the maximum speed and maximum operating power for acceptable motor operation. W2 may also be referred to as an output limited point.

In accordance with embodiments of the present disclosure, different control speed control logic may be utilized during different portions of the power-speed characteristic curve. For example, different control methods can provide superior system protection, monitoring, and efficiency at different speed levels. In one embodiment, the working point W3 (S3, P3) corresponds to a point below working point W1. While above working point W3 speeds until the motor reaches about working point W1 speed, the back-EMF values may still be quite small, they are not sufficiently reliable for generating an accurate speed estimate. In one embodiment, working point W3 speed is at or between 20 to 40 RPM (S3).

Below or around working point W3, the inability to control the motor based on control logic that relies on back-EMF can make it a challenge to operate a sensorless IPMSM precisely at very low speeds, i.e., speeds less than those associated with the working point W3.

Additionally, at the other end of the graph, the saturation of the power inverter can impact motor control at high speeds. At a certain power output, the motor's permanent magnet control system inverters will become saturated. That is, as the motor speed is increases, the motor the output power is increased, which causes the back-EMF to increase accordingly. At some point, the motor will reach a point where further increases to output power cannot be achieved because the inverter is saturated. This is where the back-EMF is essentially high enough relative to the available voltage that, the motor control inverter 441 is saturated because it is not able to produce additional current to generate additional torque.

The motor controller can be programmed with a flux weakening control strategy in order to maintain target torque even at high speeds (e.g., at or above W2 speeds). This control can account for a restricted voltage supply condition due to possible unstable power supply in field. Commercial fan and blower drives do not have a constant power-speed characteristic curve like typical spindle drives. However, commercial fan and blower drives can utilize certain flux weakening control strategies to achieve satisfactory motor control at high speeds, even under unstable rated voltage supply condition, as will be discussed later in more detail below.

In the next sections further details are provided about embodiments of a control scheme that can be implemented, for example in commercial and industrial fan and blower drives, to achieve robust motor control over the entire operating speed range under severe working conditions in field.

I. Sensorless Dynamic Direct Flux Control

One aspect of the present disclosure, which can be referred to as dynamic direct flux control ("DDFC"), is generally directed to a system and method where a d-axis component command voltage is calculated based on a comparison of estimated stator flux and target or reference stator flux, while a q-axis component command voltage is calculated based on a comparison of estimated q-axis stator current and target or reference q-axis current.

This configuration leverages aspects of multiple legacy control schemes, such as field-oriented control ("FOC") and direct torque control ("DTC") overcoming many of their disadvantages. A detailed discussion of an example of DDFC follows.

According to the well-known frame transformation theory, the motor voltage, current, and flux stator vectors, are represented by $\bar{v}$, $\bar{i}$ and $\bar{\lambda}$ respectively. The adopted vector reference frames are defined in FIG. 6, which illustrates a radial interior permanent magnet synchronous motor ("IPMSM") 30. Specifically, the IPMSM of FIG. 6 includes the following reference frames: stationary frame (α-β), 31, rotor frame (d-q) 33, stator flux frame ($d_s$-$q_s$) 32, and three-phase winding reference frame (abc).

Figure 6:
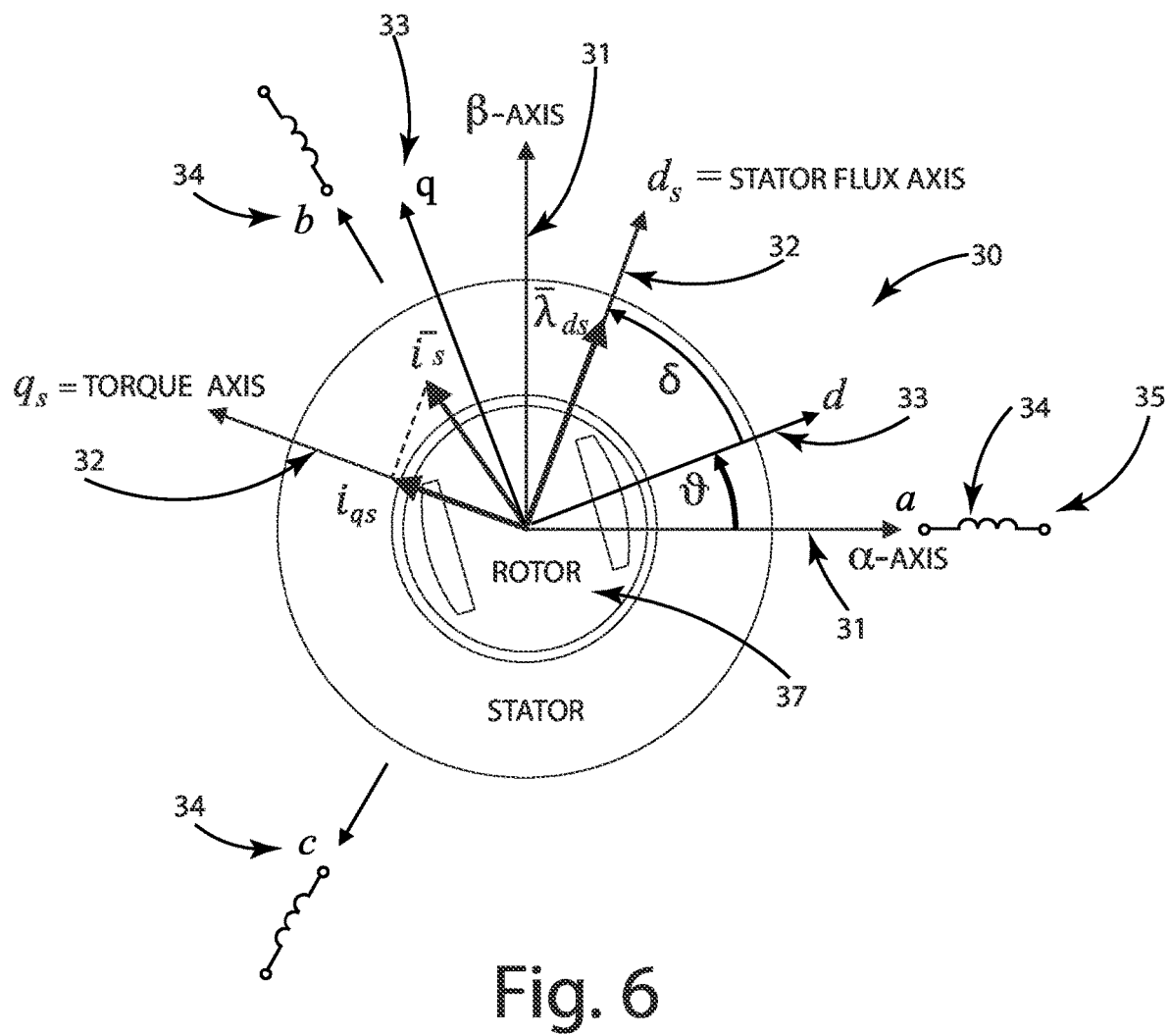
FIG. 6 depicts several reference frame systems including the direct-quadrature stator reference frame, the direct-quadrature rotor reference frame, the stationary reference frame, and the three-axis reference frame.

A typical field-oriented control ("FOC") method involves motor torque control or motor speed control through d-q axis current controls that are based on the synchronous rotor frame 33 illustrated in FIG. 6. Although FOC performs decently at low-speed ranges with well-developed empirical compensations, it is generally unworkable at higher speed ranges because of motor parameter variations.

One of the main reasons that motor parameters vary from their normal values is because of the environment where the motor is installed. For example, winding back-EMF, resistances and inductances can change drastically based on temperature. Empirical compensations for motor parameters are generally developed in an ideal environment or at least a fixed or certain environment. However, real-world operating environments are not necessarily ideal, fixed, or certain, especially in commercial or industrial fan and blower applications, which might be installed in a roof or otherwise exposed to the elements. For example, varying and/or severe environments, such as fluctuating or extreme temperatures, can cause motor parameters (or other terms based on motor parameters) to vary from values stored in memory.

When control algorithms programmed in software rely on the empirical values stored in memory that do not match the real-world values, the control algorithm may not operate efficiently or effectively and instead may lead to inaccurate calculations of control variables. Further, issues due to variance between real motor parameters and those stored in memory can be exacerbated at certain motor speeds due to the non-linear impacts. For example, as the speed increases, the load and current become larger, and the motor parameters, such as motor inductances $L_d$, $L_q$ (or other parameters based on those values), become inaccurate due to nonlinearity.

Some motor parameter variance may not impact the control loops themselves. For example, voltage often is not inside current control loops in some motor control methods. However, stator voltage changes due to motor parameter variation can still impact the control because voltage (or another characteristic impacted by motor parameter variation) can be a limitation based on voltage limited equations that depend on motor parameters. For example, in FOC, assumptions are made about stator voltages in setting up motor parameter equations. Consequently, when those assumptions do not hold true, FOC can fail or become unreliable, making FOC face more challenges and difficulties in commercial fan and blower drive applications where severe working conditions are more commonplace.

Direct Torque Control (DTC) controls voltage directly through motor torque production. Which leads to less dependence on motor parameters while the motor is operating in the high-speed range. However, DTC has significant disadvantages that make it unworkable as a replacement. For example, it does not perform well at low speeds and can have system stability issues that need unique treatment for applications in commercial and industrial situations.

Embodiments of DDFC address these shortcomings to overcome the drawbacks of both control schemes while leveraging their advantages. Where control of motor torque production is desired, stator flux is a useful control variable because it is directly linked to torque production, stator voltage, and stator currents in real-time. Torque control can also be useful for torque and speed control as well. DDFC incorporates both control of flux through stator voltage control and control of torque through stator current control.

A. IPM Magnetic Motor Model Based on the Stator Flux Reference Frame

The current embodiment of the present disclosure relies, in part, on a current model of the motor (also commonly referred to as a magnetic model or magnetic motor model) in the stationary reference frame (α-β) 31, as shown in FIG. 6. For interior permanent magnet ("IPM") motors, the voltage equation and the electromagnetic torque expression in the stationary reference frame (α-β) 31, are:

$$v_{\alpha\beta} = R_s \cdot \bar{i}_{\alpha\beta} + \frac{d\lambda_{\alpha\beta}}{dt} \qquad (1)$$

$$T_e = \frac{3}{2} \cdot p \cdot (\lambda_\alpha \cdot i_\beta - \lambda_\beta \cdot i_\alpha) \qquad (2)$$

Where $R_s$ is the stator resistance, the p is the pole-pair number.

The magnetic motor model can couple the currents with the rotor flux field impact, which allows the magnetic flux experienced by the rotor to be expressed in terms of stator currents. For IPM motors, it is convenient to define the magnetic model in the rotor frame (d-q) 33 (see rotor current model 167 in FIG. 11) as $$\lambda_{dq} = [L] \cdot \begin{bmatrix} i_d \\ i_q \end{bmatrix} + \begin{bmatrix} \lambda_m \\ 0 \end{bmatrix} = \begin{bmatrix} \lambda_d(i_d, i_q) \\ \lambda_q(i_d, i_q) \end{bmatrix} \qquad (3)$$

Where $\lambda_m$ is the magnet flux linkage, i.e. the linkage produced by the magnets.

By neglecting cross-saturation effects, the magnetic model Eq. (3) can be written in the simplified form as $$\lambda_{dq} = \begin{bmatrix} L_d & 0 \\ 0 & L_q \end{bmatrix} \cdot \begin{bmatrix} i_d \\ i_q \end{bmatrix} + \begin{bmatrix} \lambda_m \\ 0 \end{bmatrix} \qquad (4)$$

Where $L_d$ is the motor d-axis inductance, while $L_q$ is the motor q-axis inductance.

If the rotor position is ϑ in FIG. 6, then the magnetic model in stationary reference frame (α-β) 31 can be obtained as $$\lambda_{\alpha\beta} = A(-\vartheta) \cdot \lambda_{dq} = A(-\vartheta) \cdot \left\{ \begin{bmatrix} L_d & 0 \\ 0 & L_q \end{bmatrix} \cdot A(\vartheta) \cdot \begin{bmatrix} i_\alpha \\ i_\beta \end{bmatrix} + \begin{bmatrix} \lambda_m \\ 0 \end{bmatrix} \right\} \qquad (5)$$

Where $$A(\vartheta) = \begin{bmatrix} \cos(\vartheta) & \sin(\vartheta) \\ -\sin(\vartheta) & \cos(\vartheta) \end{bmatrix}$$

In the stator flux reference frame $(d_s\text{-}q_s)$ 32, the voltage model and the electromagnetic torque can be expressed as $$v_{dqs} = R_s \cdot \bar{i}_{dqs} + \frac{d}{dt}\begin{bmatrix} \lambda \\ 0 \end{bmatrix} + \lambda \cdot \begin{bmatrix} 0 \\ \omega + \frac{d\delta}{dt} \end{bmatrix} \qquad (6)$$

$$T_e = (3/2) \cdot p \cdot \lambda \cdot i_{qs} = k_T i_{qs} \qquad (7)$$

$$k_T = (3/2) \cdot p \cdot \lambda \qquad (8)$$

Where, ω is the rotor speed and δ is the load angle defined as stator flux position $d_s$-axis with respect to the rotor d-axis in FIG. 6.

From Eq. (6), the stator flux vector magnitude λ can be directly regulated by the $d_s$-axis voltage, while the load angle δ and consequently the torque can be controlled through the $q_s$-axis voltage. However, Eq. (7) shows that the control of the $q_s$-axis current is directly related to the torque control. The torque coefficient $k_T$ is directly regulated by the stator flux vector magnitude λ and thus by the $d_s$-axis voltage as shown in Eq. (8).

Motor stator vectors including voltage, current, and flux vectors are represented by $\bar{v}_s$, $\bar{i}_s$, and $\bar{\lambda}_s$ respectively. The adopted vector reference frames are defined in FIG. 6 for a generic radial IPM are as follows: stationary frame (α-β) 31, rotor frame (d-q) 33, and stator flux frame $(d_s\text{-}q_s)$ 32. The subscript "s" used for the vectors will refer to the stator flux reference frame. In addition, the real-time (abc) 34 frame is also added into the frame systems.

A DDFC method may be implemented generally with reference to the stator flux vector frame $(d_s\text{-}q_s)$, illustrated in FIG. 6. In particular, the DDFC method computes two voltage vector components: the target $d_s$-axis voltage $v_d^*$ and the target $q_s$-axis voltage $v_q^*$. In particular, this implementation of DDFC provides for the following:

The stator flux magnitude is directly regulated by the $d_s$-axis voltage component. That is, the $d_s$-axis component of the target voltage $v_d^*$ produced by the DDFC method (which is used together with the $q_s$-axis component of the target voltage $v_q^*$ to control power supply to the stator) can be calculated based on stator flux magnitude error. The $d_s$-axis 32 becomes the flux axis $\bar{\lambda}_{ds}$ as shown in the FIG. 6.

The torque is regulated by the $q_s$-axis current component. That is, the $q_s$-axis component of the target voltage $v_q^*$ produced by the DDFC method (which is used together with the $d_s$-axis component of the target voltage $v_d^*$ to control power supply to the stator) can be calculated based on torque error (e.g. difference between target q-axis stator current $i_{qs}^*$ and an estimate of actual q-axis stator current component (converted from the real-time current $\bar{i}_{abc}$ provided by rotor current sensors). The $q_s$-axis 32 becomes the torque axis $\bar{i}_{qs}$ as shown in the FIG. 6.

Figure 7:
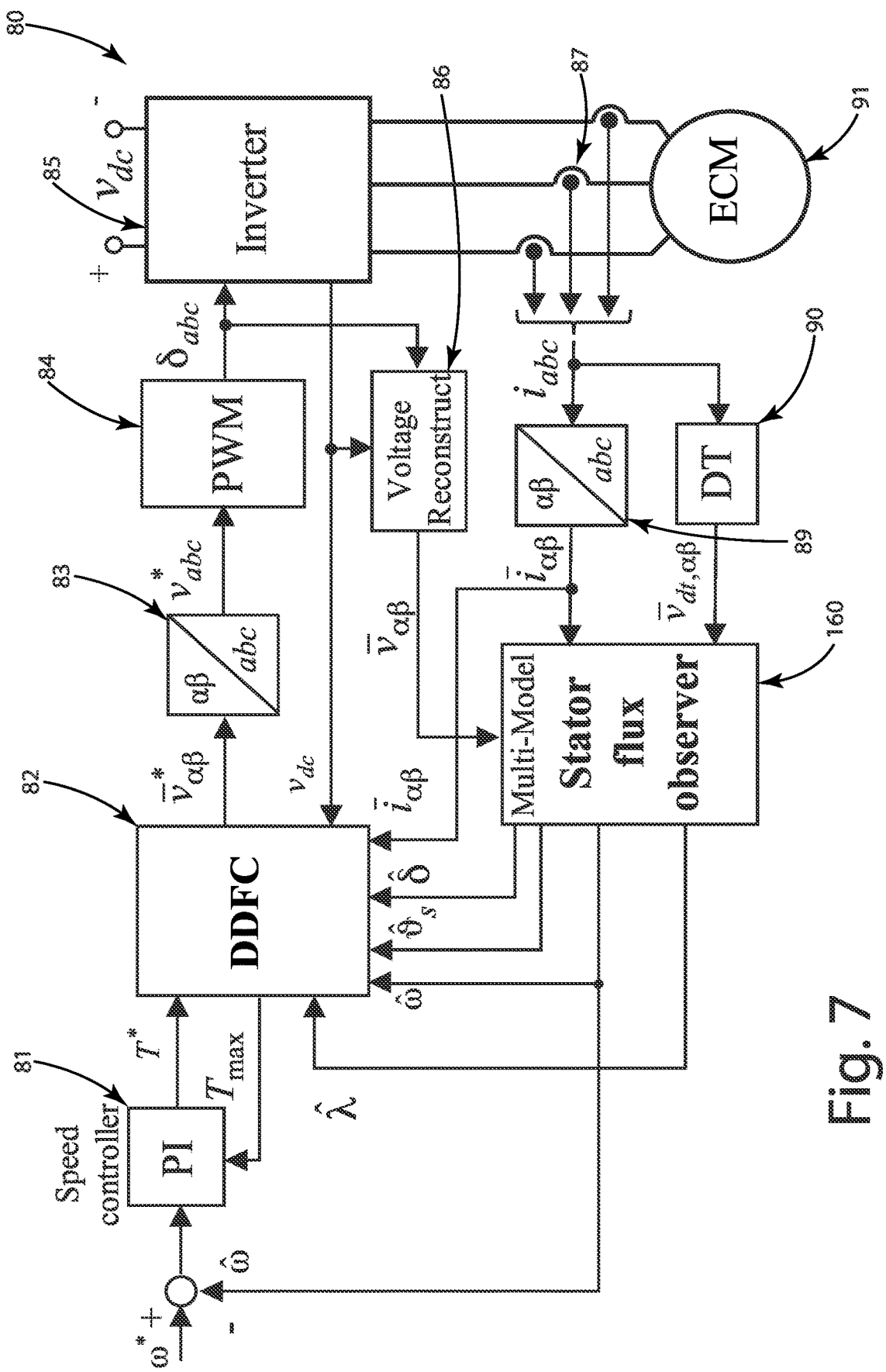
FIG. 7 illustrates a sensorless permanent magnet motor dynamic direct flux control ("DDFC") system diagram showing representative functional blocks.

FIG. 7 illustrates an exemplary sensorless permanent magnet motor control system diagram 80 showing representative functional blocks 80. A Proportional-Integral (PI) controller 81 acts as a speed controller, having inputs of the speed error, defined as the difference between target speed $\omega^*$ and estimated rotor speed $\hat{\omega}$, and the maximum torque $T_{max}$ as a limit, and having an output torque reference $T^*$. The DDFC control block 82 will be introduced in more detail below. A frame transformation 83 transforms a voltage from the stationary frame ($\alpha$-$\beta$) 31 to the real-time three-phase frame (abc) 34. A pulse-width modulation ("PWM") generator 84 controls a power supply 85. A voltage feedback reconstruction circuit 86 transforms the voltage from the real-time three-phase frame (abc) 34 into the stationary reference frame ($\alpha$-$\beta$) 31, $\bar{v}_{\alpha\beta}$. A stator flux observer 160 will be introduced in more detail below. A frame transformation 89 transforms a current from the real-time three-phase frame (abc) 34 to the stationary frame ($\alpha$-$\beta$) 31. A three-phase current sensor 87 provides feedback for the flux observer 160. A Dead-Time compensation table 90 is a compensation table for the inverter 85 and in one embodiment is a Look-Up-Table (LUT) with empirical values. An ECM motor 91 is electrically connected to the three-phase current sensor 87 and inverter 85.

B. The DDFC Control Block 82

The DDFC control block 82 represents the inner motor control scheme regulating the torque and the flux. The torque reference $T^*$ is generated by an external or outer speed regulation loop that is implemented with a Proportional-Integral (PI) controller 81 and is an input to the DDFC control block 82. The outputs of the DDFC control block 82 are the command voltage vector $\bar{v}_{\alpha\beta}^*$ in the stationary reference frame 31 of FIG. 6 and the maximum torque that the motor can generate $T_{max}$, under the restriction of the current limit and available voltage. The maximum torque $T_{max}$ can be fed back into the PI controller 81 and is used by its anti-wind-up mechanism.

Figure 8:
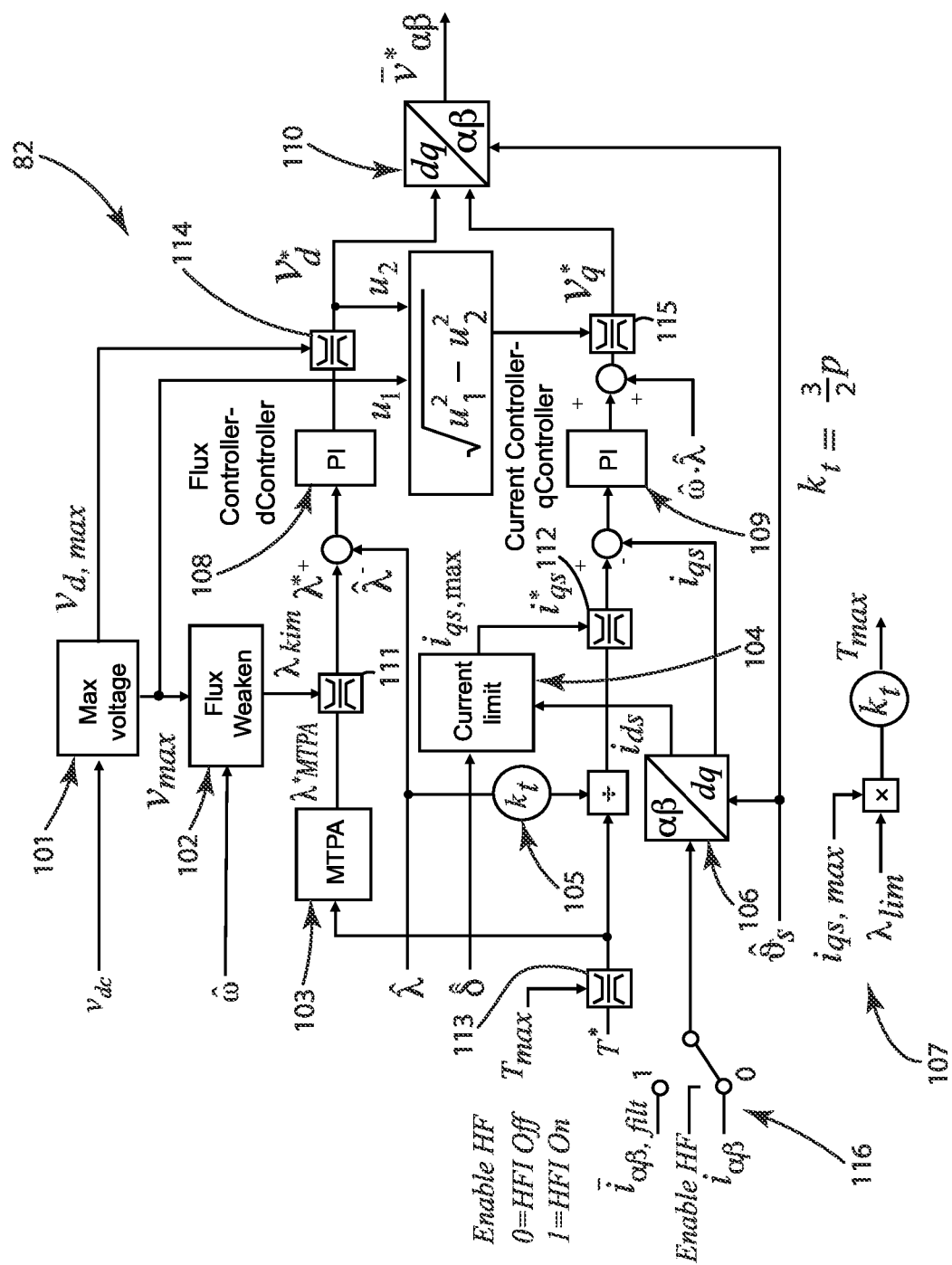
FIG. 8 illustrates an exemplary embodiment of a controller implementing direct flux control showing representative functional blocks with inputs, output control vector variables, and control logic.

As shown in FIGS. 7-8, the DDFC control block 82 utilizes the following inputs or feedback parameters:

Estimated magnitude $\hat{\lambda}$: a stator flux linkage vector that is provided by the stator flux observer 160;

Estimated electrical rotor speed $\hat{\omega}$: provided by the stator flux observer 160;

Estimated position $\hat{\vartheta}_s$: a stator flux linkage magnitude in the stationary reference frame ($\alpha$-$\beta$) 31 that is provided by the stator flux observer 160;

Measured current vector $\bar{i}_{\alpha\beta}$: in the stationary reference frame (a-ft) 31; and Measured inverter DC link voltage $v_{dc}$: provided by the DC bus voltage feedback from the inverter 85.

FIG. 8 illustrates an exemplary implementation of a DDFC system and method 82 using representative functional blocks with inputs, output control vector variables, and control logic. The DDFC system 82 includes two PI control loops, the first is a flux control loop 108 and the second is a torque control loop 109. The DDFC system 82 uses a dual-loop control approach. The flux controller 108 outputs a d-axis component of a correction voltage by comparing a target stator flux linkage magnitude $\hat{\lambda}^*$ (derived from the desired torque $T^*$, estimated speed $\hat{\omega}$, and available voltage $v_{dc}$) to an estimated stator flux linkage magnitude provided by the stator flux observer. The torque controller 109 outputs a q-axis component of a correction voltage by comparing a target q-axis stator current derived from the desired torque $T^*$ and the actual q-axis component of the stator current, which can be derived from the available three-phase stator currents (abc). The current controller and flux controller can be referred to as a qController and dController, respectively. Collectively, they may be referred to as a universal dqController. In short, the DDFC method utilizes the qController and the dController to carry out torque control and stator flux control, with their results being combined into a single voltage command for the motor to adjust the motor operation toward the target torque and target stator flux linkage.

Stator flux linkage directly links with both the magnetic field system and the electric circuit system. From the magnetic field side, the flux linkage $\lambda$ interacts directly with the q-axis current $i_{qs}$ to generate the torque Eq (7). In the electric circuit side, the flux is a variable of the voltage equation Eq (6). The torque production is rewritten here, $$T = k_T \cdot i_{qs} = \frac{3}{2} \cdot p \cdot \lambda \cdot i_{qs} \qquad (9)$$

Where, p is the pole-pairs number; $\lambda$ is the stator flux magnitude and $i_{qs}$ is the $q_s$-axis current component. $k_T$ is the torque coefficient or flux linkage. The voltage equation is $$v_{dqs} = R_s \cdot \bar{i}_{dqs} + \frac{d}{dt}\begin{bmatrix}\lambda \\ 0\end{bmatrix} + \lambda \cdot \begin{bmatrix} 0 \\ \omega + \frac{d\delta}{dt}\end{bmatrix} \qquad (10)$$

Where, $\omega$ is the rotor speed and $\delta$ is the load angle defined as stator flux position $d_s$-axis with respect to the rotor d-axis in FIG. 6. That is, load angle refers to the angle difference between the stator axis and rotor pole axis of the synchronous motor.

Accordingly, the DDFC method enables both direct flux control as well as voltage control, as described in more detail below.

DDFC—Torque Control: In DDFC, torque is controlled by controlling two variables, the stator flux magnitude $\lambda$ and the $q_s$-axis current component $i_{qs}$, see Eq (9). Both are scaler variables that are calculated on the basis of the real-time feedback of hardware sensing circuits. Thus, the accuracy of the flux calculation can be obtained from either the magnetic model or the actual voltage integral even though the non-linearity exists. High torque control performance can be achieved in terms of both the precision and dynamic response in the entire speed range. Therefore, the DDFC directly controls the torque and speed.

This is in stark contrast to FOC where torque control is indirectly achieved by controlling both dq-axis current components $i_d$ and $i_q$. Despite both current components being well controlled, the torque is not well controlled. This is because FOC torque calculation relies on currents and stator inductances that are under the influence of motor parameter variation as well as nonlinearity. As mentioned previously, the FOC torque calculation requires compensations due to the parameter nonlinearity. The dynamic performance also suffers because the current controls delay the torque responses due to the indirect torque control.

DDFC—Voltage Control: The voltage integral in the voltage model portion of the flux observer is essentially a direct flux calculation because it is based on voltage sensing hardware circuits (e.g. voltage reconstruct 86). So, at high speed, the voltage as a variable is inside the control loop in real-time control. This allows DDFC to fully utilize the available voltage under the restricted voltage operational conditions including MTPV control. This provides superior torque production capability under the limited voltage. In contrast with FOC, at high speed, FOC current control is incapable of accommodating a voltage limit in order to work around inverter saturation.

DDFC MTPA, Flux Weakening, AND MTPV

At starting and low speed range, many factors, such as motor parameters, saturation, flux variation, and others can affect motor torque production and therefore affect performance. However, there is a control trajectory to achieve a suitable, perhaps optimal, control criteria. It is referred to as the Maximum Torque Per Ampere ("MTPA") 103. In practice, MTPA 103 can be implemented as a look-up table ("LUT"). Values for the table can be obtained and stored during manufacture while the permanent magnet motor is being designed and developed. In essence, MTPA converts a torque reference T* into a flux reference to achieve MTPA operation. MTPA can accommodate the nonlinearity of parameters under certain working conditions.

The MTPA flux may not be suitable at high speeds where the inverter is at or near saturation. Specifically, the flux may need to be further limited for high-speed control issues. The flux weaken block 102 can calculate a flux limit based on estimated motor speed and the maximum voltage block, 101 output. As motor speed increases, the motor back-EMF increases until reaching a point where there is no available voltage to increase further. In this case, the power supply or inverter is not able to produce additional current to generate additional torque. This is referred to as inverter saturation. Motor torque production will return once the stator current at the $d_s$-axis reference current component demagnetizes the motor magnet flux to weaken or limit the rotor permanent magnet flux 102.

Starting discussion from the torque control for the low-speed range, the motor torque equation (7) in ($d_s$, $q_s$) stator flux vector coordinates is $$T = \frac{3}{2} \cdot p \cdot \lambda \cdot i_{qs} \quad (11)$$

Where, p is the pole-pairs number; $\lambda$ is the stator flux magnitude and $i_{qs}$ is the $q_s$-axis current component.

The output of Max voltage 101 is the maximum available voltage $V_{max}$. Then in the Flux Weaken block 102, the flux limit value $\lambda_{lim}$ is computed according to the available voltage as $$\lambda_{lim} \cong \frac{V_{max}}{\hat{\omega}} \quad (12)$$

Where, $$V_{max} = \frac{v_{dc}}{\sqrt{3}}$$

is the maximum available voltage provided by the inverter. $\hat{\omega}$ is the estimated speed.

The flux limitation to the value computed with (11) is called flux-weakening control. Once the final flux reference is obtained, the $q_s$-axis reference current component is calculated from (8)

$$i_{qs}^* = \frac{T^*}{\frac{3}{2} \cdot 2p \cdot \lambda^*} \quad (13)$$

Figure 10:
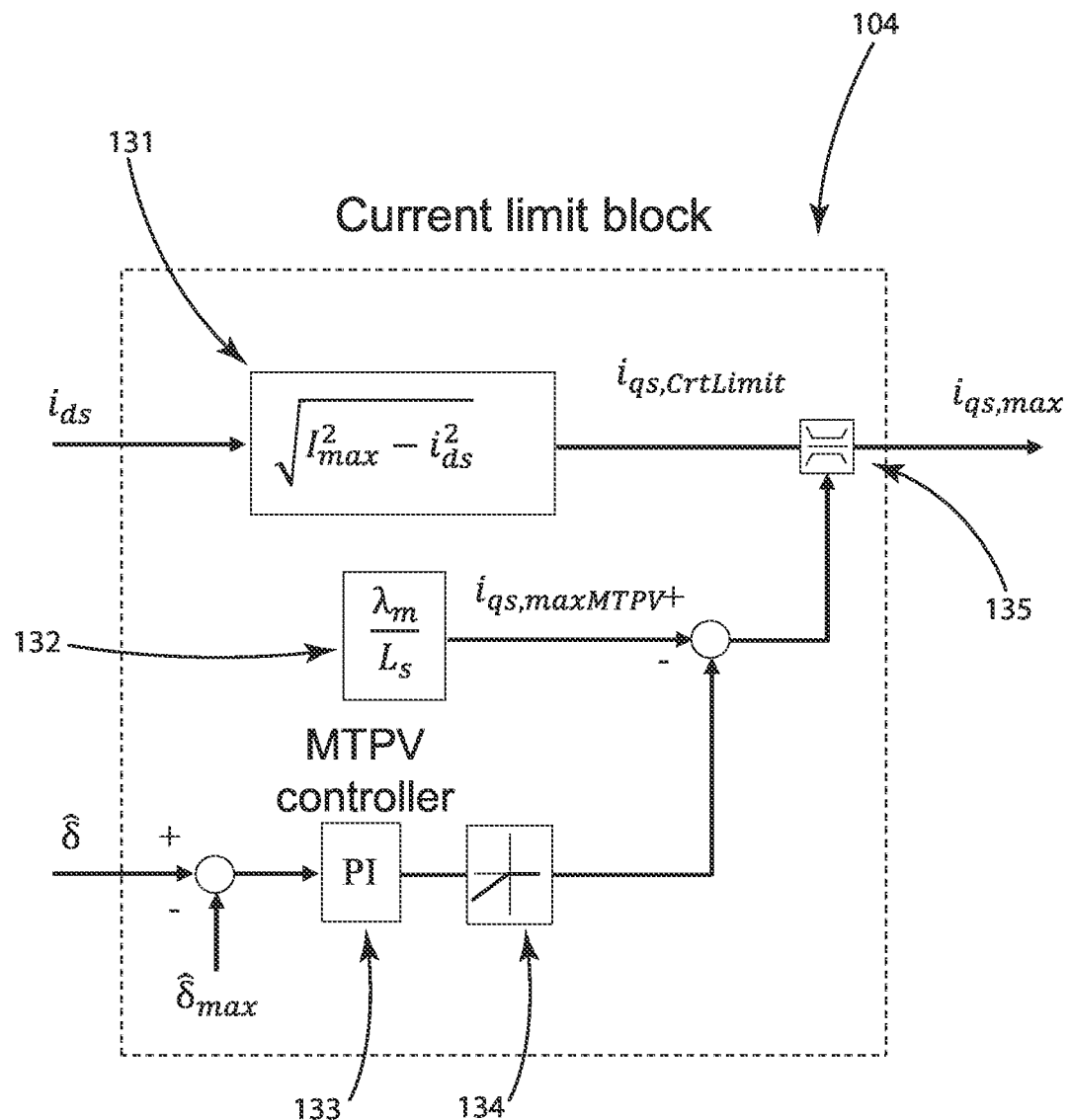
FIG. 10 illustrates a current limit functional block diagram.

The limit of the torque current component $i_{qs,max}$, output of block 104 is computed by taking two different limits into account. FIG. 10 is a detailed control diagram.

The Maximum inverter current $I_{max}$, 131.

$$i_{qs,CrtLimit} = \sqrt{I_{max}^2 - i_{ds}^2} \quad (14)$$

The Maximum inverter current is $I_{max}$, 131, where the $i_{ds}$ current is the $d_s$-axis current component that depends on the flux regulation. The $I_{max}$ is the maximum current the inverter could handle.

A maximum torque per volt ("MTPV") limit can be applied during voltage control with a current limit block 104. The torque for a synchronous permanent magnet motor can be expressed as $$T = \frac{3}{2} \cdot p \cdot \frac{\lambda_m}{L_s} \cdot \lambda \cdot \sin\delta \quad (15)$$

Where, $\lambda_m$ is the magnetic flux linkage while $\delta$ is the load angle, i.e. the angle between the stator flux vector $d_s$-axis and the magnetic flux linkage vector d-axis (See FIG. 6). The $L_s$ is the stator leakage inductance.

MTPV operation can be activated at or near where the load angle reaches a maximum or threshold value, typically 90 electrical degrees. Given the magnetic flux linkage $\lambda_m$, the MTPV torque depends on the stator flux level that is essentially imposed by the operating voltage:

$$T_{MTPV} = \frac{3}{2} \cdot p \cdot \frac{\lambda_m}{L_s} \cdot \lambda \cdot \sin\delta_{max} = \frac{3}{2} \cdot p \cdot \lambda \cdot \frac{\lambda_m}{L_s} = \frac{3}{2} \cdot p \cdot \lambda \cdot i_{qs,maxMTPV} \quad (16)$$

From (16) the maximum current for MTPV operation 132 can be obtained as shown in the current limit block FIG. 10 as $$i_{qs,maxMTPV} = \frac{\lambda_m}{L_s} \quad (17)$$

The MTPV current limit can be further limited with an additional PI controller 133 that checks the load angle that is provided by the flux observer. If the load angle exceeds a threshold or maximum value, then the MTPV current limit is further decreased, as shown in FIG. 10. Typically, the maximum load angle value is a predetermined value known from the motor manufacturing process. Otherwise, it can be obtained experimentally through trial-and-error. The block 134 is a ramp up limit controller and block 135 is a both-direction limit controller.

It is worth noting that not all motors include MTPV current limitation. In some cases, current limitation can be simplified and may only utilize a limit computed with Eq. (14) and shown in block 131 of FIG. 10. Different motor embodiments can implement MTPV limitation differently, or not at all, depending on what is suitable for a particular application.

The application of MTPA and MTPV to DDFC will now be discussed in detail.

As shown in FIG. 8, DDFC can accommodate a maximum torque per ampere trajectory ("MTPA") limit. That is, the DDFC can adjust the target or reference flux based on the estimated motor speed. Accordingly, the DDFC can control the stator flux prior to reaching a voltage threshold or limit. The MTPA flux value can be obtained from a look-up table stored in memory. The value can be stored in memory during manufacture and obtained during motor design, testing/verification, or another stage.

At or near where the speed reaches the voltage limit, the DDFC can trigger the maximum torque per volt ("MTPV") current limit 104, as depicted in FIG. 8. The current limit block 104 is shown in more detail in FIG. 10. The maximum voltage within the maximum current limit (17) is provided by the current limit block 104. The maximum current $i_{qs,max}$ 132 defines a boundary for the torque control at the high-speed range with the minimum current under the maximum voltage useability.

In general, the current limit block 104 limits the stator q-axis current based on the d-axis current and an MTPV constant.

Therefore, both the MTPA and MTPV control strategy provide suitable control over the entire operational speed range such that the system can deliver suitable performance under expected operating conditions.

Several additional features of DDFC control will now be discussed in detail. These additional features help the system to achieve robust control from motor start to any speeds in the whole operational speed range.

Motor Startup Control—Universal dqControllers Based on DDFC

A variety of different motor starting control methodologies can be implemented in connection with DDFC. For example, essentially any of the popular motor startup control methods can be included. Several of the popular motor startup control methods involve starting the rotor from zero speed with an open loop control and then adjusting to closed loop control once a threshold speed is reached.

Further, several embodiments and aspects of closed loop starting methods are discussed in U.S. application Ser. No. 16/795,074, entitled SYSTEM AND METHOD FOR INTERIOR PERMANENT MAGNET SYNCHRONOUS MOTOR CONTROL FROM ZERO OR LOW SPEED, filed on Feb. 19, 2020, to Bojoi et al., and U.S. application Ser. No. 16/984,267 to Bojoi et al., filed on Aug. 4, 2020, entitled "ROBUST STARTING SYSTEM AND METHOD FOR INTERIOR PERMANENT MAGNET SYNCHRONOUS MOTOR CONTROL", which were both previously incorporated by reference in their entirety. Essentially any of the various embodiments, aspects, or features to be integrated into a DDFC system in accordance with the present disclosure. Some of these can provide a systematic method to conduct closed loop control in the entire speed range to reach robust starting from any possible initial statuses to the operational speed. Further, the '267 application discusses Universal dqControllers that can transition control from a starting mode into an operating mode. Other features described in these applications can be implemented in connection with a DDFC including the zero- or standstill starting process and dynamic high frequency injection method, to name a few exemplary features.

Figure 9:
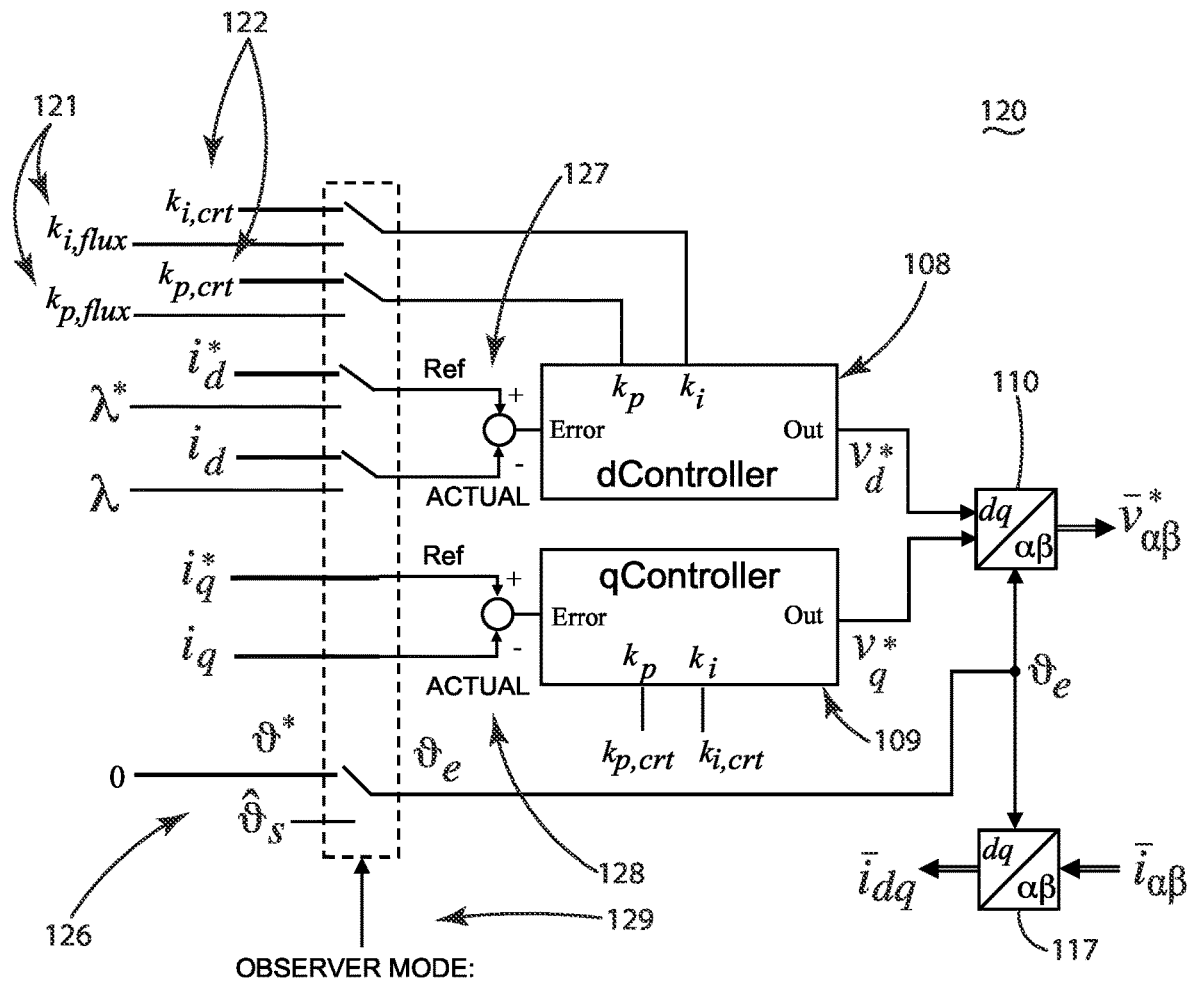
FIG. 9 illustrates universal dq-controllers, showing the current and flux control switching statuses.

FIG. 9 illustrates a simplified version of DDFC 120 to aid in explanation of the motor control, largely focused on startup motor control. The reference rotor position/speed states are shown at the 126. The observer mode flag 129 triggers the switches for switching between current control and flux control. In essence, the dqController includes two proportional integral controllers operating as follows:

(1) During the Observer-Disengaged Starting (ObserverMode=0):

The dController is configured as a current controller and the qController is a current controller whose respective inputs are error values 127, 128 obtained from comparison of (d,q) reference and actual currents. The controller gains are $k_{p,crt}$ and $k_{i,crt}$, 122. The position $\varepsilon_e$ used for all rotational transformation can be in two different values 126 as follows:
  (a) Zero—the current control becomes a stationary $(\alpha,\beta)$ current control scheme since $i_d=i_\alpha$ and $i_q=i_\beta$.
  (b) A reference position $\vartheta^*$ obtained from the integration of a reference electrical speed.

(2) When the Observer-Engaged Starting (ObserverMode=1):

The dController is configured as a flux controller employing the gains $k_{p,flux}$ and $k_{i,flux}$, 121, while the input is changed to the error value between the reference and actual (e.g. estimated stator flux provided by a stator flux observer) stator flux. The position used for all rotational transformation is the estimated stator flux position provided by the flux observer.

Therefore, the dqControllers concept represents a Universal dqControllers in terms of the two aspects. The first when the speed is low, zero speed or a few Rpm, the ObserverMode=0, the current controls are engaged with the reference position obtained from the integration of a reference electrical speed. On the other hand, the second, as soon as the speed reaches at a certain speed, the ObserverMode=1, then the flux controls are activated in the flux observer to estimate the rotor position and speed for high-speed operation.

The voltage commands output from the dqController 108, 109 can be limited with limiters 114, 115 and provided to a frame conversion 110 from a rotor reference frame (d-q) to a stationary frame ($\alpha$-$\beta$), as shown in the FIG. 9 exemplary DDFC block diagram 82. The conversion can utilize the active flux rotor position angle $\hat{\varepsilon}_s$ provided by a stator flux observer, such as the multi-model stator flux observer 160 shown in FIGS. 7 and 11 or the DHFI-multi-model stator flux observer 880 shown in FIGS. 12 and 13. The rotor position angle can also be utilized in a rotor reference frame to stationary frame conversion 117 with respect to the stator current.

C. Multi-Model Stator Flux Observer

Figure 11:
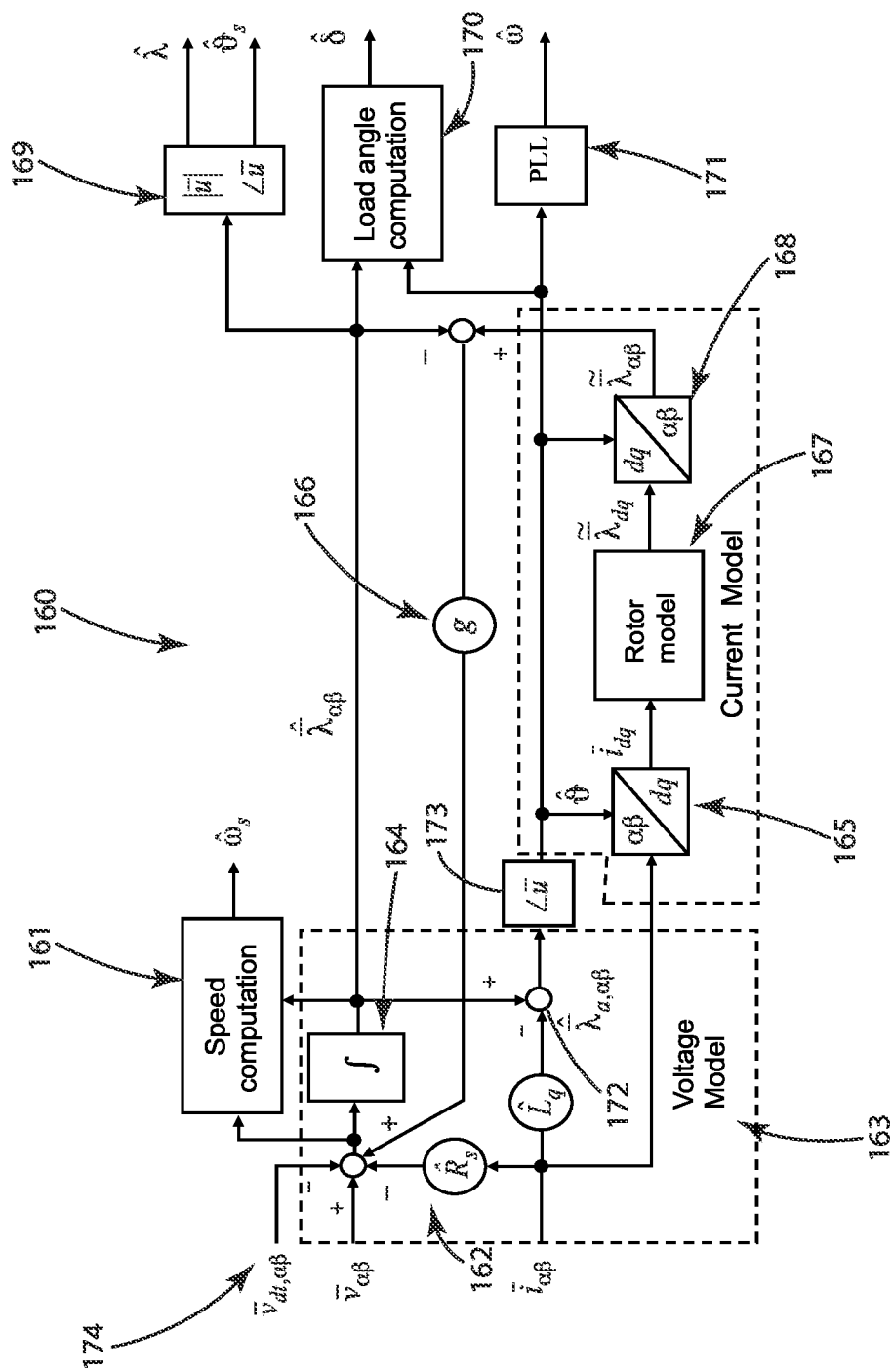
FIG. 11 illustrates an exemplary multi-model stator flux observer functional block diagram.
Figure 13:
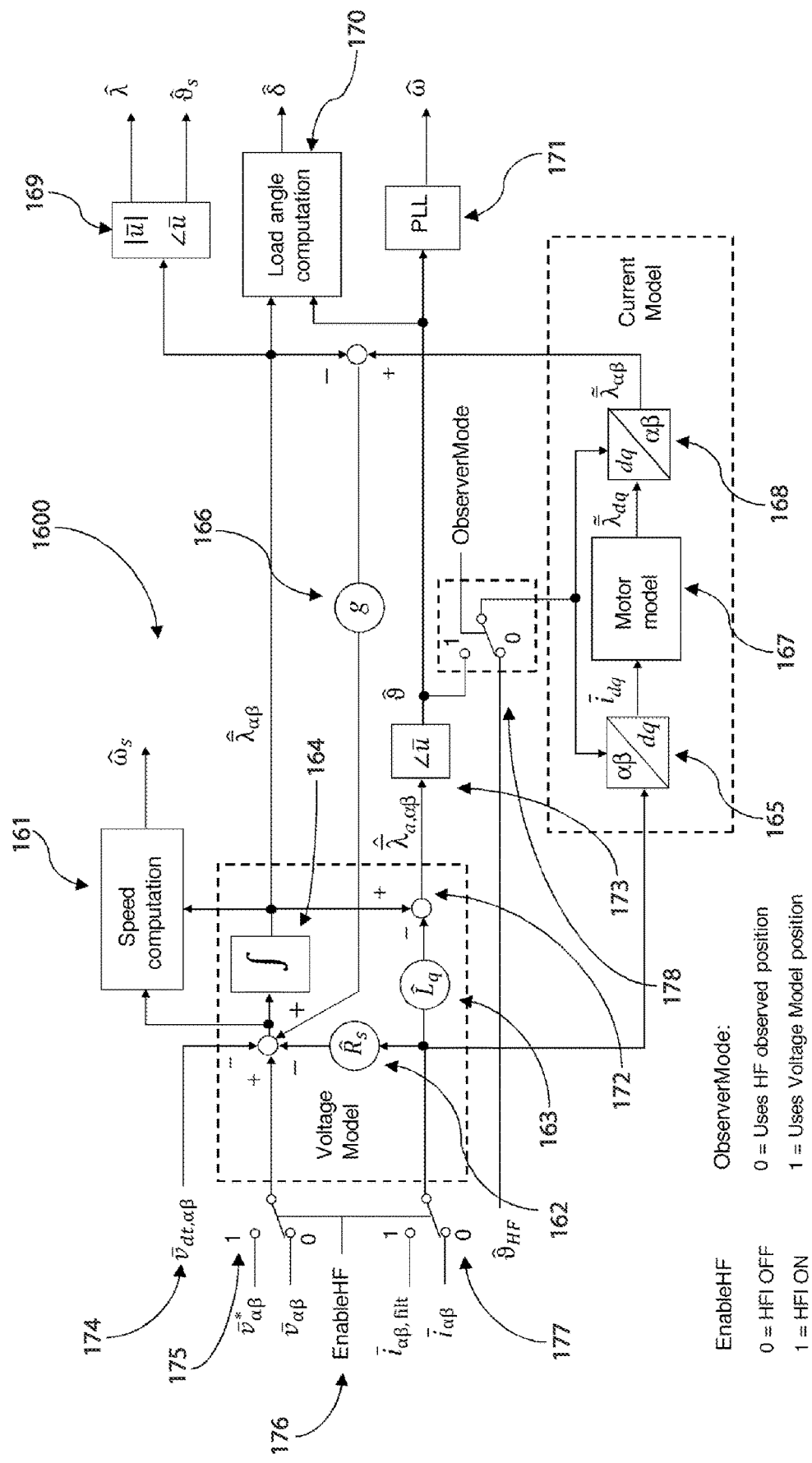
FIG. 13 illustrates another exemplary multi-model stator flux observer functional block diagram.

Generally, any sensorless synchronous permanent magnet motor control obtains the rotor speed and position information based on a flux observer technique. A flux observer provides flux estimates that are the outcome of real-time calculations developed from motor equations and models. One aspect of the present disclosure is generally directed to a multi-model stator flux observer. One exemplary multi-model stator flux observer 160 is shown in FIG. 7 and FIG. 11. Another exemplary multi-model stator flux observer 880 is shown in FIG. 9 and FIG. 13. A flux observer can provide various rotor characteristics, such as rotor position and rotor speed to a motor control system, such as a dynamic direct flux control system 82, 820 of the present disclosure. The various embodiments of multi-model flux observers of the present disclosure deliver high performance during the entire operational speed range, including both low motor speed and high motor speed ranges.

The multi-model stator flux observer 160 illustrated in FIG. 11 will now be described in detail. The depicted stator flux observer 160 dynamically combines multiple flux observation methods to provide a set of stator flux observer outputs (also referred to as motor or rotor characteristics or characteristic values) to a motor control system, such as a speed controller and dynamic direct flux controller of the present disclosure. In alternative embodiments, the multi-model stator flux observer can be utilized in connection with another type of motor control system. The multi-model flux observer can provide accurate output over an entire motor speed range by dynamically shifting how the rotor characteristic values are estimated based on a number of different factors, such as rotor speed (and, as explained later in connection with the DHFI multi-model stator flux observer, based on whether high frequency injection is enabled and whether the high frequency angle observer rotor position or the stator flux observer rotor position are used to as a basis for the stator flux observation). At low speed, the stator voltage may be too small to obtain an accurate flux or rotor position estimate with a sensorless back-EMF based technique. Further, at low speed, flux and position observers tend to be especially sensitive to machine parameter variations. For example, stator resistance and stator inductance can vary significantly with temperature. By dynamically changing how the stator flux observer operates based on rotor speed, sensitivities to machine parameter variations can be significantly reduced. For example, stator resistance can vary significantly with temperature.

The rotor speed (or a corresponding cut off frequency or other corresponding threshold) can be utilized to select an appropriate motor model gain value 166. The model gain value controls the transition between which of the different models influence the outputs of the multi-model flux observer. For example, the stator flux observer 160 includes a voltage model and a current model, and the selected gain value 166 influences which flux estimate dominates the feedback for the stator flux estimate.

As shown in FIG. 11, the depicted stator flux observer 160 combines the stator flux estimate $\hat{\lambda}_{\alpha\beta}$ obtained from stator back-EMF voltage integration using the motor voltage model 162, 163, 164 with the stator flux $\tilde{\lambda}_{\alpha\beta}$ estimate obtained from the magnetic motor model, that defines a relationship between stator current and flux (also referred to as the current model) 165, 167, 168.

The combination of the two flux estimates can be imposed by the observer gain g (rad/s) as follows:
  Current model: Below the frequency equal to g (rad/s), the flux estimate is dominated by the magnetic model approach 165, 167, 168.
  Voltage model: Above the frequency equal to g (rad/s), the flux estimate is dominated by the voltage integration approach 162, 163, 164.
The magnetic model is calculated in an estimated (d-q) rotor frame 33 (see FIG. 6) using $$\begin{cases} \tilde{\lambda}_d = \lambda_m + L_d i_d \\ \tilde{\lambda}_q = L_q i_q \end{cases} \quad (18)$$

Where the d-axis estimated flux linkage is represented by $\tilde{\lambda}_d$ and the q-axis estimated flux linkage is represented by $\tilde{\lambda}_q$.

On the other hand, with respect to the voltage integral approach, the estimated rotor position is calculated from the stator flux and stator current using the "active flux" concept that is implemented as an example, $$\hat{\vartheta} = \arctan\left(\frac{\hat{\lambda}_{a,\beta}}{\hat{\lambda}_{a,\alpha}}\right) = \arctan\left(\frac{\hat{\lambda}_\beta - L_q \cdot i_\beta}{\hat{\lambda}_\alpha - L_q \cdot i_\alpha}\right) \Rightarrow \begin{cases} \sin\hat{\vartheta} = \dfrac{\hat{\lambda}_{a,\beta}}{\sqrt{\hat{\lambda}_{a,\alpha}^2 + \hat{\lambda}_{a,\beta}^2}} \\ \cos\hat{\vartheta} = \dfrac{\hat{\lambda}_{a,\alpha}}{\sqrt{\hat{\lambda}_{a,\alpha}^2 + \hat{\lambda}_{a,\beta}^2}} \end{cases} \quad (19)$$

The flux observer provides to the motor control the following quantities:
Stator flux vector magnitude:

$$\hat{\lambda} = \sqrt{\hat{\lambda}_\alpha^2 + \hat{\lambda}_\beta^2} \quad (20)$$

Stator flux vector position:

$$\hat{\vartheta}_s = \arctan\left(\frac{\hat{\lambda}_\beta}{\hat{\lambda}_\alpha}\right) = \begin{cases} \sin\hat{\vartheta}_s = \dfrac{\hat{\lambda}_{a,\beta}}{\hat{\lambda}} \\ \cos\hat{\vartheta}_s = \dfrac{\hat{\lambda}_{a,\alpha}}{\hat{\lambda}} \end{cases} \quad (21)$$

Load angle:

$$\hat{\delta} = \arctan\left(\frac{\hat{\lambda}_d}{\hat{\lambda}_q}\right) = \begin{cases} \sin\hat{\delta} = \dfrac{\hat{\lambda}_q}{\hat{\lambda}} \\ \cos\hat{\delta} = \dfrac{\hat{\lambda}_d}{\hat{\lambda}} \end{cases} \quad (22)$$

Rotor speed can be obtained using a Phase-Lock-Loop ("PLL") 171 on the estimated rotor position (19).
The stator flux speed can be estimated:

$$\hat{\omega}_s = \frac{\hat{\lambda}_\alpha \cdot e_\beta - \hat{\lambda}_\beta \cdot e_\alpha}{\hat{\lambda}^2} \quad (23)$$

In (23) the stator back-EMF voltage components $e_{\alpha\beta}$ are computed as $$\begin{cases} e_\alpha = v_\alpha - \hat{R}_s \cdot i_\alpha - v_{dt,\alpha} \\ e_\beta = v_\beta - \hat{R}_s \cdot i_\beta - v_{dt,\beta} \end{cases} \quad (24)$$

Where, $v_{\alpha\beta}$ are the reconstructed ($\alpha$-$\beta$) voltage components from inverter duty-cycles and DC link voltage applied to the machine, which are sensed by voltage sensors 86 in the voltage reconstruction block. $v_{dt,\alpha\beta}$ are the ($\alpha$-$\beta$) voltage errors introduced by the inverter due to dead-time effects and can be computed based on the stator currents sensed by the stator current sensors 87.

Embodiments of the DDFC stator flux observer 160 take advantage of multiple flux estimates that are calculated using different types of values and thus it can generally be referred to as a hybrid or multi-model stator flux observer. During low motor speeds, due to the small back-EMF voltage, a voltage model based flux estimation will generally be less accurate because at low speeds the back-EMF values are less reliable. Accordingly, during low motor speeds the stator flux observer can be configured to rely on a different flux estimation methodology, for example the stator flux observer can be configured to rely on a flux estimate that is based on the motor magnetic model. The motor magnetic model (i.e. the current model), does not rely on sensed stator voltages (i.e. back-EMF calculations) to estimate flux linkage between the stator and rotor. As defined above in Eq. (18), the motor magnetic model relies on the sensed currents as well, motor inductances, and the permanent magnet flux or no-load flux linkage to determine the flux linkage between the rotor and stator.

A gain function 166 can be utilized to filter or select a suitable flux estimation to utilize as feedback in the active flux integral. That is, the gain function 166 (e.g. low pass and high pass filters) can be configured such that the current model flux estimation 165, 167 and 168 dominates the output, providing a decently good flux estimate at low speeds, as illustrated in FIG. 11. When the speed is above the low-speed range to high speeds (e.g. as determined, set, or otherwise triggered by the gain value of gain function 166 that defines the transition point where the voltage model or current model dominates the feedback), the flux estimate output from the voltage integral 164 dominates over the current model flux estimate. That is, the flux estimate output from the voltage integral 164 dominates the output from the gain function 166 due to the gain value and filter configuration.

The motor parameter stator resistor $\hat{R}_s$ 162 from the magnetic model or current model 167, the voltage feedback $v_{\alpha\beta}$ and the voltage errors $v_{dt,\alpha\beta}$ 174 are applied to calculate the stator flux $\hat{\lambda}_{\alpha\beta}$ through an integral 164, corresponding to the Eq. (24). From this equation, it can be seen that the voltage feedback and the voltage error feedback are all from the voltage sensing circuits 86 as well as the current sensing 87. Furthermore, because the voltage drop of the stator resistance is relatively small, even taking the inaccuracy of the current model into account, the estimates can be sufficiently accurate to tolerate variations when the speed is sufficiently high. Therefore, if the transition value for the gain function 166 is selected according to embodiments of the present disclosure, the stator flux estimate can be robust and precise against motor parameter variations that occur during severe working conditions because with such a configuration the voltage model flux estimation is only dominant when the motor speed is in a high-speed range where any motor parameter variations are inconsequential to the flux estimate.

Likewise, if the transition value for the gain function 166 is selected according to embodiments of the present disclosure, the stator flux estimate can also be robust and precise against motor parameter variations that occur during severe working conditions at lower speeds as well. This is because the motor magnetic model is not affected in a significant manner by motor parameter variations due to severe operating conditions. The magnetic motor model utilizes three values to obtain a flux estimate: the motor parameter stator inductance $\hat{L}_q$ from the magnetic model or current model, the current feedback $\hat{i}_{\alpha\beta}$, and the estimated stator flux $\hat{\lambda}_{\alpha\beta}$. The active flux $\hat{\lambda}_{a,\alpha\beta}$ can be calculated at node 172 by comparing the product of the current and q-inductance against the estimated stator flux. Then, the active flux rotor position angle $\hat{\vartheta}$ can be obtained at node 173 by implementing or configuring a circuit to carry out the calculation of Eq. (19). According to Eq. (19), when the speed is high, the flux position angle is accurate and robust. As mentioned before, both the stator flux estimate and the active flux estimate are robust against motor parameter variations. The current feedback from the current sensing circuits are thus robust and precise at higher speeds because the impact from the stator inductance $\hat{L}_q$ variation diminishes when the speed is in medium and high speed.

As a consequence, because the integration is calculated based on the real-time feedback of back-EMF 162, 163, 164, 172, 173 and 174 in the stator flux observer 160 of FIGS. 11, and 86, 87 in FIG. 7, directly from the voltage sensing hard circuits, which delivers a robust flux estimate result. Thus, the impacts to system control from the variation of the system parameters are reduced substantially in the operation of the voltage model at high speeds.

Returning to the functional block diagram 160 of FIG. 11, which illustrates an exemplary flux observer for use in connection with a current embodiment of the present disclosure. The flux observer integrates two different models that generate a flux estimate in two different ways. The voltage model essentially compares the voltage input into the motor against the losses (notably back-EMF and dead-time) while the current model essentially utilizes the sensed current and rotor position along with an empirical model to estimate flux. The flux estimate can be utilized to calculate and output various motor characteristics, such as estimated rotor position, estimated load angle, estimated rotor speed, and estimated rotor flux, and a second estimated speed. The two models have differences that make them more reliable and accurate in different situations.

In one example, a first flux observation method calculates rotor characteristics that utilize an integral 164 of actual voltages, which can be referred to as a voltage model, the other flux observation method can utilize a magnetic model 167, which can also be referred to as a current model. Put another way, in one embodiment the two flux observer models are 1) a magnetic model or current model, and 2) an actual voltage integral or voltage model. During a motor starting period (i.e. while the motor is a relatively low speed (e.g., less than 50 RPM), the flux observer is configured such that the estimates based on the current model dominate the output, 165, 167 and 168 in FIG. 11. When the speed estimate is above a certain low-speed range, the flux observer is configured such that the voltage model estimates dominate the output of the flux observer—i.e. the speed and position estimate.

The output of the flux observer is self-referential because the estimate produced is also fed back into the flux observer itself and factors into the configuration of the flux observer. That is, as the speed changes, the dominance of one model over other changes in the flux observer. The change can be decisive and occur at a cutoff frequency, or the change between the outputs can be cross-faded such that within a certain speed range an average or weighting of the two different speed models are used. In some embodiments, the flux observer circuit can be configured in an analog manner such that one output dominates the other based on a gain factor, g 166.

Therefore, because the voltage integration can be calculated up to the real-time feedback of back-EMF 162, 163 and 164 in FIG. 11, 160, the voltage model-based observer is able to deliver a robust estimate result at low speed up to the maximum speed. The transition from the current model to the voltage model is the gain g, 166, in FIG. 11. This gain can be fixed at manufacture to balance suitable use of the voltage model and current model based on a variety of factors.

Dynamic High Frequency Injection (DHFI) System Integration and DHFI-Stator Flux Observer It is well understood that conventional flux observers generally do not provide satisfactory estimates during operation at low or very low speeds, such as 10 Rpm to 150 Rpm for some motor applications. To address this tough and longstanding historically challenging industrial issue in sensorless control systems, dynamic high frequency injection (DHFI) can be enabled during low-speed operations in addition to any DHFI utilized during motor startup.

Several embodiments of DHFI are disclosed in U.S. application Ser. No. 16/984,267 to Bojoi et al., filed on Aug. 4, 2020, entitled "ROBUST STARTING SYSTEM AND METHOD FOR INTERIOR PERMANENT MAGNET SYNCHRONOUS MOTOR CONTROL", which was previously incorporated by reference in its entirety. For example, one embodiment of startup motor control incorporates DHFI in a closed loop starting method. The startup DHFI provides rotor position and rotor speed estimates at essentially any speed below a certain speed a, such as 200 Rpm, at 12 Hz without utilizing a current model flux observer output. At starting speeds a, and above, the voltage model-based flux observer takes over the DHFI's role to provide the rotor position and rotor speed estimate.

According to the observer 160 technique described herein FIG. 11, at starting period or a low speed, due to the small back-EMF a voltage integral may be relatively inaccurate, and therefore the multi-model flux observer estimates speed based on the motor magnetic model instead, having that result dominate the output, which providing a decently good flux estimate at low speeds. When the speed is above the low-speed range, the voltage integral estimate dominates the estimate because the integration is calculated according to the real-time feedback of back-EMF, delivering a robust estimate result.

As a consequence, with respect to the DDFC's stator flux observer performance for the low speed, at first the current model based on the magnetic model is more dependent on the parameters in low-speed range. Then, as soon as the voltage integral method engages to the estimating operation, the system achieves a precise estimate for the DDFC above the low speed to high speed.

DHFI System Integration

This illustrates the challenge in directly applying any flux observer techniques in at low speeds, such as below 150 Rpm. Fortunately, U.S. application Ser. No. 16/984,267 to Bojoi et al., filed on Aug. 4, 2020, entitled "ROBUST STARTING SYSTEM AND METHOD FOR INTERIOR PERMANENT MAGNET SYNCHRONOUS MOTOR CONTROL", which was previously incorporated by reference in its entirety, describes a Dynamic High Frequency Injection (DHFI) method. This DHFI method provides a robust solution to estimate the speed and position because of the independence of the motor parameter variation for low-speed operation. Present embodiments can combine this approach with the multi-model flux observer described herein to apply DHFI estimates that replace the Stator Flux Observer output. These DHFI robust estimates can be achieved in the low-speed ranges, not just for startup. In this way, any low-speed operations can be controlled with the DHFI method based on such estimates. The magnetic model or current model flux observer outputs of the estimates are no longer applied in DDFC flux observer inputs for the low-speed range. The overall estimate performance can be significantly improved in terms of precision and robustness.

The DHFI method is a powerful tool to substantially improve the low-speed operations. Specifically, the high frequency injection ("HFI"), while useful, adds some complexity and has a negative impact on system control. The DHFI methodology allows the advantages of HFI to be leveraged, providing the ability to observe position at very low speed because of the high frequency injection, but afterward, filters out the high frequency signals to avoid the negative system impacts generated by the HFI processing. DHFI is described in detail in several embodiments in U.S. application Ser. No. 16/984,267 to Bojoi et al., filed on Aug. 4, 2020, entitled "ROBUST STARTING SYSTEM AND METHOD FOR INTERIOR PERMANENT MAGNET SYNCHRONOUS MOTOR CONTROL", which was previously incorporated by reference in its entirety. DHFI was utilized during startup in that disclosure. This disclosure provides a detailed description and examples related to DHFI system integration, specifically as presented herein with respect to system control, i.e. DDFC.

Figure 12:
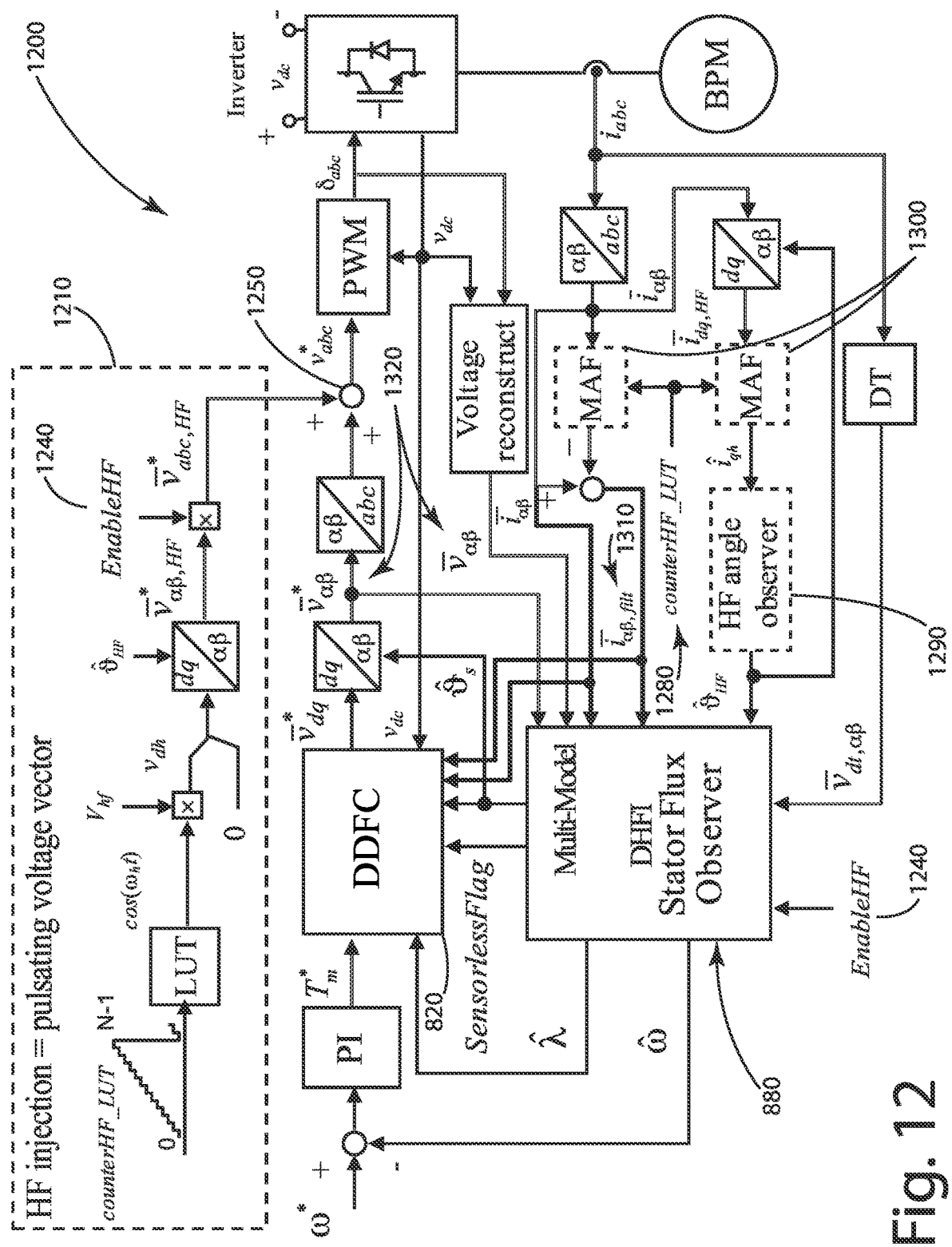
FIG. 12 illustrates a sensorless PMSM functional block diagram including a DDFC block a dynamic high frequency injection ("DHFI") Stator Flux Observer.

In comparison with the system control diagram shown in FIG. 7, to integrate the DHFI into the system, several functional elements can be added to implement the DHFI integrated control system 1200 as shown in FIG. 12. An exemplary high frequency injection ("HFI") function block 1210 generates an HFI voltage for injection into the motor control system at node 1250 along with the DDFC voltage command. A control flag "EnableHF" 1240 determines whether the HFI is turned on to inject into the system or not. The two Moving Average Filters ("MAF") 1300 filter out the HFI signal in the DHFI implementation. Specifically, in one embodiment, one MAF 1300 subtracts the fundamental waveform from the voltage waveform to provide the HFI signal to the HF Angle Observer 1290 that outputs the estimated rotor position angle $\hat{\vartheta}_{HF}$ to the Stator Flux Observer 880. When the HFI is enabled, the current feedback signal can also be provided in a clean format without the HF signal that produces a distortion or interruption for the observer to operate well. That is, the other MAF can take care of filtering out the HF waveform from the feedback current $\bar{i}_{\alpha\beta}$ obtain a clean fundamental waveform of the current $\bar{i}_{\alpha\beta,filt}$ 1310 when the HFI is enabled. As depicted, $\bar{i}_{\alpha\beta}$ $\bar{i}_{\alpha\beta,filt}$ can be routed both to the Multi-model stator flux observer 880 as well as directly to the DDFC, bypassing the multi-model stator flux observer. In addition, regarding the two voltage feedback signals 1320, when the HFI is enabled, the pre-high frequency injection voltage command $\bar{v}_{\alpha\beta}^*$ can be used as the input signal to the Stator Flux Observer instead of using the feedback voltage $\bar{v}_{\alpha\beta}$.

The EnableHF flag has two states in the current embodiment.

(1) EnableHF=0: HFI Operation is Disabled.

In this state, the HFI functionality is disabled. The system essentially behaves like the simplified system diagram shown in FIG. 7 without any HFI. The typical operational circumstance is above low speed $\omega_2$ or in the starting polarity detection during zero and standstill starting operation.

(2) EnableHF=1: HFI Operation is Enabled.

In this state, the HFI functionality is enabled. HFI voltage is injected into the motor control loop to generate the current feedback with the HF signal for the HF Angle Observer 1290 that outputs the estimated rotor position angle $\vartheta_{HF}$ to the Stator Flux Observer 880. The HFI allows the control system to have more accuracy in estimating rotor position and rotor speed.

With respect to the DHFI system integration, the DDFC 82 can be configured to use either the actual current feedback or DHFI filtered current feedback according to the EnableHF flag state 116, as shown in FIG. 8, for example.

As a consequence, the DDFC, 82 provides a novel control system that is able to handle both regular operation and DHFI integration operation, depending on the EnableHF flag state, and therefore, what is called as the Dynamic DFC system (DDFC).

DHFI-Stator Flux Observer

FIG. 12 shows a scheme diagram 1200 of a dynamic direct flux control ("DDFC") block 820 integrated into a DHFI method. Another aspect of the present disclosure is generally directed to a multi-model flux observer 880 that combines a DHFI based flux observer and voltage model based flux observer together into a single, hybrid flux observer to achieve robust controls over an entire motor operating speed range. Put simply, FIG. 12 illustrates a representative block diagram of a motor control system capable of dynamic high frequency injection that includes a multi-model stator flux observer. In particular, a multi-model stator flux observer 880 that includes a DHFI model and voltage model, which can be referred to as DHFI/voltage stator flux observer 880 is illustrated in FIG. 12.

In embodiments where DHFI is integrated into the system, the multi-model stator flux observer 160 in FIG. 11 can be configured to handle the HFI inputs when the HFI is enabled, e.g. where the EnableHF flag is set to 1. FIG. 13 shows the details of the upgraded DHFI-Multi Model Stator Flux Observer 880 in comparison with the Multi-Model Stator Flux Observer 160, FIG. 7. It is noticed that there are two sets of switches added into the system diagram 1600 of the DHFI-Stator Flux Observer. One is the switch based on the flag EnableHF that is described above. The other switch is controlled by the ObserverMode flag. These flags play different roles in the corresponding control functionalities, such as 820, 880 and 1240 in FIG. 12, etc.

A. ObserverMode Flag Functionality

In the current embodiment, the ObserverMode flag has two states: ObserverMode=0 and ObserverMode=1. The ObserverMode flag can be utilized to change the observer mode for the universal dqController as described above, but can also be utilized to provide specific functionality in flux observer. For example, in the multi-model flux observer 1600, the observer mode switch 175 can toggle between providing the rotor position derived from the HF angle observer during HFI in observer mode 0 and providing the voltage model rotor position in observer mode 1.

(1) ObserverMode=0: Use HF Angle Observer

In this mode the stator flux observer is generally configured to utilize output from the HFI angle observer 1290, FIG. 12 to determine rotor speed and rotor position according to a rotor magnetic model. That is, the stator current response to the high frequency injection can be fed to a HFI Angle Observer 1290, which can determine rotor position $\vartheta_{HF}$. Then, the position can be used as the input angle of the current model observer logic blocks 165, 167, 168, shown in FIG. 13. Then, the whole flux observer 1600, including both the current model and the Voltage Model 162, 163, 164 generates the outputs 169, 170, 171 of the multi-model flux observer in FIG. 13.

(2) ObserverMode=1: Use Voltage Model Observer

In this mode, the current model observer does not use the HFI observed position angle anymore. Instead, the current model observer uses the rotor position $\vartheta$ estimated by the voltage model observer 162, 163, 164, passed through the observer mode switch 175. In this mode, the rotor position and speed output from the multi-model flux observer 1600 are the values estimated by the voltage model logic blocks 162, 163, 164. Where HFI is still enabled (i.e. EnableHF=1) until the rotor speed estimate exceeds the flux observer threshold $\omega_2$ the inputs 172, 173 to the voltage model observer logic blocks 162, 163, 164 will be voltage command $\bar{v}_{\alpha\beta}^*$ and current $\bar{i}_{\alpha\beta,filt}$. After that the rotor speed estimate exceeds the flux observer threshold, the HFI is turned off because the control system (1) has provided sufficient lead time for the flux observer to stabilize; and (2) the rotor speed is sufficiently high that the rotor speed is unlikely to dip below the rotor speed where the internal flux observer estimate may be unreliable and an HFI-based speed estimate may be more suitable.

B. EnableHF Flag Function

In the current embodiment, the EnableHF flag has two states: EnableHF=0 and EnableHF=1. As mentioned in the embodiments described in U.S. application Ser. No. 16/984,267 to Bojoi et al., filed on Aug. 4, 2020, entitled "ROBUST STARTING SYSTEM AND METHOD FOR INTERIOR PERMANENT MAGNET SYNCHRONOUS MOTOR CONTROL", the function related to the system control is described in terms of the DHFI—Stator Flux Observer.

After the starting process is over, the system is able to drive the motor to operate in entire speed ranges according to the speed commands. As soon as the speed reaches at low speeds below the speed threshold $\omega_2$ from high speed or above the low speed, this EnableHF flag turns to active and starts HFI. FIG. 13, 172 173 and 174 show how the switch is engaged and disengaged to handle signal flow in the DHFI observer.

(1) EnableHF=0: HFI is Disabled

In this state, HFI operation is disabled because the speed is higher than the speed threshold $\omega_2$. Inside the DHFI Stator Flux Observer, the system takes the flux observer outputs for the speed and position estimates, meanwhile the actual voltage $\bar{v}_{\alpha\beta}$ and current $\bar{i}_{\alpha\beta}$ are connected into the Voltage Model observer as input signals, 172 and 174, in FIG. 13.

(2) EnableHF=1: HFI is Enabled

In this state, HFI operation is enabled. The high frequency signal is injected from the HFI 1210 into the voltage supply circuits in FIG. 12). The Voltage Model Observer takes the voltage command $\bar{v}_{\alpha\beta}^*$ and the filtered current $\bar{i}_{\alpha\beta,filt}$ as its input signals, seeing 172 and 174, in FIG. 13. In this way, the system signal processing is not affected by the HFI operation.

C. Flags and Speeds Selection

Figure 14:
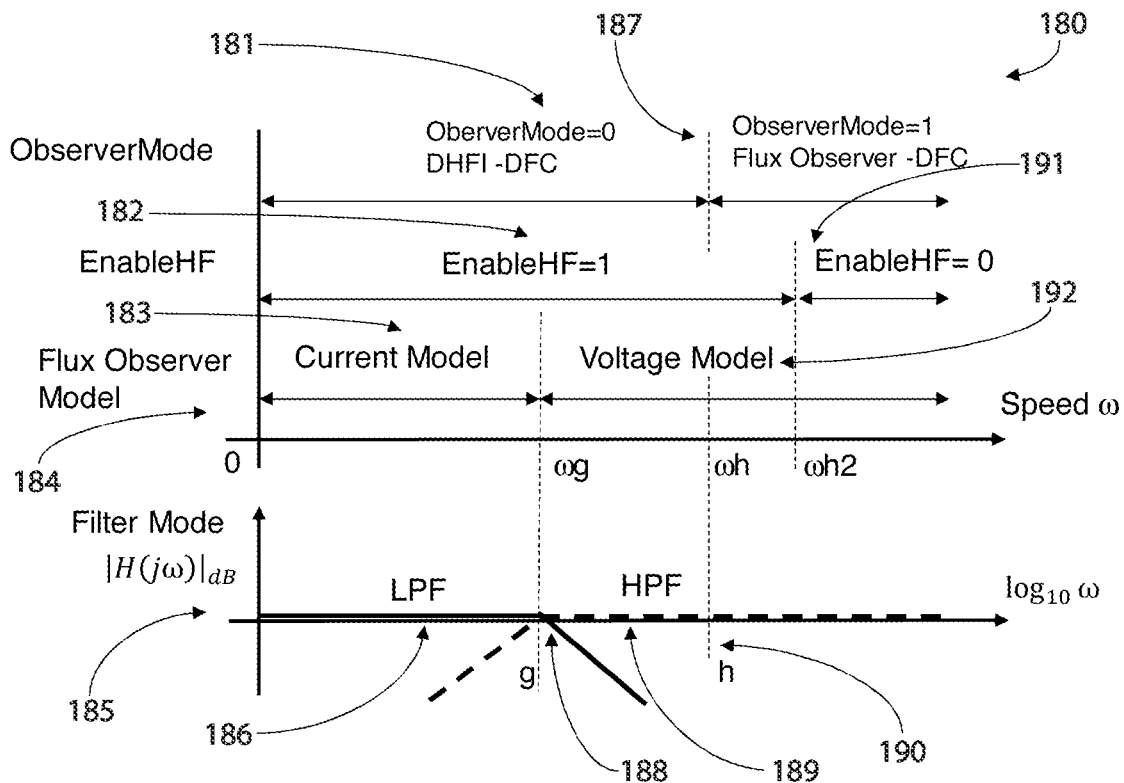
FIG. 14 illustrates an exemplary graph showing the observer mode, HFI flag status, flux observer model status, and filter status over a particular range of motor speed values and corresponding frequency values.

FIG. 14 shows a graph 180 that is helpful in illustrating an exemplary motor control transition strategy of the present disclosure. Motor control strategies handle the transition of the ObserverMode flag and EnableHF flag from one state to another as the speed changes. Furthermore, the motor control transition strategy handles the transition of the dynamic direct flux control method from one methodology to another as well as transition of the multi-model flux observer from one methodology to another. The strategies overlap, but are not fully aligned. In particular, the motor control transition strategy handles and accounts for the status of real-time sequence relationships versus speed 184 as well as corresponding frequency in the frequency domain 185. In this figure, the speed and frequency domain are illustrated stacked on top of each other to demonstrate the relationship between the various elements (i.e. the flag states, the flux observer filter, the flux observer transition point, and the DFC mode transition). The transition frequency or gain 188 (established by gain 166) and its corresponding speed $\omega_g$ in the time domain correlate to each other and divide the observer current model 183 and voltage model 192. That is, the observer gain 188 (or corresponding speed $\omega_g$) can be selected to transition between flux observer speed estimate models. The transition can be gradual or immediate depending on how the filters 186, 189 are implemented. In the depicted embodiment, as illustrated in the frequency domain, a low pass filter ("LPF") 186 and high pass filter ("HPF") 189 can both be engaged at the frequency g 188. In general, the observer model cut-off speed $\omega_g$ should be close and lower than the flux observer engagement speed $\omega_h$, 190, $$\omega_g < \omega_h \quad (25)$$

Referring to FIG. 14, at low speeds while DHFI is enabled 182, the current model 183 dominates the output of the flux observer. When the rotor speed reaches $\omega_g$, 188, the flux observer transitions to the voltage model 192. Then, at $\omega_h$ 190, e.g., 200 Rpm, the DHFI changes the OberverMode state to 1 from 0, stops using the HF angle observer signal and starts to use the Voltage Model flux observer-DFC to handles the control, seeing the 181, 187 and 190 in FIG. 14. Notice that the EnableHF state remains unchanged at the speed at $\omega_h$ 190, e.g., 200 Rpm until the speed arrives at speed $\omega_2$.

The DHFI method can remain active after a, such as from 200 to 250 Rpm. During this speed window of 50 Rpm, the voltage model can provide estimates for the DFC control meanwhile the DHFI is also available. When the speed reaches a threshold, such as 250 Rpm, DHFI can be turned off, but the voltage model continues to supply the DFC block with estimates. The EnableHF=0, the flag is turned off at the speed $\omega_2$, 250 Rpm 191.

The flux observer gain frequency, g 166 in FIG. 11 or 188 in FIG. 14 can be selected as a value that is coordinated with the DHFI speed window, such as the $\omega_h$, 200 Rpm at least, about 12 Hz. Then when the DDFC turns to apply the flux observer outputs at the $\omega_h$, 200 Rpm, all the outputs of the observer are stable to be applied by the DDFC, for instance. At speed $\omega_2$, 250 Rpm, the DHFI turns off the HFI operation, at the 200 RPM, both models within the flux observer continue to operate, however, only one, the voltage model in this case, is dominated by the output due to application of the high pass filter.

Although the voltage model dominates the flux observer output for speeds at and above $\omega_g$ in the current embodiment, in alternative embodiments the transition speed can be set at a different speed and corresponding frequency, either higher or lower. The specific value can vary depending on the specific application.

Due to the implementation of the DHFI method into the DDFC system control, the selection criteria of the gain g or the speed $\omega_g$ can be quite different from that without applying the DHFI. Accordingly, one consideration in selecting the gain value is whether the system employs DHFI or not. The speed distance between the $\omega_g$ and the con can be determined by considering the arrival timing of stable operation of the voltage model flux observer. Taking the speed at which DHFI deactivates $\omega_2$ into account, as a consequence, the Eq. (25) can be expressed as $$\omega_g < \omega_h < \omega_2 \quad (26)$$

Where, $\omega_g$ is the flux observer model transition speed from the current to voltage model; $\omega_h$ is the DDFC observer mode transition speed from the HFI to the Voltage Model observer; $\omega_2$ is the DHFI turns off HFI operation speed, DDFC operates under stator flux observer.

Accordingly, FIG. 14 illustrates one example of a multi-model flux observer and the flag states in combination with DHFI. The combination significantly improves overall speed and torque control.

Torque Control Linearity (TCL)

Torque Control Linearity (TCL) refers to a linear response (relationship) between the actual torque on the motor shaft and the torque command provided to the motor by the motor control system. The torque control precision can be measured by a level of TCL. Systems and methods in accordance with an aspect of the disclosure for achieving a suitable level of TCL over a large speed range will now be discussed in detail.

Referring back to FIG. 5, an exemplary power versus speed characteristic curve associated with an exemplary industrial or commercial IPMSM motor is illustrated. At low speeds, the amount of power to increase rotor speed is small. As the rotor speed increases above the low speed range, such as at the working point W1 21, more power or torque is required to accelerate to a high speed. To achieve suitable control, the system can utilize MTPA or other limits. Working point W2 22 corresponds to a saturation level where the inverter cannot provide more current to produce more torque to increase the speed of the IPMSM in an appreciable manner.

TCL Using the MTPA

Figure 15A:
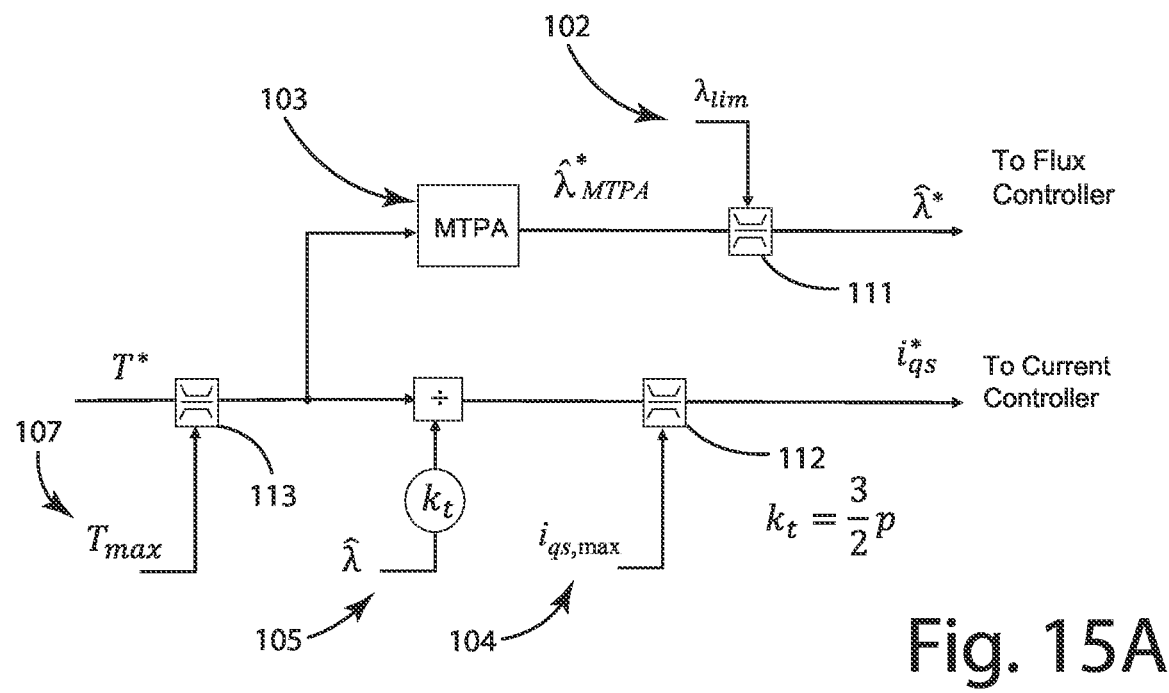
FIGS. 15A-C illustrate a portion of system control via a torque control linearity functional block diagram along with graphs of MTPA control trajectory at normal operation and MTPA control trajectory under restricted condition.

FIG. 15A illustrates a portion of the exemplary DDFC method depicted in FIG. 8. In particular, it illustrates a portion of the flux control and the torque control (which is achieved through the current control) as discussed above in connection with DDFC. In FIG. 5, the range between the working point W1 21 and the working point W2 22 can be referred to as the torque control speed range or TCL speed zone. In alternative embodiments the torque control speed range may be larger or smaller.

FIG. 15A shows two paths terminating in the flux controller 108 and the current controller 109 respectively. The maximum torque $T_{max}$ (as calculated by functional block 107 in FIG. 8) and a torque command T* are inputs to a both-direction limit controller 113. Once limited, the torque command T* is routed to an MTPA look-up table 103 to identify a corresponding estimated MTPA flux $\hat{\lambda}*_{MTPA}$. The estimated MTPA flux and a limiting flux $\lambda_{lim}$ 102 are input into a flux limiter 111. The output of the flux limiter 111 is one of the inputs of the flux controller 108, shown in FIG. 8.

The torque command T* is also routed in parallel to the current controller. In particular, the torque command T* is divided by a torque constant $k_t$ 105, (which is calculated as a function of the estimated flux magnitude $\hat{\lambda}$ from the flux observer) to provide a reference or target q-axis stator current component $i*_{qs}$. The q-axis stator current component is then limited by the maximum q-axis stator current $i_{qs,max}$ via a current limiter 112. The output of the current limiter 112 $i_{qs}*$ is the input of the current controller 109 in FIG. 8.

It should be noted that in the current embodiment the flux control is completed based on a stator flux estimate derived from three phase stator voltage feedback provided in real time to the stator flux observer while the current control is completed based on a stator current estimate derived from real time three phase stator current feedback. Because both the flux control and the current control rely on real time feedback, precise torque control may be achieved.

Figure 16:
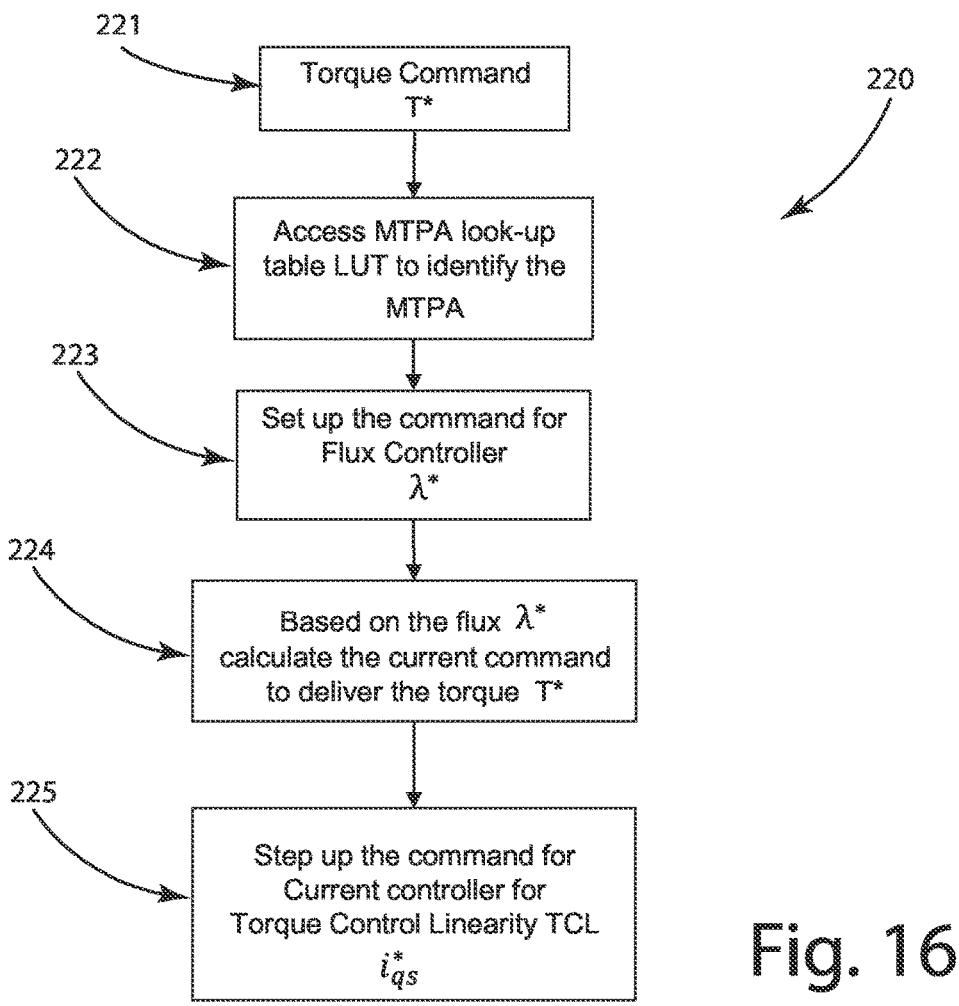
FIG. 16 illustrates a TCL flowchart for one embodiment of MTPA control.

FIG. 16 depicts a logical flow chart 220 of an exemplary MTPA control scheme to achieve TCL. The system configured with the TCL control strategy receives a torque command T* at step 221. Based on the torque command T*, the TCL control strategy identifies the estimated MTPA flux $\lambda_{MTPA}$ by accessing the MTPA LUT at step 222. The TCL control strategy sets the input flux command for the flux controller 108 at step 223. Based on the input flux command, the TCL calculates a corresponding current command $i_{qs}*$ to deliver torque per the torque command T* at step 224. The TCL uses the q-axis current component $i_{qs}*$ as the input to the current controller 109 to achieve TCL at step 225.

Figure 15B:
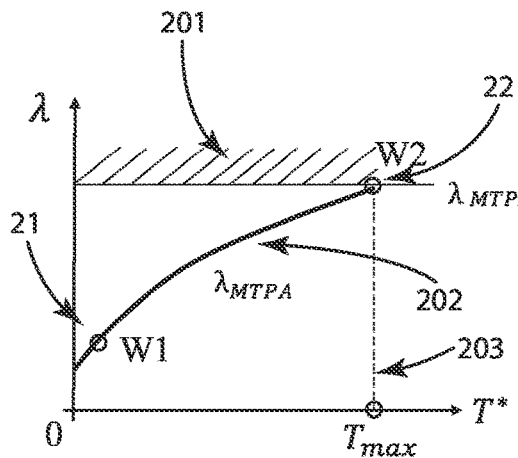

FIG. 15B illustrates a flux linkage versus a torque for a torque control speed range of FIG. 5. The maximum torque $T_{max}$ 203 and the maximum flux $\lambda_{MTPA,max}$ 201 define a feasible operational area for MTPA control. The MTPA required flux $\lambda_{MTPA}$ is stored in a LUT and defines an optimal operational trajectory from the working point W1 21 to the working point W2 22. For any torque command T* within the torque control speed range, the TCL control strategy applies the MTPA required flux, which is a working point on the defined optimal operational trajectory $\lambda_{MTPA}$ 202. Therefore, the TCL control strategy achieves a precise torque control through the current control.

Additionally, at the working point W2 22 under the rated working conditions (such as the rated voltage, rated load condition, etc.), the DDFC system delivers the maximum torque $T_{max}$ by applying the maximum flux $\lambda_{MTPA,max}$ 201 and by using the minimum current $i_{qs}$. At the maximum torque $T_{max}$, the DFC system reaches the limit of the output power the DFC system is able to deliver to drive a load. For example, the load may be a fan or a blower. Under the rated working conditions, the DFC system operates at the MTPA optimal control in the whole speed range. The IPM motor and controller system may be specifically designed for the MTPA optimal control to operate for the entire speed range.

TCL Capability Outside the MTPA Torque Control Speed Range

Industrial and commercial fans and blowers may be required to operate in severe environments, such as on the roof top of industrial or commercial buildings. These rough environments may cause a large variation in motor parameters and power supplies. For example, the motor parameters may vary due to the ambient temperature discrepancy in different seasons, or a voltage drop for any reasons. Because such severe working conditions are common, the DDFC system can be configured to deliver precise TCL performance to achieve robust control, even under severe working conditions.

The DDFC voltage model stator flux observer is robust above the low-speed range and thus provides accurate torque estimates. Under normal rated working conditions as shown in FIG. 15B, the DDFC voltage model stator flux observer delivers suitable performance using the MTPA control scheme from the speed of the working point W1 21 until the maximum speed of the working point W2 22. However, in certain circumstances (for example, due to a severe environment that impacts motor parameters), the system may not be operating under normal rated working conditions.

Figure 15C:
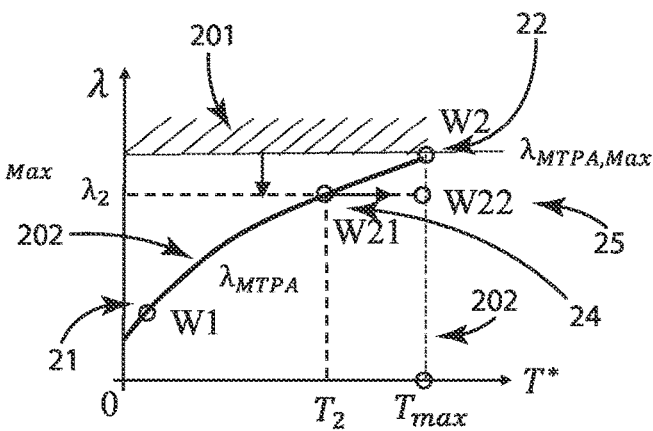

FIG. 15C depicts the flux linkage versus the torque for the torque control speed range of FIG. 5 when the system is not operating under normal rated working conditions. Under such conditions, the system is operating with a reduced amount of output power. The maximum flux may be reduced from $\lambda_{MTPA,max}$ 201 to $\lambda_2$ due to either a reduction in the motor back-EFM or a voltage drop. If the MTPA control scheme is being used, the system delivers a torque and a speed at a working point W21 24 which is less than the torque and the speed at the working point W2 22, and the working point W21 24 is on the defined MTPA trajectory 202. This means the torque control speed range under severe working conditions is smaller than the torque control speed range under normal rated working conditions.

Alternatively, if the system is being controlled to satisfy a command output torque, the torque control speed range may be extended up to a limited range, and may be able to maintain the command output torque. The extended output torque $T_{max}$ can be expressed as, $$T_{max} = \frac{3}{2} \cdot p \cdot \lambda_{lim} \cdot i_{qs,max} \qquad (27)$$

where $\lambda_{lim}$ is the output from the flux weakening block 102 in FIG. 8 based on a maximum reachable flux at the speed of the working point W2 22 or close to that speed, and $i_{qs,max}$ is the maximum available current and is the output of the current limit block 104. The current limit block 104 is described in more detail above with respect to FIG. 10. Rather than aim for the working point W21 24 on the defined MTPA trajectory 202, the DDFC system moves away from the defined MTPA trajectory 202 toward a working point W22 25 to maximize the output torque. If the current is large enough, the working point W22 25 can be reached and the maximum torque $T_{max}$ can be achieved because the system can apply more current to compensate the flux shortage to generate the torque to match the command torque. However, it should be noted that it is not always possible to reach the working point W22 25 because the extended torque production capability is limited. In these circumstances, the actual working point of the system is somewhere between the working point W21 24 and the working point W22 25, depending on the flux limit or reduced rate flux $\lambda_{lim}$ and the permitted current or q-axis stator current component maximum.

Under the normal rated working conditions, the DDFC control strategy can deliver precise TCL performance, achieve suitable or optimal control of the motor in the toque control speed range, and conduct robust controls. When the working conditions are severe, the TCL range is generally shortened and the maximum flux, torque, and output power are reduced. However, in some severe working conditions, the TCL and the output torque capability can be extended to the maximum output torque available under the permitted current.

DDFC System Operational Control

Figure 17:
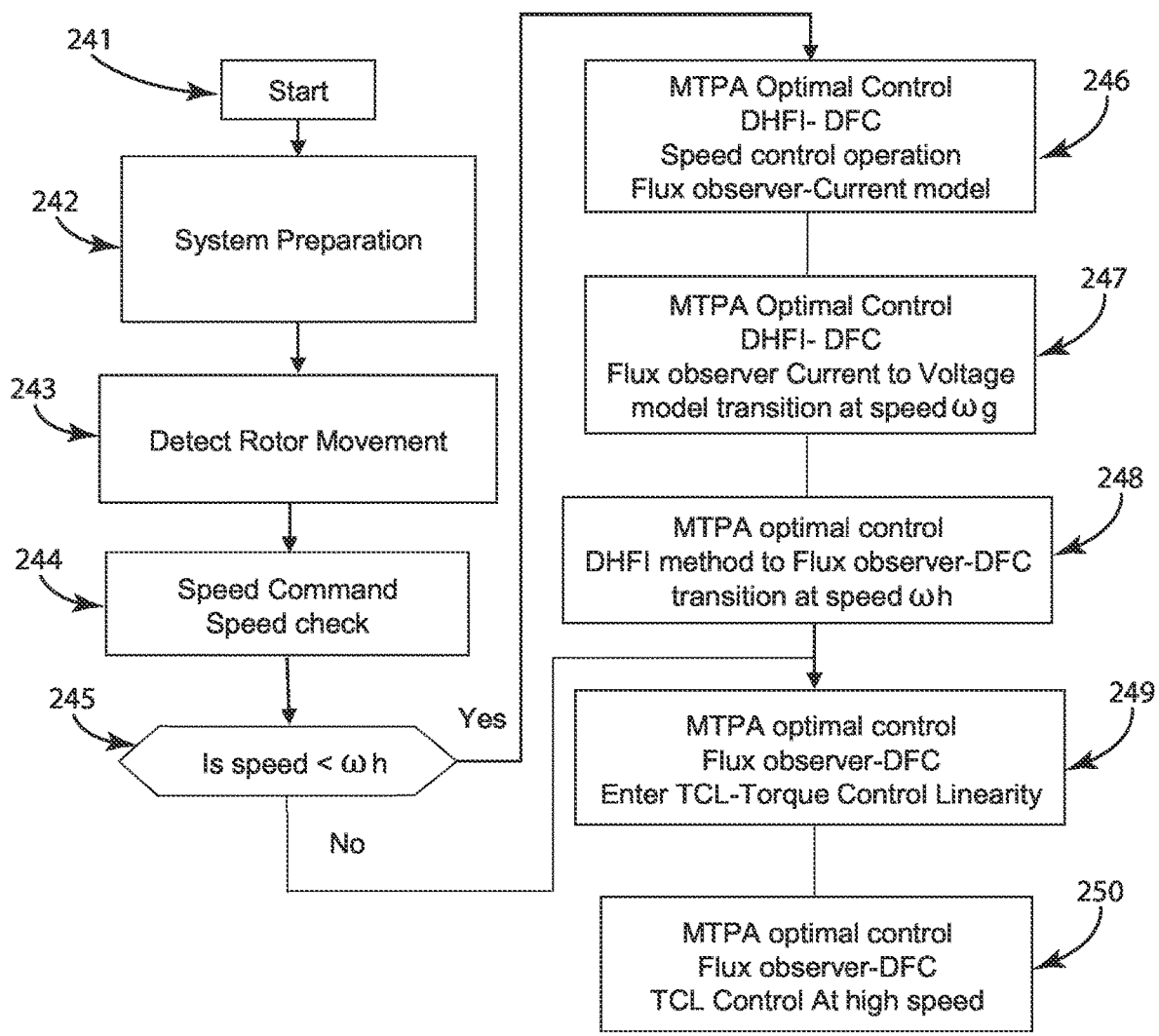
FIG. 17 illustrates a DFC flowchart for one embodiment of robust sensorless IPMSM control including linearity of torque control.

FIG. 17 illustrates a functional block diagram showing an exemplary embodiment of a dynamic direct flux control ("DDFC") method. The method begins with a system preparation step 242 that can include offset computation and charging of bootstrap capacitors, as well as other preparation sub-steps. The method continues with rotor movement detection 243, setting up the SensorlessFlag to begin the starting process. During the starting process, the system conducts closed loop speed control from any starting speed based on the initial speed detected by the movement detection and applying starting control strategies, such as the aforementioned DHFI startup speed and position estimation.

Next, the system checks the motor speed 244. If the system is below a threshold speed, a, the system conducts an optimal control by following up the MTPA under the DHFI method outputs for estimates 246. Meanwhile, the current model-based flux observer continues to dominate the observer output. At speed $\omega_g$, the system is under the optimal control on the MTPA and makes the flux observer output transition from the current model to voltage model, 247. After the voltage model is working well, the system switches the DHFI strategy from the HFI operational mode to the voltage model-based flux observer mode at the speed $\omega_h$ 248. The DHFI method provides accurate estimates for flux observer and improves performance across a low-speed range.

If the system is at or above the threshold speed, or following the natural progression of speed increases, the DDFC system steps into the Torque Control Linearity (TCL) area to deliver a precise torque and speed control in MTPA optimal control as well as the extended TCL range if the inverter is saturated due to the voltage limitation, 249 and 250 in abnormal working circumstances.

By way of example, FIGS. 18A-F, 19A-F, 20A-F illustrate exemplary results. In FIGS. 18A-F show DDFC robust control characteristics at the load condition of 1050 Rpm, 550 W and 25° C. in detuning without any compensations. FIGS. 19A-F show control characteristics at the same load at 80° C. with motor parameter changes of −11% $\lambda_m$, flux magnitude, and +21% $R_s$, stator resistance. FIGS. 20A-F show control characteristics at the same load at −30° C. with motor parameter changes of 11% $\lambda_m$, flux magnitude, −21% $R_s$, stator resistance.

overall, which is essentially unobservable by the naked eye. The flux observer is able to estimate the torque constant as it changes from the flux in the magnet changing Accordingly, without any compensation values being applied, the DDFC system can achieves the robust controls. The flux observer provides accurate estimates under severe or rough working conditions. Overall performance is satisfactory in terms of the preciseness of the speed control, torque control and power control under large parameters variation without any empirical compensations.

FIGS. 21A-C, 22A-C and 23A-C show results of ramp down from a decent high speed, 600 Rpm, to a low speed, 30 Rpm, and then ramp up back to the high speed, as an example. FIGS. 21A, 22A, and 23A each show command, actual and observed speed 511, 531, 521. FIGS. 21B, 22B, and 23B each show the phase A current waveform 512. FIGS. 21C, 22C, and 23C show the control flags' status change. FIG. 21C shows the enableHF flag 514 switching from 0 to 1 between 7 and 8 seconds. FIG. 22C shows the enableHF flag 534 switching from 0 to 1. FIG. 23C shows the enableHF flag 524 switching from 1 to 0 between 13 and 13.5 seconds.

Beginning at 600 Rpm, the motor starts to decelerate. Perhaps as best shown in FIGS. 22A-C, at the speed 250 Rpm, the DHFI method is enabled, EnableHF flag 534 turns to 1 from 0, which is evident by the high frequency injection current visible in the phase current waveform 532 in FIG. 22B. Then, at 200 Rpm the observer changes to apply the DHFI output as the signal instead of using the voltage

TABLE 1

Comparison of the DFC robust control testing and simulation results

| Ambient temperature (° C.) | Torque Constant $k_T$ (Nm/A) | Estimated/Command Output Power (W) | Power Error (%) | Position Error (Elec. degree) |
| --- | --- | --- | --- | --- |
| 25° C. reference conditions | 0.996 | 551.70/550 | 0.3% | −1.58 |
| 80° C., −11% flux magnitude, +21% stator resistance | 0.892 | 550.7/550 | 0.1% | 1.62 |
| −30° C., 11% flux magnitude, −21% stator resistance | 1.094 | 551.2/550 | 0.2% | −1.83 | in working condition changes at speed 1050 Rpm.

Figure 18A:
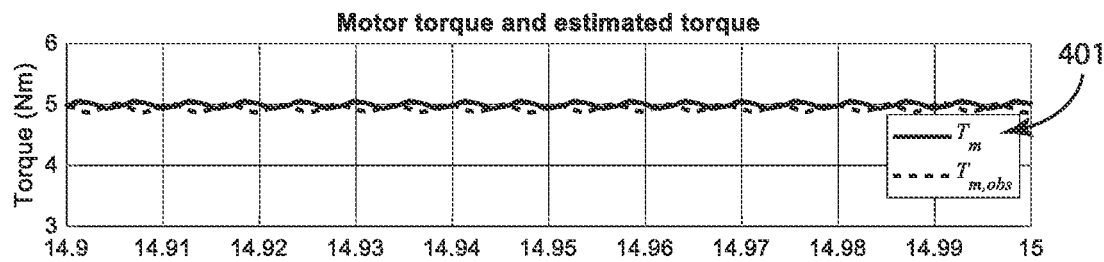
FIGS. 18A-F illustrate graphs of exemplary DFC robust control simulation results during operation at 1050 RPM, 550 W output power, at 25° C. without any compensations.
Figure 18B:
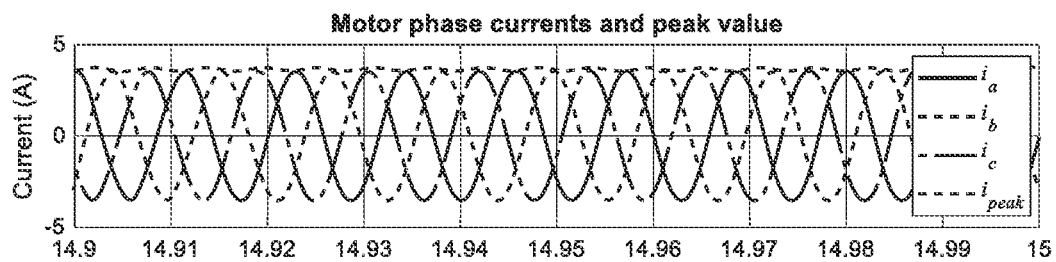
Figure 18C:
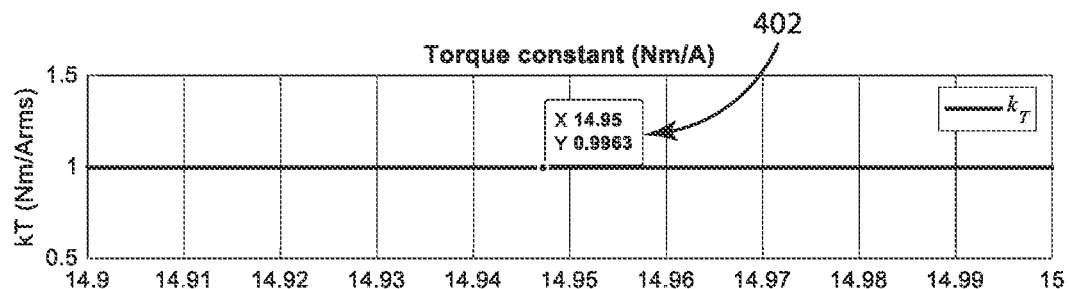
Figure 18D:
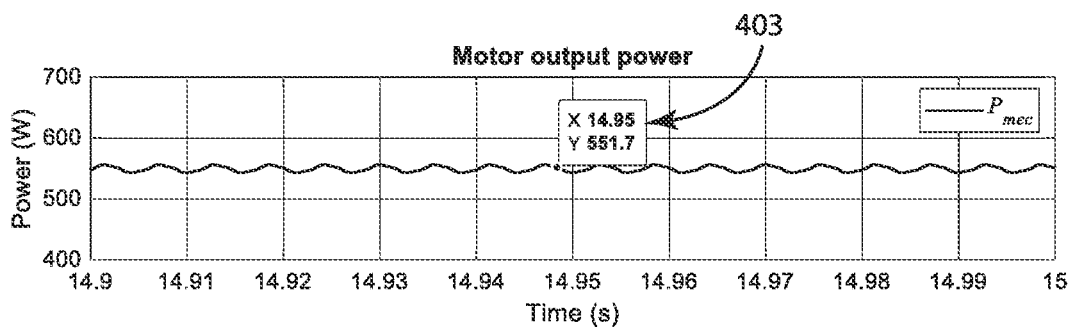
Figure 18E:
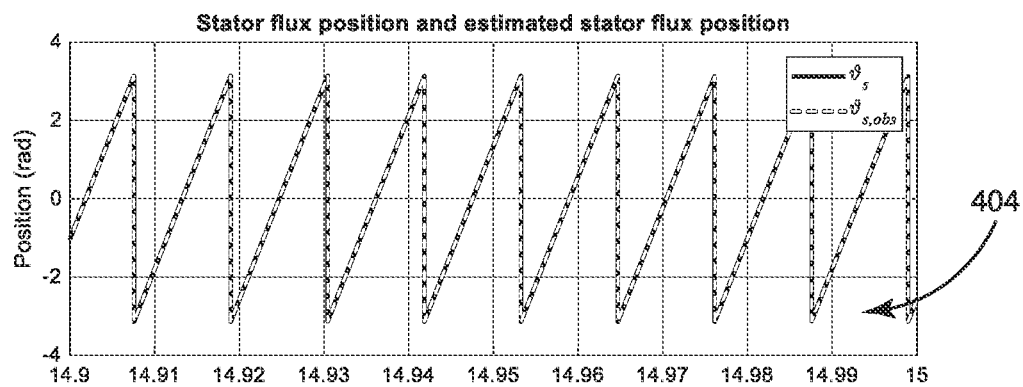
Figure 18F:
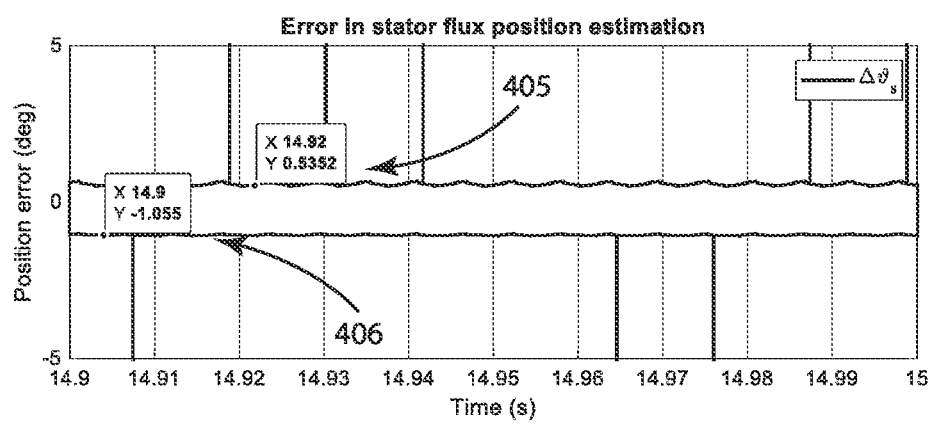
Figure 19A:
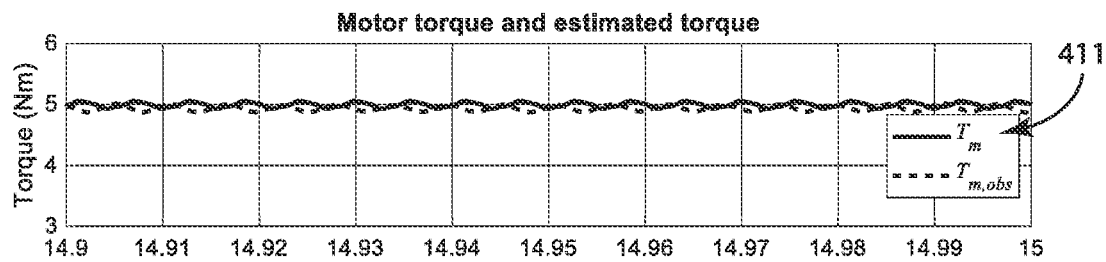
FIGS. 19A-F illustrate graphs of exemplary DFC robust control simulation results during operation at 1050 Rpm, 550 W output power, at 80° C. with −11% flux variation, +21% resistance variation, without any compensations.
Figure 19B:
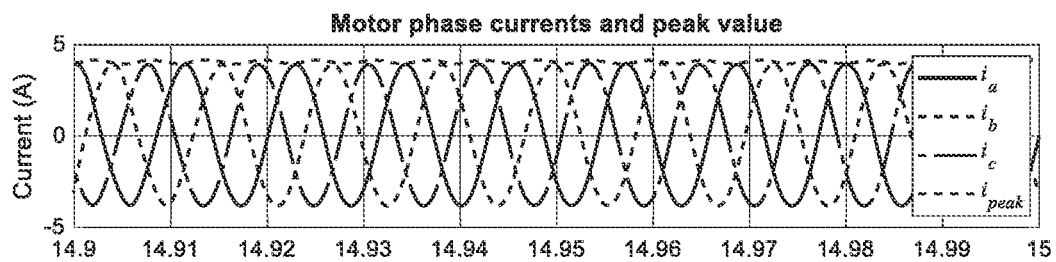
Figure 19C:
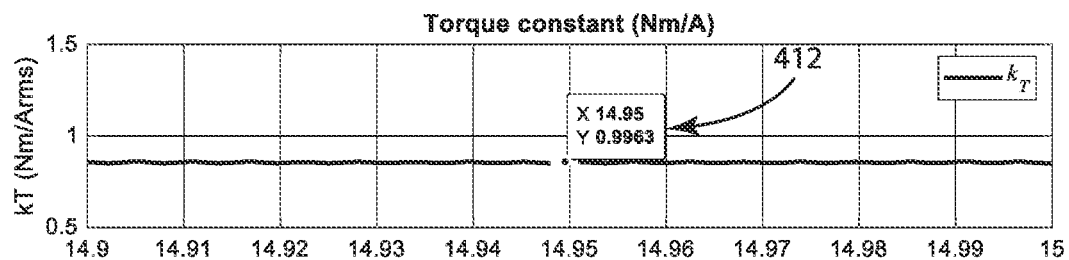
Figure 19D:
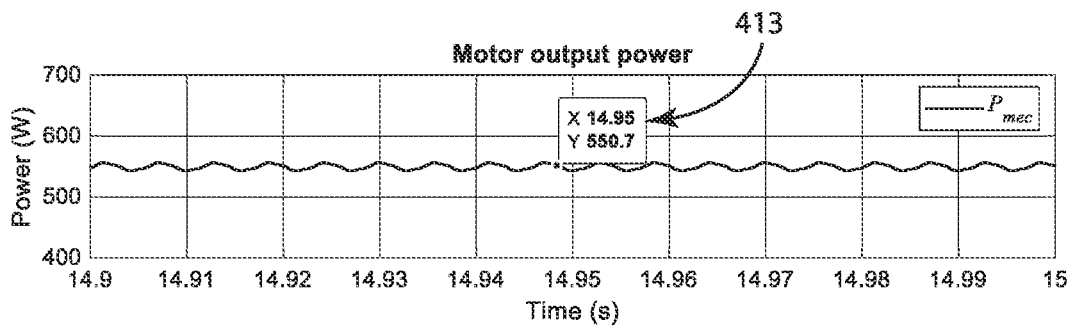
Figure 19E:
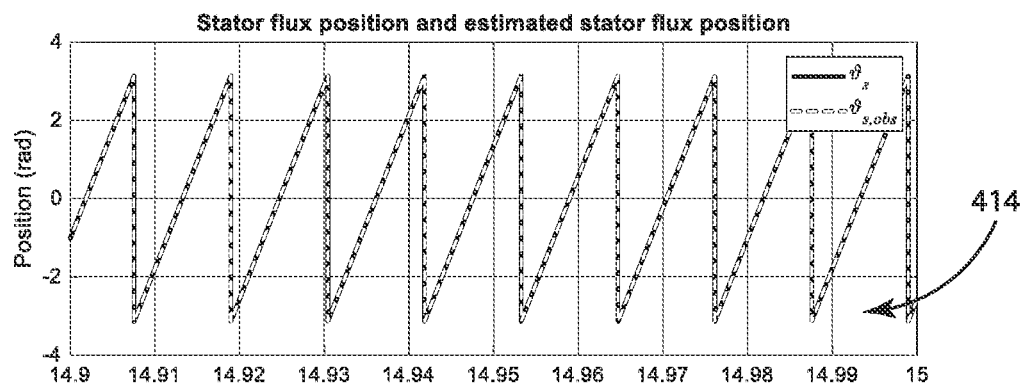
Figure 19F:
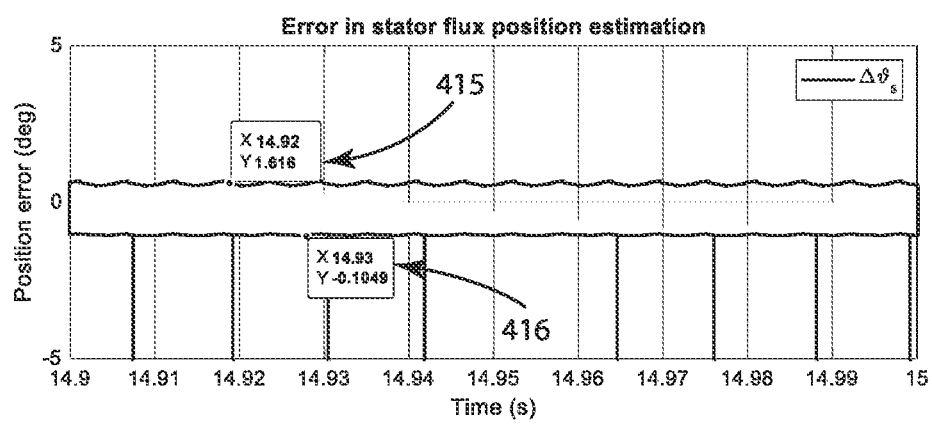
Figure 20A:
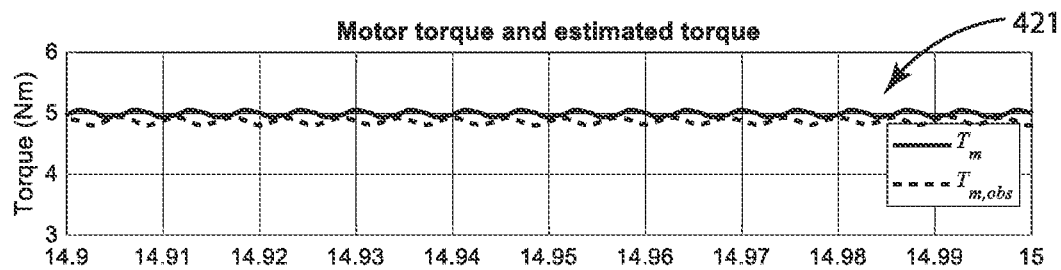
FIGS. 20A-F illustrate graphs of exemplary DFC robust control simulation results during operation at 1050 Rpm, 550 W Output power, at −30° C. with −11% flux variation, +21% Resistance variation, without any compensations.
Figure 20B:
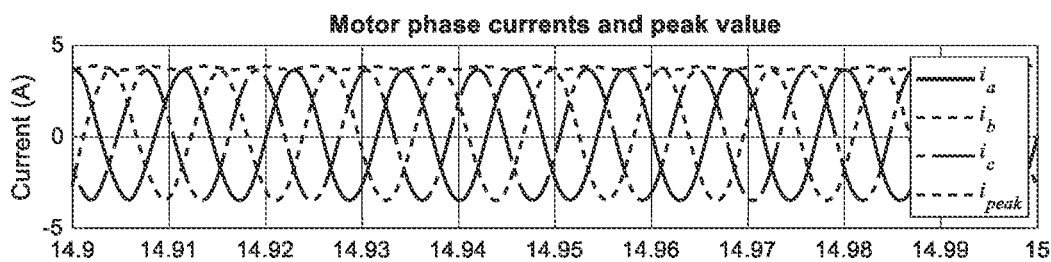
Figure 20C:
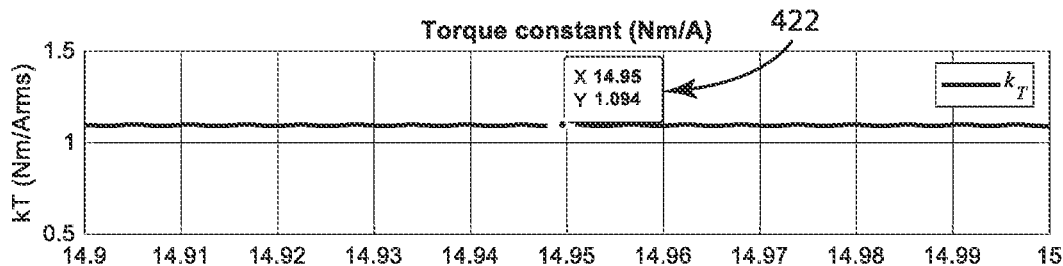
Figure 20D:
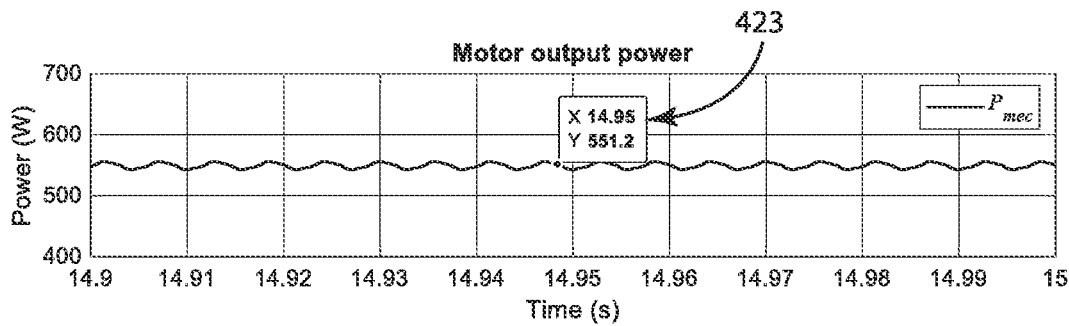
Figure 20E:
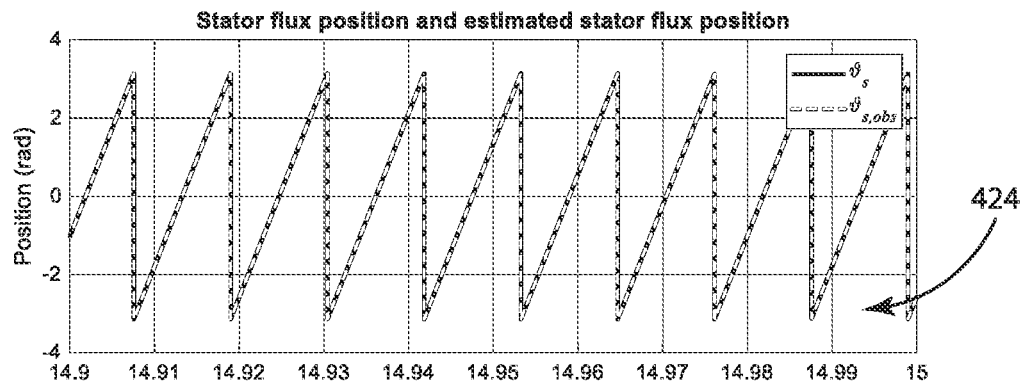
Figure 20F:
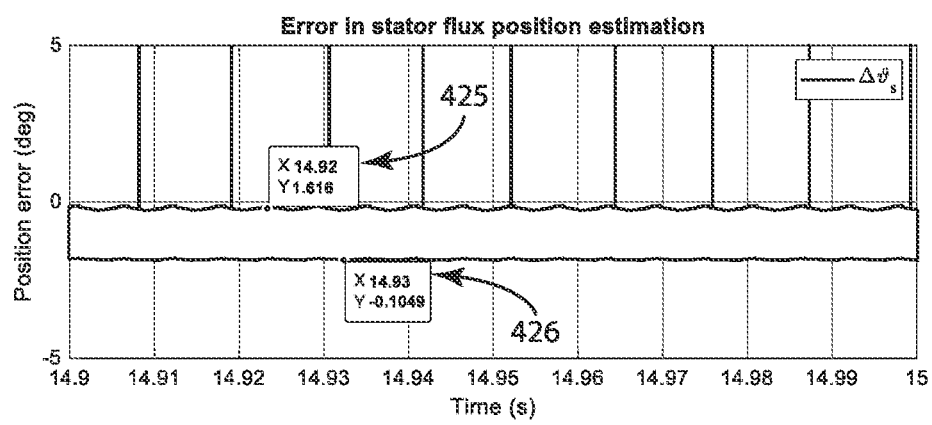

FIGS. 18A, 19A and 20A illustrate actual torque and estimated torque by the stator flux observer. FIGS. 18B, 19B, and 20B illustrate the three-phase currents and the peak value. FIGS. 18C, 19C, and 20C illustrate the respective torque constant $k_T$ (Nm/A). FIGS. 18D, 19D, and 20D illustrate the motor output power calculation result. FIGS. 18E, 19E, and 20E illustrate the stator flux position and the estimated stator flux position, while FIGS. 18F, 19F, and 20F illustrate the error of the stator flux estimate.

Referring to FIGS. 18A-F, the command torque and the estimated torque curves are plotted versus time 401. The torque constant $k_T$ (Nm/A), 402 is calculated in FIG. 18C. The motor output power in real-time is plotted in FIG. 18D. The stator flux position and the estimated stator flux position overlap almost completely in FIG. 18E 404. The error is smaller than 2 electric degrees, illustrated in FIG. 18F 405, 406.

The DDFC system provides robust and accurate speed control, normally within 1 RPM of commanded RPM regardless of environment. As evidenced in Table 1, as the ambient temperature has large changes, 25° C., 80° C. and −30° C., the DDFC system control delivers a robust output power at the speed 1050 Rpm with less than 0.3% error. The estimated flux position error is also small, within 2 degree integral based flux observer to improve the estimated accuracy. The ObserverMode turns to 0 from 1. The observer flag status switches its status at the corresponding speeds.

Referring to FIGS. 23A-C, at 30 Rpm, within a low-speed range, the DDFC system delivers satisfactory speed control performance. In practice, the system can operate at any low speed above zero speed with a precise speed control, which may not be well controlled with any legacy sensorless observer techniques. In FIGS. 23A-C, the motor starts to accelerate from a stable low speed 30 Rpm to the 600 Rpm or any high speed.

It should be noticed that there is a speed gap, 50 Rpm between the 200 Rpm and 250 Rpm, which provides a speed buffer for turning on or off the HFI operation for the DHFI-Stator Flux Observer control strategies. This can be observed with reference to the sensorless flag 525, which reflects the various flag changes over time, such as the enableHF flag and the ObserverMode flag. Illustrated in FIG. 23A and FIG. 23C. In addition, all the operations are for the bi-direction operating with the Sensorless flags described in U.S. application Ser. No. 16/984,267 to Bojoi et al., filed on Aug. 4, 2020, entitled "ROBUST STARTING SYSTEM AND METHOD FOR INTERIOR PERMANENT MAGNET SYNCHRONOUS MOTOR CONTROL".

Overall, the application of the DHFI control strategy implemented with the DDFC as a platform improves a long-time weakness in the very low speed sensorless control of synchronous permanent magnet motor systems, provides an ideal solution for commercial blower and fan drives and offers opportunities for smart sensing and artificial intelligence system controls. The DHFI-DDFC represents a new generation of robust system controls and can be applied to any applications where rough and serve working conditions occur, such as commercial and industrial fans, pumps, appliances, and other drive applications.

Therefore, without any compensations, the DHFI-DDFC system control delivers satisfactory results to achieve the robust controls. The flux observer always provides accurate estimates under any rough working conditions. The system control overall performance is very satisfactory in terms of the precise controls of the speed, torque and power under large parameters variation without any empirical compensations, which really benefits to the product developments.

In addition, the robust DHFI-DDFC system control can be directly applied to a synchronous reluctant motor with magnets aid, sometimes referred to as a synchronous reluctance-magnet motor and often classified as one type of interior permanent magnet motor with high saliency.

The DFC represents a new generation of robust system controls and can be applied to any applications where rough and serve working conditions occur, such as commercial fans, pumps, appliances, other drives, etc.

Directional terms, such as "vertical," "horizontal," "top," "bottom," "upper," "lower," "inner," "inwardly," "outer," and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method for robust control of a sensorless interior permanent magnet synchronous motor ("IPMSM") during a severe operating condition, the IPMSM having a stator, a rotor, and a motor control system including a multi-mode stator flux observer, the method comprising:
    estimating, with a voltage motor model of the multi-model stator flux observer of the sensorless IPMSM, a voltage motor model based estimated motor flux linkage between the stator and rotor during the severe operating condition;
    estimating, with a motor magnetic model of the multi-model stator flux observer of the sensorless IPMSM, a motor magnetic model based estimated motor flux linkage between the stator and rotor during the severe operating condition;
    estimating, with the motor control system, a transition rotor characteristic of the sensorless IPMSM during the severe operating condition;
    outputting, from the multi-model stator flux observer, a plurality of estimated motor characteristics for controlling the sensorless IPMSM during the severe operating condition;
    transitioning multi-model stator flux observer output at a transition threshold stored in memory based on the estimated transition rotor characteristic, the transitioning being between the plurality of estimated motor characteristics for controlling the sensorless IPMSM being estimated as a function of the motor magnetic model based estimated motor flux linkage and the plurality of estimated motor characteristics for controlling the IPMSM being estimated as a function of the voltage motor model based estimated motor flux linkage;
    receiving, at the motor control system, the plurality of estimated motor characteristics; and
    controlling, with dynamic direct flux control at the motor control system, the sensorless IPMSM during the severe operating condition based on the plurality of estimated motor characteristics;
    wherein the voltage motor model based estimated motor flux linkage is derived from a motor model based estimated motor flux linkage is derived from a dynamic high frequency injection ("DHFI") filtered current;
    switching, in response to the estimated transition rotor characteristic reaching an observer mode threshold stored in memory, the magnetic motor model based estimated motor flux linkage from being derived from a high frequency observed rotor position to the magnetic motor model based estimated motor flux linkage being derived from a voltage motor model rotor position based on the dynamic high frequency injection ("DHFI") filtered current; and
    switching, in response to the estimated transition rotor characteristic reaching a disable high frequency mode threshold, the voltage motor model based estimated motor flux linkage from being derived from the dynamic high frequency injection ("DHFI") filtered high frequency injected current to the voltage motor model based estimated motor flux linkage being derived from a current not subject to high frequency injection.

2. The method for robust control of a sensorless IPMSM during the severe operating condition of claim 1 wherein the transition threshold is less than the observer mode threshold and the disable high frequency mode threshold, and wherein the observer mode threshold is less than the disable high frequency mode threshold.

3. A method for robust control of a sensorless interior permanent magnet synchronous motor ("IPMSM") during a severe operating condition, the IPMSM having a stator, a rotor, and a motor control system including a multi-model stator flux observer, the method comprising:

estimating, with a voltage motor model of the multi-model stator flux observer of the sensorless IPMSM, a voltage motor model based estimated motor flux linkage between the stator and rotor during the severe operating condition;

estimating, with a motor magnetic model of the multi-model stator flux observer of the sensorless IPMSM, a motor magnetic model based estimated motor flux linkage between the stator and rotor during the severe operating condition;

estimating, with the motor control system, a transition rotor characteristic of the sensorless IPMSM during the severe operating condition;

outputting, from the multi-model stator flux observer, a plurality of estimated motor characteristics for controlling the sensorless IPMSM during the severe operating condition;

transitioning multi-model stator flux observer output at a transition threshold stored in memory based on the estimated transition rotor characteristic, the transitioning being between the plurality of estimated motor characteristics for controlling the sensorless IPMSM being estimated as a function of the motor magnetic model based estimated motor flux linkage and the plurality of estimated motor characteristics for controlling the IPMSM being estimated as a function of the voltage motor model based estimated motor flux linkage;

receiving, at the motor control system, the plurality of estimated motor characteristics; and controlling, with dynamic direct flux control at the motor control system, the sensorless IPMSM during the severe operating condition based on the plurality of estimated motor characteristics;

the estimated transition rotor characteristic being an estimated rotor speed, wherein the voltage motor model is based upon one or more empirically determined motor parameters, the voltage motor model being valid for a range of operating conditions;

wherein the motor magnetic model is based upon one or more empirically determined motor parameters, the motor magnetic model being valid for a range of operating conditions;

wherein the severe operating condition falls within the range of valid operating conditions for at least one of the voltage motor model and the motor current model.

4. The method for robust control of a sensorless IPMSM during the severe operating condition of claim 3 wherein the severe operating condition includes at least one of an extreme ambient temperature, a fluctuation in temperature, a fluctuation in voltage, and inverter saturation.

5. A method for robust control of a sensorless interior permanent magnet synchronous motor ("IPMSM") during a severe operating condition, the IPMSM having a stator, a rotor, and a motor control system including a multi-model stator flux observer, the method comprising:

estimating, with a voltage motor model of the multi-model stator flux observer of the sensorless IPMSM, a voltage motor model based estimated motor flux linkage between the stator and rotor during the severe operating condition;

estimating, with a motor magnetic model of the multi-model stator flux observer of the sensorless IPMSM, a motor magnetic model based estimated motor flux linkage between the stator and rotor during the severe operating condition;

estimating, with the motor control system, a transition rotor characteristic of the sensorless IPMSM during the severe operating condition;

outputting, from the multi-model stator flux observer, a plurality of estimated motor characteristics for controlling the sensorless IPMSM during the severe operating condition;

transitioning multi-model stator flux observer output at a transition threshold stored in memory based on the estimated transition rotor characteristic, the transitioning being between the plurality of estimated motor characteristics for controlling the sensorless IPMSM being estimated as a function of the motor magnetic model based estimated motor flux linkage and the plurality of estimated motor characteristics for controlling the IPMSM being estimated as a function of the voltage motor model based estimated motor flux linkage;

receiving, at the motor control system, the plurality of estimated motor characteristics; and controlling, with dynamic direct flux control at the motor control system, the sensorless IPMSM during the severe operating condition based on the plurality of estimated motor characteristics;

injecting a high frequency current into the stator of the IPMSM;

sensing a stator current including a fundamental frequency portion and a high frequency injection portion;

filtering the sensed stator current with a dynamic high frequency injection ("DHFI") filter into a DHFI filtered current;

estimating a rotor position of the sensorless IPMSM with a high frequency observer based on the DHFI filtered current;

wherein estimating the motor magnetic model based estimated motor flux linkage includes estimating the motor magnetic model based estimated motor flux linkage based on the DHFI filtered current, the estimated rotor position, and the motor magnetic model; and wherein estimating the voltage motor model based estimated motor flux linkage includes estimating the voltage motor model based estimated motor flux linkage based on the DHFI filtered current; and estimating a rotor position of the sensorless IPMSM based on the estimated voltage motor model-based motor flux linkage.

6. The method for robust control of a sensorless IPMSM during the severe operating condition of claim 5 wherein the transition threshold is a transition rotor speed corresponding to a filter cut-off frequency, wherein the transition rotor speed is less than an observer mode switch rotor speed stored in memory and a high frequency mode disable rotor speed stored in memory, and wherein the observer mode switch rotor speed is less than the high frequency mode disable rotor speed; wherein the estimated transition rotor characteristic is an estimated rotor speed; wherein at estimated rotor speeds below the transition rotor speed, the voltage motor model based estimated motor flux linkage is derived from the DHFI filtered current; wherein the method further includes:

switching, in response to the estimated rotor speed exceeding the observer mode switch rotor speed, the motor magnetic model based estimated motor flux linkage from being derived from the rotor position obtained from the high frequency observer based on the DHFI filtered current to the motor magnetic model based estimated motor flux linkage being derived from the rotor position based on the estimated voltage motor model based motor flux linkage; and in response to the estimated rotor speed exceeding the high frequency mode disable rotor speed, disabling the injecting of the high frequency current into the stator of the IPMSM such that the voltage motor model based estimated motor flux linkage being derived from the DHFI filtered high frequency injected stator current is derived from the stator current without the high frequency injection.

7. A sensorless interior permanent magnet synchronous motor ("IPMSM") system for operation during a severe operating condition, the sensorless IPMSM system comprising:

a motor housing;

a stator mounted in the motor housing and defining a space, the stator having a three-phase stator winding configuration;

a rotor including a plurality of interior permanent magnets distributed circumferentially such that the rotor exhibits magnetic saliency, the rotor being rotatable over a speed range inside the space via excitation of the three-phase stator winding configuration of the stator;

a motor control system mounted in the motor housing including:
  a power supply;
  a sensing circuit configured to sense one or more electrical characteristics of the stator;
  a memory for storing a plurality of motor characteristic values;
  a multi-model stator flux observer configured to:
    estimate, with a voltage motor model, a voltage motor model based estimated motor flux linkage between the stator and rotor during the severe operating condition,
    estimate, with a motor magnetic model, a motor magnetic model based estimated motor flux linkage between the stator and rotor during the severe operating condition,
    estimate a rotor speed based on at least one of the voltage motor model based estimated motor flux linkage and the motor magnetic model based estimated motor flux linkage, and
    output the plurality of estimated motor characteristic values for controlling the sensorless IPMSM during the severe operating condition based on the estimated rotor speed, the plurality of estimated motor characteristic values being estimated as a function of at least one of the motor magnetic model based estimated motor flux linkage and voltage motor model based estimated motor flux linkage;
  a dynamic direct flux controller configured to generate driving commands during the severe operating condition based on the plurality of estimated motor characteristics;
  a driving circuit for generating excitation signals for the three-phase stator winding configuration of the stator according to the driving commands provided by the controller; and wherein the multi-model stator flux observer is configured to output the plurality of estimated motor characteristic values as a function of the motor magnetic model based estimated motor flux linkage while the estimated rotor speed is below a motor magnetic model threshold, and configured to output the plurality of estimated motor characteristic values as a function of the voltage model based estimated motor flux linkage while the estimated rotor speed is above a voltage model threshold.

8. A sensorless interior permanent magnet synchronous motor ("IPMSM") system for operation during a severe operating condition, the sensorless IPMSM system comprising:

a motor housing;

a stator mounted in the motor housing and defining a space, the stator having a three-phase stator winding configuration;

a rotor including a plurality of interior permanent magnets distributed circumferentially such that the rotor exhibits magnetic saliency, the rotor being rotatable over a speed range inside the space via excitation of the three-phase stator winding configuration of the stator;

a motor control system mounted in the motor housing including:
  a power supply;
  a sensing circuit configured to sense one or more electrical characteristics of the stator;
  a memory for storing a plurality of motor characteristic values;
  a multi-model stator flux observer configured to:
    estimate, with a voltage motor model, a voltage motor model based estimated motor flux linkage between the stator and rotor during the severe operating condition,
    estimate, with a motor magnetic model, a motor magnetic model based estimated motor flux linkage between the stator and rotor during the severe operating condition,
    estimate a rotor speed based on at least one of the voltage motor model based estimated motor flux linkage and the motor magnetic model based estimated motor flux linkage, and
    output the plurality of estimated motor characteristic values for controlling the sensorless IPMSM during the severe operating condition based on the estimated rotor speed, the plurality of estimated motor characteristic values being estimated as a function of at least one of the motor magnetic model estimated motor flux linkage and voltage motor model estimated motor flux linkage;
  a dynamic direct flux controller configured to generate driving commands during the severe operating condition based on the plurality of estimated motor characteristics;
  a driving circuit for generating excitation signals for the three-phase stator winding configuration of the stator according to the driving commands provided by the controller; and wherein the voltage model is based upon one or more empirically determined motor parameters, the voltage model being valid for a range of operating conditions, wherein at estimated rotor speeds below the voltage model threshold, the severe operating condition falls outside the range of operating conditions where the voltage model is valid, and wherein at estimated rotor speeds above the voltage model threshold, the severe operating condition falls within the range of operating conditions where the voltage model is valid; and wherein the motor magnetic model is based upon one or more empirically determined motor parameters, the magnetic model being valid for a range of operating conditions, wherein at estimated rotor speeds above the current model threshold, the severe operating condition falls outside the range of operating conditions where the magnetic model is valid, and wherein at estimated rotor speeds below the current model threshold, the severe operating condition falls within the range of operating conditions where the magnetic model is valid.

9. The sensorless IPMSM of claim 7, wherein the severe operating condition includes at least one of an extreme ambient temperature, a fluctuation in temperature, a fluctuation in voltage, and inverter saturation.

10. A sensorless interior permanent magnet synchronous motor ("IPMSM") system for operation during a severe operating condition, the sensorless IPMSM system comprising:
 a motor housing;
 a stator mounted in the motor housing and defining a space, the stator having a three-phase stator winding configuration;
 a rotor including a plurality of interior permanent magnets distributed circumferentially such that the rotor exhibits magnetic saliency, the rotor being rotatable over a speed range inside the space via excitation of the three-phase stator winding configuration of the stator;
 a motor control system mounted in the motor housing including:
  a power supply;
  a sensing circuit configured to sense one or more electrical characteristics of the stator;
  a memory for storing a plurality of motor characteristic values;
  a multi-model stator flux observer configured to:
   estimate, with a voltage motor model, a voltage motor model based estimated motor flux linkage between the stator and rotor during the severe operating condition,
   estimate, with a motor magnetic model, a motor magnetic model based estimated motor flux linkage between the stator and rotor during the severe operating condition,
   estimate a rotor speed based on at least one of the voltage motor model based estimated motor flux linkage and the motor magnetic model based estimated motor flux linkage, and
   output the plurality of estimated motor characteristic values for controlling the sensorless IPMSM during the severe operating condition based on the estimated rotor speed, the plurality of estimated motor characteristic values being estimated as a function of at least one of the motor magnetic model estimated motor flux linkage and voltage motor model estimated motor flux linkage;
  a dynamic direct flux controller configured to generate driving commands during the severe operating condition based on the plurality of estimated motor characteristics;
  a driving circuit for generating excitation signals for the three-phase stator winding configuration of the stator according to the driving commands provided by the controller; and
  a high frequency injection circuit configured to inject a high frequency signal into the stator of the IPMSM;
 wherein the sensing circuit is configured to sense a stator current including a fundamental frequency portion and a high frequency injection portion;
 a dynamic high frequency injection ("DHFI") filter configured to filter the sensed stator current into a DHFI filtered current;
 a high frequency angle observer configured to estimate a rotor position of the sensorless IPMSM based on the DHFI filtered current; and
 wherein the multi-model stator flux observer is configured to estimate the motor magnetic model based estimated motor flux linkage based on the DHFI filtered current, the estimated rotor position, and the motor magnetic model.

11. The sensorless IPMSM of claim 10, including:
 wherein the multi-model stator flux observer is configured to output the plurality of estimated motor characteristics as a function of the motor magnetic model estimated motor flux linkage based on the DHFI filtered current and the high frequency angle observer estimated rotor position while the estimated rotor speed is below the current model threshold; and
 wherein the multi-model stator flux observer is configured to output the plurality of estimated motor characteristics as a function of the voltage model estimated motor flux linkage while the estimated rotor speed is above the voltage model threshold;
 wherein the voltage motor model and the motor magnetic motor model are each based upon one or more empirically determined motor parameters, wherein the voltage model and the motor magnetic model are each valid for a corresponding range of operating conditions.

12. The sensorless IPMSM of claim 11, including:
 wherein the multi-model stator flux observer is configured to output the plurality of estimated motor characteristics as a function of the voltage model estimated rotor position and the DHFI filtered current while the estimated rotor speed is above the voltage model threshold and below a high frequency observer disable threshold; and
 wherein the multi-model stator flux observer is configured to output the plurality of estimated motor characteristics as a function of the voltage motor model estimated rotor position and the fundamental frequency portion of the stator current while the estimated rotor speed is above the high frequency injection disable threshold.

13. A method for estimating a sensorless interior permanent magnet synchronous motor ("IPMSM") rotor characteristic value during severe operating conditions with a multi-model stator flux observer of an IPMSM control system, the IPMSM having a stator and a rotor, the method comprising:
 estimating, with a voltage motor model of the multi-model stator flux observer of the IPMSM control system, a motor voltage model voltage motor model based estimated motor flux linkage between the stator and rotor based on back-EMF voltage and dead time voltage;
 estimating, with a motor magnetic model of the multi-model stator flux observer of the IPMSM control system, a motor magnetic model based estimated motor flux linkage between the stator and rotor based on stator current and rotor position; and estimating the sensorless IPMSM rotor characteristic value as a function of the motor magnetic model estimated motor flux linkage;

estimating the sensorless IPMSM rotor characteristic value as a function of the voltage motor model estimated motor flux linkage;

transitioning multi-model stator flux observer output at a transition threshold stored in memory, between outputting the sensorless IPMSM rotor characteristic value estimated as a function of the motor magnetic model estimated motor flux linkage and the sensorless IPMSM rotor characteristic value estimated as a function of the voltage motor model estimated motor flux linkage;

whereby accuracy of the estimated sensorless IPMSM rotor characteristic output from the multi-model stator flux observer during the severe operating conditions falls within a predefined tolerance range of an actual rotor characteristic value during the severe operating conditions over an entire operating range of the IPMSM control;

injecting a high frequency signal into the stator of the IPMSM;

sensing an HFI injected stator current including a fundamental frequency portion and a high frequency injection portion;

filtering the sensed HFI stator current with dynamic high frequency injection ("DHFI") filters into a fundamental frequency DHFI filtered current and a high frequency DHFI filtered current;

estimating a high frequency observer based rotor position of the sensorless IPMSM with a high frequency angle observer based on the high frequency DHFI filtered current, wherein the estimating is based on magnetic saliency of the IPMSM in response to injecting the high frequency signal into the stator of the IPMSM; and wherein estimating the motor magnetic model based estimated motor flux linkage includes estimating the motor magnetic model based estimated motor flux linkage based on the fundamental frequency DHFI filtered current, the estimated high frequency observer based rotor position, and the motor magnetic model, and wherein estimating the motor magnetic model based estimated motor flux linkage is unaffected by motor parameter variation at rotor speeds below the transition threshold; and wherein estimating the voltage motor model based estimated motor flux linkage includes estimating the voltage motor model based estimated motor flux linkage based on the fundamental frequency DHFI filtered current, a pre-injection target voltage, back-EMF voltage derived from DHFI filtered current, and dead time voltage.

14. The method for estimating a sensorless IPMSM rotor characteristic of claim 13 including:

estimating a rotor speed value;

comparing the estimated rotor speed value to the transition threshold;

outputting, from the multi-model stator flux observer, the sensorless IPMSM rotor characteristic value estimated as a function of the motor magnetic model estimated motor flux linkage in response to the estimated rotor speed value being below the transition threshold; and outputting, from the multi-model stator flux observer, the sensorless IPMSM rotor characteristic value estimated as a function of the motor voltage model voltage motor model estimated motor flux linkage in response to the estimated rotor speed value being above the transition threshold.

15. The method for estimating a sensorless IPMSM rotor characteristic of claim 13, including:

estimating, a stator flux observer based rotor position of the sensorless IPMSM with the stator flux observer based on the voltage motor model based estimated motor flux linkage, the fundamental frequency DHFI filtered current, and the voltage motor model;

changing, at or above an observer mode rotor speed, the estimating of the motor magnetic model based estimated motor flux linkage to estimating the motor magnetic model based estimated motor flux linkage based on the fundamental frequency DHFI filtered current, the stator flux observer based rotor position, and the motor magnetic model.

16. The method for estimating a sensorless IPMSM rotor characteristic of claim 15, including:

ceasing the injecting of the high frequency signal into the stator of the IPMSM at or above a cease high frequency injection ("HFI") rotor speed;

automatically changing, at or above the cease HFI rotor speed, the estimating of the stator flux observer rotor position to estimating the stator flux observer rotor position based on the voltage motor model based estimated motor flux linkage, the stator current, and the voltage motor model;

automatically changing, at or above the cease HFI rotor speed, the estimating of the motor magnetic model based estimated motor flux linkage to estimating the motor magnetic model based estimated motor flux linkage based on the stator current, the estimated stator flux observer based rotor position, and the motor magnetic model; and automatically changing, at or above the cease HFI rotor speed, the estimating of the voltage motor model based estimated motor flux linkage to estimating the voltage motor model based estimated motor flux linkage based on a reconstructed stator voltage, back-EMF voltage derived from the stator current, dead time voltage, and the voltage motor model.

17. The method for estimating a sensorless IPMSM rotor characteristic of claim 16, including, at speeds above the transition threshold and below the cease HFI rotor speed, estimating a fundamental DHFI rotor position based on the fundamental frequency DHFI filtered current, and wherein the estimating the sensorless IPMSM rotor characteristic value includes estimating, in the multi-model stator flux observer, based on the fundamental DHFI rotor position, the fundamental frequency DHFI filtered current, and motor magnetic model.

18. A method for estimating a sensorless interior permanent magnet synchronous motor ("IPMSM") rotor characteristic value during severe operating conditions with a multi-model stator flux observer of an IPMSM control system, the IPMSM having a stator and a rotor, the method comprising:

estimating, with a voltage motor model of the multi-model stator flux observer of the IPMSM control system, a voltage motor model based estimated motor flux linkage between the stator and rotor based on back-EMF voltage and dead time voltage;

estimating, with a motor magnetic model of the multi-model stator flux observer of the IPMSM control system, a motor magnetic model based estimated motor flux linkage between the stator and rotor based on stator current and rotor position; and estimating the sensorless IPMSM rotor characteristic value as a function of the motor magnetic model estimated motor flux linkage;

estimating the sensorless IPMSM rotor characteristic value as a function of the voltage motor model estimated motor flux linkage;

transitioning multi-model stator flux observer output at a transition threshold stored in memory, between outputting the sensorless IPMSM rotor characteristic value estimated as a function of the motor magnetic model estimated motor flux linkage and the sensorless IPMSM rotor characteristic value estimated as a function of the voltage motor model estimated motor flux linkage;

whereby accuracy of the estimated sensorless IPMSM rotor characteristic output from the multi-model stator flux observer during the severe operating conditions falls within a predefined tolerance range of an actual rotor characteristic value during the severe operating conditions over an entire operating range of the IPMSM control;

wherein the sensorless IPMSM rotor characteristic value is estimated:

at rotor speeds below the transition threshold, as a function of the high frequency observer estimated rotor position, at rotor speeds above the transition threshold and below an observer mode threshold, as a function of the stator flux observer estimated rotor position, at rotor speeds above the observer mode threshold and below a high frequency injection disable threshold, as a function of the stator flux observer estimated rotor position and a filtered high frequency injected current, at rotor speeds above the high frequency injection disable threshold, as a function of the stator flux observer estimated rotor position and a stator current not subject to high frequency injection.

19. The method for estimating a sensorless IPMSM rotor characteristic of claim 18, including adjusting the transition threshold as a function of at least one of the observer mode threshold, the high frequency injection disable threshold, and relative values of the transition threshold, observer mode threshold, and high frequency injection disable threshold.

20. The method for estimating a sensorless IPMSM rotor characteristic of claim 13, including selecting a transition threshold based on at least one of expected IPMSM operating speed range, expected IPMSM starting torque, expected IPMSM peak operating speed, or any combination thereof.

21. A method for estimating a sensorless interior permanent magnet synchronous motor ("IPMSM") rotor characteristic value during severe operating conditions with a multi-model stator flux observer of an IPMSM control system, the IPMSM having a stator and a rotor, the method comprising:

estimating, with a voltage motor model of the multi-model stator flux observer of the IPMSM control system, a voltage motor model based estimated motor flux linkage between the stator and rotor based on back-EMF voltage and dead time voltage;

estimating, with a motor magnetic model of the multi-model stator flux observer of the IPMSM control system, a motor magnetic model based estimated motor flux linkage between the stator and rotor based on stator current and rotor position; and estimating the sensorless IPMSM rotor characteristic value as a function of the motor magnetic model estimated motor flux linkage;

estimating the sensorless IPMSM rotor characteristic value as a function of the voltage motor model estimated motor flux linkage;

transitioning multi-model stator flux observer output at a transition threshold stored in memory, between outputting the sensorless IPMSM rotor characteristic value estimated as a function of the motor magnetic model estimated motor flux linkage and the sensorless IPMSM rotor characteristic value estimated as a function of the voltage motor model estimated motor flux linkage;

whereby accuracy of the estimated sensorless IPMSM rotor characteristic output from the multi-model stator flux observer during the severe operating conditions falls within a predefined tolerance range of an actual rotor characteristic value during the severe operating conditions over an entire operating range of the IPMSM control;

selecting a transition threshold for a gain function that dictates whether the motor magnetic model based flux estimate or the voltage motor model estimate dominates the feedback, wherein the selecting is based, at least in part, on a rotor speed value corresponding to an observer mode change and a rotor speed value corresponding to a high frequency injection disable; and wherein the severe operating conditions include one or more of an extreme ambient temperature, a fluctuation in ambient temperature, a fluctuation in voltage, and inverter saturation.

22. A sensorless interior permanent magnet synchronous motor ("IPMSM") comprising:

a motor housing;

a stator mounted in the motor housing and defining a cylindrical space, the stator having a three-phase stator winding configuration;

a rotor including a plurality of interior permanent magnets distributed circumferentially such that the rotor exhibits magnetic saliency, the rotor being rotatable over a speed range inside the cylindrical space via excitation of the three-phase stator winding configuration of the stator;

a motor control system mounted in the motor housing including:

a power supply;

a sensing circuit configured to sense a stator current;

a dynamic high frequency injection ("DHFI") filter circuit configured to filter the stator current into a fundamental frequency DHFI filtered stator current and a high frequency DHFI filtered stator current;

a memory for storing rotor position information, motor voltage model information, motor current model information, and a plurality of motor characteristic values;

a flux observer system including one or more controllers configured to:

obtain a rotor position estimate based on at least one of the stator current, the high frequency DHFI filtered stator current, and the fundamental frequency DHFI filtered stator current;

estimate a voltage-model based flux linkage between the stator and the rotor based on the voltage motor model information;

estimate a current-model based flux linkage between the stator and the rotor based on the current motor model information;

update the plurality of motor characteristic values in memory based on at least one of the voltage-model based flux linkage and the current-model based flux linkage;

a dynamic direct flux control system configured to generate driving commands using closed loop control based on feedback including the updated plurality of motor characteristic values;

a driving circuit for generating excitation signals for the three-phase stator winding configuration of the stator according to the driving commands; and whereby robust speed control is provided over the entire speed range despite non-linear variation of motor parameters.

23. The sensorless IPMSM of claim 22 wherein the flux observer system includes a filter algorithm for filtering the voltage-model based flux linkage and the current-model based flux linkage based on a rotor speed estimate corresponding to a cut off frequency, wherein the flux observer system includes a low pass filter and high pass filter configured for the current-model based flux linkage to dominate for estimated rotor speeds below a motor model threshold and the voltage-model based flux linkage to dominate for estimated rotor speeds above a motor model threshold.

24. The sensorless IPMSM of claim 23 including:

wherein at rotor speeds below an observer mode threshold, the current-model based flux linkage is determined as a function of the rotor position estimate based on the high frequency DHFI filtered stator current;

wherein at rotor speeds above the observer mode threshold and below a high frequency injection disable threshold, the current-model based flux linkage and is determined as a function of the rotor position estimate based on the fundamental frequency DHFI filtered stator current; and wherein at rotor speeds above the high frequency injection disable threshold, the current-model based flux linkage and the voltage-model based flux linkage are determined as a function of the rotor position estimate based on the stator current, wherein the stator current is not subject to high frequency injection.

25. The sensorless IPMSM of claim 23 wherein one of the plurality of motor characteristic values is a stator flux observer flux estimate, and wherein the dynamic direct flux control system is configured to obtain an MTPA flux target from a Maximum Torque Per Ampere ("MTPA") lookup table, limit the MTPA flux target based on a flux weakening limit derived from and in response to the rotor speed estimate being below an inverter saturation rotor speed, and generate driving commands based on a limited MTPA flux target and the stator flux observer flux estimate, and wherein in response to the stator flux observer flux estimate being lower than the MTPA flux target, torque production capability is increased by increasing a current driving command to compensate for the flux shortage during severe working conditions.

26. The sensorless IPMSM of claim 23 wherein one of the plurality of motor characteristic values is a stator flux observer load angle, and wherein the dynamic direct flux control system is configured to limit a torque-based stator current target with a Maximum Torque Per Volt ("MTPV") controller based on the stator flux observer load angle, and generate driving commands based on error between a limited torque-based stator current target and the stator current.

27. The sensorless IPMSM of claim 22 wherein the non-linear variation of motor parameters occurs due to at least one of fluctuation in temperature, fluctuation in voltage, an extreme ambient temperature, and inverter saturation.

* * * * *

UNITED STATES PATENT AND TRADEMARK OFFICE
CERTIFICATE OF CORRECTION

| | | |
|---|---|---|
| PATENT NO. | : 11,239,772 B1 | Page 1 of 1 |
| APPLICATION NO. | : 17/220421 | |
| DATED | : February 1, 2022 | |
| INVENTOR(S) | : Bojoi et al. | |

It is certified that error appears in the above-identified patent and that said Letters Patent is hereby corrected as shown below:

On the Title Page

Item (72) Inventors:
"Radu Bojoi, Turin (IT)"

Should be:
--Radu Bojoi, Torino (IT)--

In the Claims

Column 38, Claim 5, Line 55:
"on the estimated voltage motor model-based motor flux"

Should be:
--on the estimated voltage motor model based motor flux--

Column 42, Claim 13, Line 61:
"system, a motor voltage model voltage motor model"

Should be:
--system, a voltage motor model--

Column 44, Claim 14, Line 1:
"as a function of the motor voltage model voltage motor model"

Should be:
--as a function of the voltage motor model--

Signed and Sealed this
Twenty-sixth Day of April, 2022

Katherine Kelly Vidal
*Director of the United States Patent and Trademark Office*